(12) United States Patent
Kim

(10) Patent No.: US 11,017,320 B1
(45) Date of Patent: May 25, 2021

(54) METHOD FOR TRAINING OBFUSCATION NETWORK WHICH CONCEALS ORIGINAL DATA TO BE USED FOR MACHINE LEARNING AND TRAINING SURROGATE NETWORK WHICH USES OBFUSCATED DATA GENERATED BY OBFUSCATION NETWORK AND LEARNING DEVICE USING THE SAME AND METHOD FOR TESTING TRAINED OBFUSCATION NETWORK AND TESTING DEVICE USING THE SAME

(71) Applicant: Deeping Source Inc., Seoul (KR)

(72) Inventor: Tae Hoon Kim, Seoul (KR)

(73) Assignee: Deeping Source Inc., Seoul (KR)

( * ) Notice: Subject to any disclaimer, the term of this patent is extended or adjusted under 35 U.S.C. 154(b) by 0 days.

(21) Appl. No.: 16/911,106

(22) Filed: Jun. 24, 2020

(51) Int. Cl.
*G06N 20/00* (2019.01)
*G06F 21/62* (2013.01)
*G06N 3/08* (2006.01)

(52) U.S. Cl.
CPC ......... *G06N 20/00* (2019.01); *G06F 21/6254* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 2016/0328559 A1* | 11/2016 | Davidson | G06F 21/10 |
| 2017/0277522 A1* | 9/2017 | Conway | G06F 21/14 |
| 2017/0316342 A1* | 11/2017 | Franc | G06F 17/11 |
| 2019/0171929 A1* | 6/2019 | Abadi | G06N 3/084 |
| 2019/0188830 A1* | 6/2019 | Edwards | G06K 9/6215 |
| 2020/0074339 A1* | 3/2020 | Malas | G06N 7/08 |
| 2020/0134461 A1* | 4/2020 | Chai | G06N 3/04 |
| 2020/0226492 A1* | 7/2020 | Madani | G06N 20/00 |

OTHER PUBLICATIONS

Zhao, P. et al. (2018). "Detecting adversarial examples via key-based network." arXiv preprint arXiv:1806.00580 (2018). (Year: 2018).*

(Continued)

*Primary Examiner* — Kamran Afshar
*Assistant Examiner* — Benjamin J Buss
(74) *Attorney, Agent, or Firm* — Bekiares Eliezer LLP

(57) ABSTRACT

A method of a master learning device to train obfuscation networks and surrogate networks is provided. The method includes steps of: a master learning device (a) acquiring obfuscated data and ground truths from learning devices corresponding to owners or delegates of the original data and their ground truths; (b) (i) inputting the obfuscated data into a surrogate network, to apply learning operation thereto and generate characteristic information, (ii) calculating losses using the ground truths and the characteristic information or its task specific output, and (iii) training the surrogate network such that the losses or their average is minimized; and (c) transmitting the losses to the learning devices, to train the obfuscation networks such that the losses are minimized and that other losses calculated using the original data and the obfuscated data are maximized, and transmit network gradients of the trained obfuscation networks to the master learning device for its update.

20 Claims, 7 Drawing Sheets

(56) References Cited

OTHER PUBLICATIONS

Anirudh, R. et al. (2018). "MimicGAN: Corruption-mimicking for blind image recovery & adversarial defense." arXiv preprint arXiv: 1811.08484 (2018). (Year: 2018).*

Miller, D.J. et al. (Mar. 2020). "Adversarial learning targeting deep neural network classification: A comprehensive review of defenses against attacks." Proceedings of the IEEE 108.3 (2020): 402-433. (Year: 2020).*

Júnior, J.B.P.M. et al. (Jul. 2020). "Generating Adversarial Inputs Using a Black-box Differential Technique." arXiv preprint arXiv: 2007.05315 (2020). (Year: 2020).*

U.S. Appl. No. 16/910,021, filed Jun. 23, 2020 entitled "Method for Training Obfuscation Network Which Conceals Original Data to Be Used for Machine Learning and Training Surrogate Network Which Uses Obfuscated Data Generated by Obfuscation Network and Method for Testing Trained Obfuscation Network and Learning Device and Testing Device Using the Same"; Inventor: Tae Hoon Kim.

* cited by examiner

METHOD FOR TRAINING OBFUSCATION NETWORK WHICH CONCEALS ORIGINAL DATA TO BE USED FOR MACHINE LEARNING AND TRAINING SURROGATE NETWORK WHICH USES OBFUSCATED DATA GENERATED BY OBFUSCATION NETWORK AND LEARNING DEVICE USING THE SAME AND METHOD FOR TESTING TRAINED OBFUSCATION NETWORK AND TESTING DEVICE USING THE SAME

FIELD OF THE DISCLOSURE

The present disclosure relates to a method for training one or more obfuscation networks which conceal original data to be used for machine learning and training one or more surrogate networks which use obfuscated data generated by the obfuscation networks and a learning device using the same, and a method for testing a trained obfuscation network which is trained to conceal the original data to be used for the machine learning and a testing device using the same.

BACKGROUND OF THE DISCLOSURE

Big data refers to data including all of unstructured data and semi-structured data not utilized so far, like e-commerce data, metadata, web log data, radio frequency identification (RFID) data, sensor network data, social network data, data of Internet text and documents, Internet search indexing data, as well as all of structured data used by conventional enterprises or public institutions. Data as such is referred to as the big data in the sense that common software tools and computer systems cannot easily handle such a huge volume of data.

And, although such a big data may have no meaning by itself, it can be useful for generation of new data, judgment or prediction in various fields through machine learning on patterns and the like.

Recently, due to the strengthening of a personal information protection act, it is required to delete information, that can be used for identifying individuals, from the data or to acquire consent of the individuals in order to trade or share such a big data. However, it is not easy to check if any information that can be used for identifying the individuals is present in such a large amount of the big data, and it is impossible to obtain the consent of every individual. Therefore, various techniques for such purposes have emerged.

As an example of a related prior art, a technique is disclosed in Korean Patent Registration No. 1861520. According to this technique, a face-concealing method, e.g., a face-anonymizing method, is provided which includes a detection step of detecting a facial region of a person in an input image to be transformed, a first concealing step of transforming the detected facial region into a distorted first image that does not have a facial shape of the person so that the person in the input image is prevented from being identified, and a second concealing step of generating a second image having a predetermined facial shape based on the first image, transforming the first image into the second image, where the second image is generated to have a facial shape different from that of the facial region detected in the detection step.

However, according to conventional techniques as well as the technique described above, it is determined whether identification information such as faces, text, etc. is included in the data, and then a portion corresponding to the identification information is masked or blurred. As a result, a machine learning algorithm cannot utilize such data due to distortion of original data. Also, in some cases, the data may contain unexpected identification information which cannot be concealed, e.g., anonymized. In particular, a conventional security camera performs an anonymizing process by blurring every pixel changed between frames due to a target to be anonymized moving between the frames in a video, and if the anonymizing process is performed in this manner, critical information such as facial expression of an anonymized face becomes different from information contained in an original video, and also, personal identification information overlooked during face detection may remain on the original video.

Accordingly, the applicant(s) of the present disclosure proposes a method for generating obfuscated data by obfuscating the original data such that the obfuscated data is different from the original data, while a result of inputting the original data into a learning model and a result of inputting the obfuscated data into the learning model are same as or similar to each other.

SUMMARY OF THE DISCLOSURE

It is an object of the present disclosure to solve all the aforementioned problems.

It is another object of the present disclosure to perform concealment, i.e., anonymization, in a simple and accurate way, by eliminating a process of searching data including personal identification information and a process of concealing the personal identification information in the searched data.

It is still another object of the present disclosure to protect privacy and security of original data by generating concealed data, i.e., anonymized data, through irreversibly obfuscating the original data.

It is still yet another object of the present disclosure to generate obfuscated data recognized as similar or same by computers, but recognized as different by humans.

It is still yet another object of the present disclosure to stimulate a big data trade market.

In order to accomplish the objects above, distinctive structures of the present disclosure are described as follows.

In accordance with one aspect of the present disclosure, there is provided a method of a master learning device to train one or more obfuscation networks which conceal original data to be used for machine learning and to train one or more surrogate networks which use obfuscated data generated by the obfuscation networks, including steps of: (a) a master learning device performing or supporting another device to perform a process of acquiring (i) a 1st obfuscation pair comprised of 1st obfuscated data and a 1st ground truth to (ii) an n-th obfuscation pair comprised of n-th obfuscated data and an n-th ground truth respectively from a 1st learning device to an n-th learning device, wherein the 1st obfuscated data is created by obfuscating 1st original data through a 1st obfuscation network, wherein the 1st ground truth corresponds to the 1st original data, wherein the n-th obfuscated data is created by obfuscating n-th original data through an n-th obfuscation network, wherein the n-th ground truth corresponds to the n-th original data, wherein the 1st learning device corresponds to a 1st party which is determined as a 1st owner of the 1st original data and its corresponding 1st ground truth or is an entity to which the 1st original data and its corresponding 1st ground truth are delegated by the 1st owner, wherein the n-th learning device corresponds to an n-th party which is determined as an n-th owner of the n-th original data and its corresponding n-th ground truth or is an entity to which the n-th original data and its corresponding n-th ground truth are delegated by the n-th owner, and wherein n is an integer larger than 1; (b) the master learning device performing or supporting another device to perform (i) a process of inputting each of the 1st obfuscated data to the n-th obfuscated data into a surrogate network, to thereby allow the surrogate network to apply at least one each learning operation to each of the 1st obfuscated data to the n-th obfuscated data and thus to generate 1st characteristic information to n-th characteristic information respectively corresponding to the 1st obfuscated data to the n-th obfuscated data, (ii) a process of calculating at least one (1_1)-st loss to at least one (1_n)-th loss wherein the (1_1)-st loss is calculated by referring to the 1st ground truth and at least one of the 1st characteristic information and its corresponding 1st task specific output and wherein the (1_n)-th loss is calculated by referring to the n-th ground truth and at least one of the n-th characteristic information and its corresponding n-th task specific output, and (iii) a process of training the surrogate network such that each of the (1_1)-st loss to the (1_n)-th loss is minimized or such that an average loss calculated by averaging over the (1_1)-st loss to the (1_n)-th loss is minimized; and (c) the master learning device performing or supporting another device to perform (i) a process of transmitting the (1_1)-st loss to the (1_n)-th loss respectively to the 1st learning device to the n-th learning device, to thereby allow each of the 1st learning device to the n-th learning device to (i-1) train each of the 1st obfuscation network to the n-th obfuscation network such that each of the (1_1)-st loss to the (1_n)-th loss is minimized and such that each of at least one (2_1)-st loss to at least one (2_n)-th loss is maximized wherein the (2_1)-st loss is calculated by referring to the 1st original data and the 1st obfuscated data and wherein the (2_n)-th loss is calculated by referring to the n-th original data and the n-th obfuscated data, and (i-2) transmit to the master learning device a 1st network gradient of the trained 1st obfuscation network to an n-th network gradient of the trained n-th obfuscation network, and (ii) a process of updating the master obfuscation network by referring to an average network gradient which is averaged over the 1st network gradient to the n-th network gradient.

As one example, the surrogate network includes a 1st surrogate network to an m-th surrogate network and wherein m is an integer greater than 0, wherein, at the step of (b), the master learning device performs or supports another device to perform (i) a process of inputting all of the 1st obfuscated data to the n-th obfuscated data into each of the 1st surrogate network to the m-th surrogate network, to thereby allow each of the 1st surrogate network to the m-th surrogate network to apply each learning operation to all of the 1st obfuscated data to the n-th obfuscated data, and thus to generate (i-1) (1_1)-st characteristic information to (n_1)-st characteristic information to (i-2) (1_m)-th characteristic information to (n_m)-th characteristic information, (ii) a process of calculating (ii-1) at least one (1_1_1)-st loss to at least one (1_n_1)-st loss to (ii-2) at least one (1_1_m)-th loss to at least one (1_n_m)-th loss, wherein the (1_1_1)-st loss is calculated by referring to the 1st ground truth and at least one of (1_1)-st characteristic information and its corresponding (1_1)-st task specific output, wherein the (1_n_1)-st loss is calculated by referring to the n-th ground truth and at least one of the (n_1)-st characteristic information and its corresponding (n_1)-st task specific output, wherein the (1_1_m)-th loss is calculated by referring to the 1st ground truth and at least one of (1_m)-th characteristic information and its corresponding (1_m)-th task specific output, and wherein the (1_n_m)-th loss is calculated by referring to the n-th ground truth and at least one of (n_m)-th characteristic information and its corresponding (n_m)-th task specific output, and (iii) a process of training the 1st surrogate network to the m-th surrogate network such that each of (iii-1) the (1_1_1)-st loss to the (1_n_1)-st loss to (iii-2) the (1_1_m)-th loss to the (1_n_m)-th loss is minimized, wherein, at the step of (c), the master learning device performs or supports another device to perform (i) a process of transmitting each of the (1_1)-st loss to the (1_n)-th loss to each of the 1st learning device to the n-th learning device wherein the (1_1)-st loss includes (1) at least one of the (1_1_1)-st loss to the (1_1_m)-th loss or (2) a 1st average loss calculated by averaging over the (1_1_1)-st loss to the (1_1_m)-th loss and wherein the (1_n)-th loss includes (1) at least one of the (1_n_1)-st loss to the (1_n_m)-th loss or (2) an n-th average loss calculated by averaging over the (1_n_1)-st loss to the (1_n_m)-th loss, to thereby allow each of the 1st learning device to the n-th learning device to (i-1) train each of the 1st obfuscation network to the n-th obfuscation network such that each of the (1_1)-st loss to the (1_n)-th loss is minimized and such that each of the (2_1)-st loss to the (2_n)-th loss is maximized, and (i-2) transmit the 1st network gradient to the n-th network gradient to the master learning device, and (ii) a process of updating the master obfuscation network by referring to the average network gradient.

As one example, the surrogate network includes a 1st surrogate network to an m-th surrogate network and wherein m is an integer greater than 0, wherein, at the step of (a), the master learning device performs or supports another device to perform a process of acquiring a 1st sub-obfuscation pair comprised of the 1st ground truth and (1_1)-st obfuscated data to an n-th sub-obfuscation pair comprised of the n-th ground truth and (n_1)-st obfuscated data, wherein the (1_1)-st obfuscated data is created by obfuscating the 1st original data through the 1st obfuscation network, and wherein the (n_1)-st obfuscated data is created by obfuscating the n-th original data through the n-th obfuscation network, wherein, at the step of (b), the master learning device performs or supports another device to perform (i) a process of inputting each of the (1_1)-st obfuscated data to the (n_1)-st obfuscated data into the 1st surrogate network, to thereby allow the 1st surrogate network to apply at least one each learning operation to each of the (1_1)-st obfuscated data to the (n_1)-st obfuscated data and thus to generate (1_1)-st characteristic information to (n_1)-st characteristic information respectively corresponding to the (1_1)-st obfuscated data to the (n_1)-st obfuscated data, (ii) a process of calculating at least one (1_1_1)-st loss to at least one (1_n_1)-th loss wherein the (1_1_1)-st loss is calculated by referring to the 1st ground truth and at least one of the (1_1)-st characteristic information and its corresponding (1_1)-st task specific output and wherein the (1_n_1)-th loss is calculated by referring to the n-th ground truth and at least one of the (n_1)-st characteristic information and its corresponding (n_1)-st task specific output, and (iii) a process of training the surrogate network such that each of the (1_1_1)-st loss to the (1_n_1)-th loss is minimized or such that an average loss calculated by averaging over the (1_1_1)-st loss to the (1_n_1)-th loss is minimized, wherein, at the step of (c), the master learning device performs or supports another device to perform a process of transmitting the (1_1_1)-st loss to the (1_n_1)-th loss respectively to the 1st learning device to the n-th learning device, to thereby allow each of the 1st learning device to the n-th learning device to (i-1) train each of the 1st obfuscation network to the n-th obfuscation network such that each of the (1_1_1)-st loss to the (1_n_1)-th loss is minimized and such that each of at least one (2_1_1)-st loss to at least one (2_n_1)-th loss is maximized wherein the (2_1_1)-st loss is calculated by referring to the 1st original data and the (1_1)-st obfuscated data and wherein the (2_n_1)-th loss is calculated by referring to the n-th original data and the (n_1)-th obfuscated data, and, as a result, a process of allowing each of the 1st obfuscation network to the n-th obfuscation network to be each of a 1st trained 1st obfuscation network to a 1st trained n-th obfuscation network, wherein, while increasing an integer k from 2 to m, the master learning device performs or supports another device to perform (I) a process of acquiring (1_k)-th obfuscated data to (n_k)-th obfuscated data, wherein the (1_k)-th obfuscated data is created by obfuscating the 1st original data through a (k-1)-th trained 1st obfuscation network, and wherein the (n_k)-th obfuscated data is created by obfuscating the n-th original data through a (k-1)-th trained n-th obfuscation network, (II) (II-1) a process of inputting the (1_k)-th obfuscated data to the (n_k)-th obfuscated data into a k-th surrogate network, to thereby allow the k-th surrogate network to apply each learning operation to each of the (1_k)-th obfuscated data to the (n_k)-th obfuscated data and thus to generate (1_k)-th characteristic information to (n_k)-th characteristic information respectively corresponding to the (1_k)-th obfuscated data to the (n_k)-th obfuscated data, (II-2) a process of calculating at least one (1_1_k)-th loss to at least one (1_n_k)-th loss, wherein the (1_1_k)-th loss is calculated by referring to the 1st ground truth and at least one of the (1_k)-th characteristic information and its corresponding (1_k)-th task specific output, and wherein the (1_n_k)-th loss is calculated by referring to the n-th ground truth and at least one of the (n_k)-th characteristic information and its corresponding (n_k)-th task specific output, and (II-3) a process of training the k-th surrogate network such that each of the (1_1_k)-th loss to the (1_n_k)-th loss is minimized, and (III) a process of transmitting each of the (1_1_k)-th loss to the (1_n_k)-th loss to each of the 1st learning device to the n-th learning device, to thereby allow each of the 1st learning device to the n-th learning device to (III-1) train each of the (k-1)-th trained 1st obfuscation network to the (k-1)-th trained n-th obfuscation network such that each of the (1_1_k)-th loss to the (1_n_k)-th loss is minimized and such that each of (2_1_k)-th loss to (2_n_k)-th loss is maximized, wherein the (2_1_k)-th loss is calculated by referring to the 1st original data and the (1_k)-th obfuscated data, and wherein the (2_n_k)-th loss is calculated by referring to the n-th original data and the (n_k)-th obfuscated data and thus (III-2) allow each of the (k-1)-th trained 1st obfuscation network to the (k-1)-th trained n-th obfuscation network to be each of a k-th trained 1st obfuscation network to a k-th trained n-th obfuscation network, and wherein the master learning device performs or supports another device to perform (i) a process of allowing each of the 1st learning device to the n-th learning device to transmit to the master learning device each of the 1st network gradient of an m-th trained 1st obfuscation network to the n-th network gradient of an m-th trained n-th obfuscation network, and (ii) a process of updating the master obfuscation network by referring to the average network gradient which is averaged over the 1st network gradient to the n-th network gradient.

As one example, at the step of (c), on condition that a 1st obfuscated data score to an n-th obfuscated data score have been acquired respectively as the (2_1)-st loss to the (2_n)-th loss wherein the 1st obfuscated data score to the n-th obfuscated data score respectively correspond to the 1st obfuscated data to the n-th obfuscated data respectively inputted into a 1st discriminator to an n-th discriminator to be used for determining whether their inputted data is real or fake, the master learning device performs or supports another device to perform a process of transmitting each of the (1_1)-st loss to the (1_n)-th loss to each of the 1st learning device to the n-th learning device, to thereby allow each of the 1st learning device to the n-th learning device to (i) train each of the 1st obfuscation network to the n-th obfuscation network such that each of the (1_1)-st loss to the (1_n)-th loss is minimized and such that each of the (2_1)-st loss to the (2_n)-th loss is maximized, and (ii) train each of the 1st discriminator to the n-th discriminator such that each of the 1st obfuscated data score to the n-th obfuscated data score is minimized and such that each of a 1st modified data score or a 1st modified obfuscated data score to an n-th modified data score or an n-th modified obfuscated data score is maximized, wherein the 1st modified data score or the 1st modified obfuscated data score to the n-th modified data score or the n-th modified obfuscated data score respectively correspond to the 1st modified data or the 1st modified obfuscated data to the n-th modified data or the n-th modified obfuscated data respectively inputted into the 1st discriminator to the n-th discriminator, wherein the 1st modified data or the 1st modified obfuscated data is created by respectively modifying the 1st original data or the 1st obfuscated data, and wherein the n-th modified data or the n-th modified obfuscated data is created by respectively modifying the n-th original data or the n-th obfuscated data.

As one example, the surrogate network includes a 1st surrogate network to an m-th surrogate network wherein m is an integer greater than 0, wherein, at the step of (b), the master learning device performs or supports another device to perform (i) a process of inputting each of the 1st obfuscated data to the n-th obfuscated data into each of the 1st surrogate network to the m-th surrogate network, to thereby allow each of the 1st surrogate network to the m-th surrogate network to apply each learning operation to each of the 1st obfuscated data to the n-th obfuscated data, and thus to generate (i-1) (1_1)-st characteristic information to (n_1)-st characteristic information to (i-2) (1_m)-th characteristic information to (n_m)-th characteristic information, (ii) a process of calculating (ii-1) at least one (1_1_1)-st loss to at least one (1_n_1)-st loss to (ii-2) at least one (1_1_m)-th loss to at least one (1_n_m)-th loss, wherein the (1_1_1)-st loss is calculated by referring to the 1st ground truth and at least one of (1_1)-st characteristic information and its corresponding (1_1)-st task specific output, wherein the (1_n_1)-st loss is calculated by referring to the n-th ground truth and at least one of the (n_1)-st characteristic information and its corresponding (n_1)-st task specific output, wherein the (1_1_m)-th loss is calculated by referring to the 1st ground truth and at least one of (1_m)-th characteristic information and its corresponding (1_m)-th task specific output, and wherein the (1_n_m)-th loss is calculated by referring to the n-th ground truth and at least one of (n_m)-th characteristic information and its corresponding (n_m)-th task specific output, and (iii) a process of training the 1st surrogate network to the m-th surrogate network such that each of (iii-1) the (1_1_1)-st loss to the (1_n_1)-st loss to (iii-2) the (1_1_m)-th loss to the (1_n_m)-th loss is minimized, and wherein, at the step of (c), the master learning device performs or supports another device to perform (i) a process of transmitting each of the (1_1)-st loss to the (1_n)-th loss to each of the 1st learning device to the n-th learning device, wherein the (1_1)-st loss includes (1) at least one of the (1_1_1)-st loss to the (1_1_m)-th loss or (2) a 1st average loss calculated by averaging over the $(1\_1\_1)$-st loss to the $(1\_1\_m)$-th loss, and wherein the $(1\_n)$-th loss includes (1) at least one of the $(1\_n\_1)$-st loss to the $(1\_n\_m)$-th loss or (2) an n-th average loss calculated by averaging over the $(1\_n\_1)$-st loss to the $(1\_n\_m)$-th loss, to thereby allow each of the 1st learning device to the n-th learning device to (i-1) train each of the 1st obfuscation network to the n-th obfuscation network (i-1-A) such that each of (1) at least one of the $(1\_1\_1)$-st loss to the $(1\_1\_m)$-th loss to (2) at least one of the $(1\_n\_1)$-st loss to the $(1\_n\_m)$-th loss is minimized and such that each of a 1st obfuscated data score to an n-th obfuscated data score, respectively corresponding to the 1st obfuscated data to the n-th obfuscated data inputted respectively into the 1st discriminator to the n-th discriminator, is maximized, or (i-1-B) such that each of the 1st average loss to the n-th average loss is minimized and such that each of the 1st obfuscated data score to the n-th obfuscated data score is maximized, (i-2) train each of the 1st discriminator to the n-th discriminator such that each of the 1st obfuscated data score to the n-th obfuscated data score is minimized and such that each of a 1st modified data score or a 1st modified obfuscated data score to an n-th modified data score to an n-th modified obfuscated data score is maximized which correspond respectively to the 1st modified data or the 1st modified obfuscated data to the n-th modified data to the n-th modified obfuscated data respectively inputted into the 1st discriminator to the n-th discriminator, and (i-3) transmit the 1st network gradient to the n-th network gradient to the master learning device, and (ii) a process of updating the master obfuscation network by referring to the average network gradient.

As one example, the surrogate network includes a 1st surrogate network to an m-th surrogate network wherein m is an integer greater than 0, wherein, at the step of (a), the master learning device performs or supports another device to perform a process of acquiring a 1st sub-obfuscation pair comprised of the 1st ground truth and $(1\_1)$-st obfuscated data to an n-th sub-obfuscation pair comprised of the n-th ground truth and $(n\_1)$-st obfuscated data, wherein the $(1\_1)$-st obfuscated data is created by obfuscating the 1st original data through the 1st obfuscation network, and wherein the $(n\_1)$-st obfuscated data is created by obfuscating the n-th original data through the n-th obfuscation network, wherein, at the step of (b), the master learning device performs or supports another device to perform (i) a process of inputting each of the $(1\_1)$-st obfuscated data to the $(n\_1)$-st obfuscated data into the 1st surrogate network, to thereby allow the 1st surrogate network to apply at least one each learning operation to each of the $(1\_1)$-st obfuscated data to the $(n\_1)$-st obfuscated data and thus to generate $(1\_1)$-st characteristic information to $(n\_1)$-st characteristic information respectively corresponding to the $(1\_1)$-st obfuscated data to the $(n\_1)$-st obfuscated data, (ii) a process of calculating at least one $(1\_1\_1)$-st loss to at least one $(1\_n\_1)$-th loss wherein the $(1\_1\_1)$-st loss is calculated by referring to the 1st ground truth and at least one of the $(1\_1)$-st characteristic information and its corresponding $(1\_1)$-st task specific output and wherein the $(1\_n\_1)$-th loss is calculated by referring to the n-th ground truth and at least one of the $(n\_1)$-th characteristic information and its corresponding $(n\_1)$-th task specific output, and (iii) a process of training the surrogate network such that each of the $(1\_1\_1)$-st loss to the $(1\_n\_1)$-th loss is minimized or such that an average loss calculated by averaging over the $(1\_1\_1)$-st loss to the $(1\_n\_1)$-th loss is minimized, wherein, at the step of (b), the master learning device performs or supports another device to perform (i) a process of inputting each of the $(1\_1)$-st obfuscated data to the $(n\_1)$-st obfuscated data into the 1st surrogate network, to thereby allow the 1st surrogate network to apply at least one each learning operation to each of the $(1\_1)$-st obfuscated data to the $(n\_1)$-st obfuscated data and thus to generate $(1\_1)$-st characteristic information to $(n\_1)$-st characteristic information respectively corresponding to the $(1\_1)$-st obfuscated data to the $(n\_1)$-st obfuscated data, (ii) a process of calculating at least one $(1\_1\_1)$-st loss to at least one $(1\_n\_1)$-th loss wherein the $(1\_1\_1)$-st loss is calculated by referring to the 1st ground truth and at least one of the $(1\_1)$-st characteristic information and its corresponding $(1\_1)$-st task specific output and wherein the $(1\_n\_1)$-th loss is calculated by referring to the n-th ground truth and at least one of the $(n\_1)$-th characteristic information and its corresponding $(n\_1)$-th task specific output, and (iii) a process of training the surrogate network such that each of the $(1\_1\_1)$-st loss to the $(1\_n\_1)$-th loss is minimized or such that an average loss calculated by averaging over the $(1\_1\_1)$-st loss to the $(1\_n\_1)$-th loss is minimized, wherein, while increasing an integer k from 2 to m, the master learning device performs or supports another device to perform (I) a process of acquiring $(1\_k)$-th obfuscated data to $(n\_k)$-th obfuscated data, wherein the $(1\_k)$-th obfuscated data is created by obfuscating the 1st original data through a (k-1)-th trained 1st obfuscation network, and wherein the $(n\_k)$-th obfuscated data is created by obfuscating the n-th original data through a (k-1)-th trained n-th obfuscation network, (II) (II-1) a process of inputting the $(1\_k)$-th obfuscated data to the $(n\_k)$-th obfuscated data into a k-th surrogate network, to thereby allow the k-th surrogate network to apply each learning operation to each of the $(1\_k)$-th obfuscated data to the $(n\_k)$-th obfuscated data and thus to generate $(1\_k)$-th characteristic information to $(n\_k)$-th characteristic information respectively corresponding to the $(1\_k)$-th obfuscated data to the $(n\_k)$-th obfuscated data, (II-2) a process of calculating at least one $(1\_1\_k)$-th loss to at least one $(1\_n\_k)$-th loss, wherein the $(1\_1\_k)$-th loss is calculated by referring to the 1st ground truth and at least one of the $(1\_k)$-th characteristic information and its corresponding $(1\_k)$-th task specific output, and wherein the $(1\_n\_k)$-th loss is calculated by referring to the n-th ground truth and at least one of the $(n\_k)$-th characteristic information and its corresponding $(n\_k)$-th task specific output, and (II-3) a process of training the k-th surrogate network such that each of the $(1\_1\_k)$-th loss to the $(1\_n\_k)$-th loss is minimized, and (III) a process of transmitting each of the $(1\_1\_k)$-th loss to the $(1\_n\_k)$-th loss to each of the 1st learning device to the n-th learning device, to thereby allow each of the 1st learning device to the n-th learning device to (III-1) train each of the (k-1)-th trained 1st obfuscation network to the (k-1)-th trained n-th obfuscation network such that each of the $(1\_1\_k)$-th loss to the $(1\_n\_k)$-th loss is minimized and such that each of a $(1\_k)$-th obfuscated data score to an $(n\_k)$-th obfuscated data score is maximized, wherein each of the $(1\_k)$-th obfuscated data score to the $(n\_k)$-th obfuscated data score corresponds to each of the $(1\_k)$-th obfuscated data to the $(n\_k)$-th obfuscated data inputted into each of a (k-1)-th trained 1st discriminator to a (k-1)-th trained n-th discriminator, and thus to allow each of the (k-1)-th trained 1st obfuscation network to the (k-1)-th trained n-th obfuscation network to be each of a k-th trained 1st obfuscation network to a k-th trained n-th obfuscation network, and (III-2) train each of a (k-1)-th trained 1st discriminator to a (k-1)-th trained n-th discriminator such that each of the $(1\_k)$-th obfuscated data score to the $(n\_k)$-th obfuscated data score is minimized and such that each of a 1st modified data score or a 1st modified obfuscated data score to an n-th modified data score or an n-th modified obfuscated data score is maximized which corresponds respectively to the 1st modified data or the 1st modified obfuscated data to n-th modified data or n-th modified obfuscated data inputted respectively into a (k-1)-th trained 1st discriminator to a (k-1)-th trained n-th discriminator, and thus to allow each of the (k-1)-th trained 1st discriminator to the (k-1)-th trained n-th discriminator to be each of a k-th trained 1st discriminator to a k-th trained n-th discriminator, and wherein the master learning device performs or supports another device to perform (i) a process of allowing each of the 1st learning device to the n-th learning device to transmit to the master learning device each of the 1st network gradient of an m-th trained 1st obfuscation network to the n-th network gradient of an m-th trained n-th obfuscation network, and (ii) a process of updating the master obfuscation network by referring to the average network gradient which is averaged over the 1st network gradient to the n-th network gradient.

As one example, a maximum of a 1st modified data score or a 1st modified obfuscated data score to an n-th modified data score or an n-th modified obfuscated data score each of which corresponds respectively to the 1st modified data or the 1st modified obfuscated data to the n-th modified data or the n-th modified obfuscated data inputted respectively into the 1st discriminator to the n-th discriminator, is 1 as a value for determining the 1st modified data or the 1st modified obfuscated data to the n-th modified data or the n-th modified obfuscated data as real, and a minimum of the 1st obfuscated data score to the n-th obfuscated data score is 0 as a value for determining the 1st obfuscated data to the n-th obfuscated data as fake.

As one example, at the step of (c), supposing that a unit process of training the 1st obfuscation network to the n-th obfuscation network is an iteration, then for each of a preset number of iterations, the master learning device performs or supports another device to perform a process of allowing the 1st learning device to the n-th learning device to (i) transmit the 1st network gradient to the n-th network gradient to the master learning device, and (ii) update the master obfuscation network by referring to the average network gradient.

As one example, before the step of (a), the master learning device performs or supports another device to perform a process of transmitting the master obfuscation network to each of the 1st learning device to the n-th learning device, to thereby allow each of the 1st learning device to the n-th learning device to set each of initial networks of each of the 1st obfuscation network to the n-th obfuscation network as the master obfuscation network.

In accordance with another aspect of the present disclosure, there is provided a method for testing an obfuscation network, including steps of: (a) on condition that a master learning device has performed or supported another device to perform (i) a process of acquiring (1) a 1st obfuscation pair comprised of 1st obfuscated data and a 1st ground truth to (2) an n-th obfuscation pair comprised of n-th obfuscated data and an n-th ground truth respectively from a 1st learning device to an n-th learning device, wherein the 1st obfuscated data is created by obfuscating 1st original data through a 1st obfuscation network, wherein the 1st ground truth corresponds to the 1st original data, wherein the n-th obfuscated data is created by obfuscating n-th original data through an n-th obfuscation network, wherein the n-th ground truth corresponds to the n-th original data, wherein the 1st learning device corresponds to a 1st party which is determined as a 1st owner of the 1st original data and its corresponding 1st ground truth or is an entity to which the 1st original data and its corresponding 1st ground truth are delegated by the 1st owner, wherein the n-th learning device corresponds to an n-th party which is determined as an n-th owner of the n-th original data and its corresponding n-th ground truth or is an entity to which the n-th original data and its corresponding n-th ground truth are delegated by the n-th owner, and wherein n is an integer larger than 1, (ii) a process of inputting each of the 1st obfuscated data to the n-th obfuscated data into a surrogate network, to thereby allow the surrogate network to apply at least one each learning operation to each of the 1st obfuscated data to the n-th obfuscated data and thus to generate 1st characteristic information to n-th characteristic information respectively corresponding to the 1st obfuscated data to the n-th obfuscated data, (iii) a process of calculating at least one (1_1)-st loss to at least one (1_n)-th loss wherein the (1_1)-st loss is calculated by referring to the 1st ground truth and at least one of the 1st characteristic information and its corresponding 1st task specific output and wherein the (1_n)-th loss is calculated by referring to the n-th ground truth and at least one of the n-th characteristic information and its corresponding n-th task specific output, (iv) a process of training the surrogate network such that each of the (1_1)-st loss to the (1_n)-th loss is minimized or such that an average loss calculated by averaging over the (1_1)-st loss to the (1_n)-th loss is minimized, (v) a process of transmitting the (1_1)-st loss to the (1_n)-th loss respectively to the 1st learning device to the n-th learning device, to thereby allow each of the 1st learning device to the n-th learning device to (v-1) train each of the 1st obfuscation network to the n-th obfuscation network such that each of the (1_1)-st loss to the (1_n)-th loss is minimized and such that each of at least one (2_1)-st loss to at least one (2_n)-th loss is maximized wherein the (2_1)-st loss is calculated by referring to the 1st original data and the 1st obfuscated data and wherein the (2_n)-th loss is calculated by referring to the n-th original data and the n-th obfuscated data, and (v-2) transmit to the master learning device a 1st network gradient of the trained 1st obfuscation network to an n-th network gradient of the trained n-th obfuscation network, and (vi) a process of updating the master obfuscation network by referring to an average network gradient which is averaged over the 1st network gradient to the n-th network gradient, a testing device performing or supporting another device to perform a process of acquiring original data for testing to be used for concealing; and (b) the testing device performing or supporting another device to perform one of (i) a process of inputting the original data for testing into the master obfuscation network and (ii) a process of inputting the original data for testing into at least one of the 1st obfuscation network to the n-th obfuscation network, to thereby allow at least one of the master obfuscation network and the 1st obfuscation network to the n-th obfuscation network to obfuscate the original data for testing, and thus to generate obfuscated data for testing.

In accordance with still another aspect of the present disclosure, there is provided a master learning device for training one or more obfuscation networks which conceal original data to be used for machine learning and training one or more surrogate networks which use obfuscated data generated by the obfuscation networks, including: at least one memory that stores instructions; and at least one processor configured to execute the instructions to perform or support another device to perform: (I) a process of acquiring (i) a 1st obfuscation pair comprised of 1st obfuscated data and a 1st ground truth to (ii) an n-th obfuscation pair comprised of n-th obfuscated data and an n-th ground truth respectively from a 1st learning device to an n-th learning device, wherein the 1st obfuscated data is created by obfuscating 1st original data through a 1st obfuscation network, wherein the 1st ground truth corresponds to the 1st original data, wherein the n-th obfuscated data is created by obfuscating n-th original data through an n-th obfuscation network, wherein the n-th ground truth corresponds to the n-th original data, wherein the 1st learning device corresponds to a 1st party which is determined as a 1st owner of the 1st original data and its corresponding 1st ground truth or is an entity to which the 1st original data and its corresponding 1st ground truth are delegated by the 1st owner, wherein the n-th learning device corresponds to an n-th party which is determined as an n-th owner of the n-th original data and its corresponding n-th ground truth or is an entity to which the n-th original data and its corresponding n-th ground truth are delegated by the n-th owner, and wherein n is an integer larger than 1, (II) (i) a process of inputting each of the 1st obfuscated data to the n-th obfuscated data into a surrogate network, to thereby allow the surrogate network to apply at least one each learning operation to each of the 1st obfuscated data to the n-th obfuscated data and thus to generate 1st characteristic information to n-th characteristic information respectively corresponding to the 1st obfuscated data to the n-th obfuscated data, (ii) a process of calculating at least one (1_1)-st loss to at least one (1_n)-th loss wherein the (1_1)-st loss is calculated by referring to the 1st ground truth and at least one of the 1st characteristic information and its corresponding 1st task specific output and wherein the (1_n)-th loss is calculated by referring to the n-th ground truth and at least one of the n-th characteristic information and its corresponding n-th task specific output, and (iii) a process of training the surrogate network such that each of the (1_1)-st loss to the (1_n)-th loss is minimized or such that an average loss calculated by averaging over the (1_1)-st loss to the (1_n)-th loss is minimized, and (III) (i) a process of transmitting the (1_1)-st loss to the (1_n)-th loss respectively to the 1st learning device to the n-th learning device, to thereby allow each of the 1st learning device to the n-th learning device to (i-1) train each of the 1st obfuscation network to the n-th obfuscation network such that each of the (1_1)-st loss to the (1_n)-th loss is minimized and such that each of at least one (2_1)-st loss to at least one (2_n)-th loss is maximized wherein the (2_1)-st loss is calculated by referring to the 1st original data and the 1st obfuscated data and wherein the (2_n)-th loss is calculated by referring to the n-th original data and the n-th obfuscated data, and (i-2) transmit to the master learning device a 1st network gradient of the trained 1st obfuscation network to an n-th network gradient of the trained n-th obfuscation network, and (ii) a process of updating the master obfuscation network by referring to an average network gradient which is averaged over the 1st network gradient to the n-th network gradient.

As one example, the surrogate network includes a 1st surrogate network to an m-th surrogate network and wherein m is an integer greater than 0, wherein, at the process of (II), the processor performs or supports another device to perform (i) a process of inputting all of the 1st obfuscated data to the n-th obfuscated data into each of the 1st surrogate network to the m-th surrogate network, to thereby allow each of the 1st surrogate network to the m-th surrogate network to apply each learning operation to all of the 1st obfuscated data to the n-th obfuscated data, and thus to generate (i-1) (1_1)-st characteristic information to (n_1)-st characteristic information to (i-2) (1_m)-th characteristic information to (n_m)-th characteristic information, (ii) a process of calculating (ii-1) at least one (1_1_1)-st loss to at least one (1_n_1)-st loss to (ii-2) at least one (1_1_m)-th loss to at least one (1_n_m)-th loss, wherein the (1_1_1)-st loss is calculated by referring to the 1st ground truth and at least one of (1_1)-st characteristic information and its corresponding (1_1)-st task specific output, wherein the (1_n_1)-st loss is calculated by referring to the n-th ground truth and at least one of the (n_1)-st characteristic information and its corresponding (n_1)-st task specific output, wherein the (1_1_m)-th loss is calculated by referring to the 1st ground truth and at least one of (1_m)-th characteristic information and its corresponding (1_m)-th task specific output, and wherein the (1_n_m)-th loss is calculated by referring to the n-th ground truth and at least one of (n_m)-th characteristic information and its corresponding (n_m)-th task specific output, and (iii) a process of training the 1st surrogate network to the m-th surrogate network such that each of (iii-1) the (1_1_1)-st loss to the (1_n_1)-st loss to (iii-2) the (1_1_m)-th loss to the (1_n_m)-th loss is minimized, wherein, at the process of (III), the processor performs or supports another device to perform (i) a process of transmitting each of the (1_1)-st loss to the (1_n)-th loss to each of the 1st learning device to the n-th learning device wherein the (1_1)-st loss includes (1) at least one of the (1_1_1)-st loss to the (1_1_m)-th loss or (2) a 1st average loss calculated by averaging over the (1_1_1)-st loss to the (1_1_m)-th loss and wherein the (1_n)-th loss includes (1) at least one of the (1_n_1)-st loss to the (1_n_m)-th loss or (2) an n-th average loss calculated by averaging over the (1_n_1)-st loss to the (1_n_m)-th loss, to thereby allow each of the 1st learning device to the n-th learning device to (i-1) train each of the 1st obfuscation network to the n-th obfuscation network such that each of the (1_1)-st loss to the (1_n)-th loss is minimized and such that each of the (2_1)-st loss to the (2_n)-th loss is maximized, and (i-2) transmit the 1st network gradient to the n-th network gradient to the master learning device, and (ii) a process of updating the master obfuscation network by referring to the average network gradient.

As one example, the surrogate network includes a 1st surrogate network to an m-th surrogate network and wherein m is an integer greater than 0, wherein, at the process of (I), the processor performs or supports another device to perform a process of acquiring a 1st sub-obfuscation pair comprised of the 1st ground truth and (1_1)-st obfuscated data to an n-th sub-obfuscation pair comprised of the n-th ground truth and (n_1)-st obfuscated data, wherein the (1_1)-st obfuscated data is created by obfuscating the 1st original data through the 1st obfuscation network, and wherein the (n_1)-st obfuscated data is created by obfuscating the n-th original data through the n-th obfuscation network, wherein, at the process of (II), the processor performs or supports another device to perform (i) a process of inputting each of the (1_1)-st obfuscated data to the (n_1)-st obfuscated data into the 1st surrogate network, to thereby allow the 1st surrogate network to apply at least one each learning operation to each of the (1_1)-st obfuscated data to the (n_1)-st obfuscated data and thus to generate (1_1)-st characteristic information to (n_1)-st characteristic information respectively corresponding to the (1_1)-st obfuscated data to the (n_1)-st obfuscated data, (ii) a process of calculating at least one (1_1_1)-st loss to at least one (1_n_1)-th loss wherein the (1_1_1)-st loss is calculated by referring to the 1st ground truth and at least one of the (1_1)-st characteristic information and its corresponding (1_1)-st task specific output and wherein the (1_n_1)-th loss is calculated by referring to the n-th ground truth and at least one of the (n_1)-th characteristic information and its corresponding (n_1)-th task specific output, and (iii) a process of training the surrogate network such that each of the (1_1_1)-st loss to the (1_n_1)-th loss is minimized or such that an average loss calculated by averaging over the (1_1_1)-st loss to the (1_n_1)-th loss is minimized, wherein, at the process of (III), the processor performs or supports another device to perform a process of transmitting the (1_1_1)-st loss to the (1_n_1)-th loss respectively to the 1st learning device to the n-th learning device, to thereby allow each of the 1st learning device to the n-th learning device to (i-1) train each of the 1st obfuscation network to the n-th obfuscation network such that each of the (1_1_1)-st loss to the (1_n_1)-th loss is minimized and such that each of at least one (2_1_1)-st loss to at least one (2_n_1)-th loss is maximized wherein the (2_1_1)-st loss is calculated by referring to the 1st original data and the (1_1)-st obfuscated data and wherein the (2_n_1)-th loss is calculated by referring to the n-th original data and the (n_1)-th obfuscated data, and, as a result, a process of allowing each of the 1st obfuscation network to the n-th obfuscation network to be each of a 1st trained 1st obfuscation network to a 1st trained n-th obfuscation network, wherein, while increasing an integer k from 2 to m, the processor performs or supports another device to perform (i) a process of acquiring (1_k)-th obfuscated data to (n_k)-th obfuscated data, wherein the (1_k)-th obfuscated data is created by obfuscating the 1st original data through a (k-1)-th trained 1st obfuscation network, and wherein the (n_k)-th obfuscated data is created by obfuscating the n-th original data through a (k-1)-th trained n-th obfuscation network, (ii) (ii-1) a process of inputting the (1_k)-th obfuscated data to the (n_k)-th obfuscated data into a k-th surrogate network, to thereby allow the k-th surrogate network to apply each learning operation to each of the (1_k)-th obfuscated data to the (n_k)-th obfuscated data and thus to generate (1_k)-th characteristic information to (n_k)-th characteristic information respectively corresponding to the (1_k)-th obfuscated data to the (n_k)-th obfuscated data, (ii-2) a process of calculating at least one (1_1_k)-th loss to at least one (1_n_k)-th loss, wherein the (1_1_k)-th loss is calculated by referring to the 1st ground truth and at least one of the (1_k)-th characteristic information and its corresponding (1_k)-th task specific output, and wherein the (1_n_k)-th loss is calculated by referring to the n-th ground truth and at least one of the (n_k)-th characteristic information and its corresponding (n_k)-th task specific output, and (ii-3) a process of training the k-th surrogate network such that each of the (1_1_k)-th loss to the (1_n_k)-th loss is minimized, and (iii) a process of transmitting each of the (1_1_k)-th loss to the (1_n_k)-th loss to each of the 1st learning device to the n-th learning device, to thereby allow each of the 1st learning device to the n-th learning device to (iii-1) train each of the (k-1)-th trained 1st obfuscation network to the (k-1)-th trained n-th obfuscation network such that each of the (1_1_k)-th loss to the (1_n_k)-th loss is minimized and such that each of (2_1_k)-th loss to (2_n_k)-th loss is maximized, wherein the (2_1_k)-th loss is calculated by referring to the 1st original data and the (1_k)-th obfuscated data, and wherein the (2_n_k)-th loss is calculated by referring to the n-th original data and the (n_k)-th obfuscated data and thus (iii-2) allow each of the (k-1)-th trained 1st obfuscation network to the (k-1)-th trained n-th obfuscation network to be each of a k-th trained 1st obfuscation network to a k-th trained n-th obfuscation network, and wherein the processor performs or supports another device to perform (i) a process of allowing each of the 1st learning device to the n-th learning device to transmit to the master learning device each of the 1st network gradient of an m-th trained 1st obfuscation network to the n-th network gradient of an m-th trained n-th obfuscation network, and (ii) a process of updating the master obfuscation network by referring to the average network gradient which is averaged over the 1st network gradient to the n-th network gradient.

As one example, at the process of (III), on condition that a 1st obfuscated data score to an n-th obfuscated data score have been acquired respectively as the (2_1)-st loss to the (2_n)-th loss wherein the 1st obfuscated data score to the n-th obfuscated data score respectively correspond to the 1st obfuscated data to the n-th obfuscated data respectively inputted into a 1st discriminator to an n-th discriminator to be used for determining whether their inputted data is real or fake, the processor performs or supports another device to perform a process of transmitting each of the (1_1)-st loss to the (1_n)-th loss to each of the 1st learning device to the n-th learning device, to thereby allow each of the 1st learning device to the n-th learning device to (i) train each of the 1st obfuscation network to the n-th obfuscation network such that each of the (1_1)-st loss to the (1_n)-th loss is minimized and such that each of the (2_1)-st loss to the (2_n)-th loss is maximized, and (ii) train each of the 1st discriminator to the n-th discriminator such that each of the 1st obfuscated data score to the n-th obfuscated data score is minimized and such that each of a 1st modified data score or a 1st modified obfuscated data score to an n-th modified data score or an n-th modified obfuscated data score is maximized, wherein the 1st modified data score or the 1st modified obfuscated data score to the n-th modified data score or the n-th modified obfuscated data score respectively correspond to the 1st modified data or the 1st modified obfuscated data to the n-th modified data or the n-th modified obfuscated data respectively inputted into the 1st discriminator to the n-th discriminator, wherein the 1st modified data or the 1st modified obfuscated data is created by respectively modifying the 1st original data or the 1st obfuscated data, and wherein the n-th modified data or the n-th modified obfuscated data is created by respectively modifying the n-th original data or the n-th obfuscated data.

As one example, the surrogate network includes a 1st surrogate network to an m-th surrogate network wherein m is an integer greater than 0, wherein, at the process of (II), the processor performs or supports another device to perform (i) a process of inputting each of the 1st obfuscated data to the n-th obfuscated data into each of the 1st surrogate network to the m-th surrogate network, to thereby allow each of the 1st surrogate network to the m-th surrogate network to apply each learning operation to each of the 1st obfuscated data to the n-th obfuscated data, and thus to generate (i-1) (1_1)-st characteristic information to (n_1)-st characteristic information to (i-2) (1_m)-th characteristic information to (n_m)-th characteristic information, (ii) a process of calculating (ii-1) at least one (1_1_1)-st loss to at least one (1_n_1)-st loss to (ii-2) at least one (1_1_m)-th loss to at least one (1_n_m)-th loss, wherein the (1_1_1)-st loss is calculated by referring to the 1st ground truth and at least one of (1_1)-st characteristic information and its corresponding (1_1)-st task specific output, wherein the (1_n_1)-st loss is calculated by referring to the n-th ground truth and at least one of the (n_1)-st characteristic information and its corresponding (n_1)-st task specific output, wherein the (1_1_m)-th loss is calculated by referring to the 1st ground truth and at least one of (1_m)-th characteristic information and its corresponding (1_m)-th task specific output, and wherein the (1_n_m)-th loss is calculated by referring to the n-th ground truth and at least one of (n_m)-th characteristic information and its corresponding (n_m)-th task specific output, and (iii) a process of training the 1st surrogate network to the m-th surrogate network such that each of (iii-1) the (1_1_1)-st loss to the (1_n_1)-st loss to (iii-2) the (1_1_m)-th loss to the (1_n_m)-th loss is minimized, and wherein, at the process of (III), the processor performs or supports another device to perform (i) a process of transmitting each of the (1_1)-st loss to the (1_n)-th loss to each of the 1st learning device to the n-th learning device, wherein the (1_1)-st loss includes (1) at least one of the (1_1_1)-st loss to the (1_1_m)-th loss or (2) a 1st average loss calculated by averaging over the (1_1_1)-st loss to the (1_1_m)-th loss, and wherein the (1_n)-th loss includes (1) at least one of the (1_n_1)-st loss to the (1_n_m)-th loss or (2) an n-th average loss calculated by averaging over the (1_n_1)-st loss to the (1_n_m)-th loss, to thereby allow each of the 1st learning device to the n-th learning device to (i-1) train each of the 1st obfuscation network to the n-th obfuscation network (i-1-A) such that each of (1) at least one of the (1_1_1)-st loss to the (1_1_m)-th loss to (2) at least one of the (1_n_1)-st loss to the (1_n_m)-th loss is minimized and such that each of a 1st obfuscated data score to an n-th obfuscated data score, respectively corresponding to the 1st obfuscated data to the n-th obfuscated data inputted respectively into the 1st discriminator to the n-th discriminator, is maximized, or (i-1-B) such that each of the 1st average loss to the n-th average loss is minimized and such that each of the 1st obfuscated data score to the n-th obfuscated data score is maximized, (i-2) train each of the 1st discriminator to the n-th discriminator such that each of the 1st obfuscated data score to the n-th obfuscated data score is minimized and such that each of a 1st modified data score or a 1st modified obfuscated data score to an n-th modified data score to an n-th modified obfuscated data score is maximized which correspond respectively to the 1st modified data or the 1st modified obfuscated data to the n-th modified data to the n-th modified obfuscated data respectively inputted into the 1st discriminator to the n-th discriminator, and (i-3) transmit the 1st network gradient to the n-th network gradient to the master learning device, and (ii) a process of updating the master obfuscation network by referring to the average network gradient.

As one example, the surrogate network includes a 1st surrogate network to an m-th surrogate network wherein m is an integer greater than 0, wherein, at the process of (I), the processor performs or supports another device to perform a process of acquiring a 1st sub-obfuscation pair comprised of the 1st ground truth and (1_1)-st obfuscated data to an n-th sub-obfuscation pair comprised of the n-th ground truth and (n_1)-st obfuscated data, wherein the (1_1)-st obfuscated data is created by obfuscating the 1st original data through the 1st obfuscation network, and wherein the (n_1)-st obfuscated data is created by obfuscating the n-th original data through the n-th obfuscation network, wherein, at the process of (II), the processor performs or supports another device to perform (i) a process of inputting each of the (1_1)-st obfuscated data to the (n_1)-st obfuscated data into the 1st surrogate network, to thereby allow the 1st surrogate network to apply at least one each learning operation to each of the (1_1)-st obfuscated data to the (n_1)-st obfuscated data and thus to generate (1_1)-st characteristic information to (n_1)-st characteristic information respectively corresponding to the (1_1)-st obfuscated data to the (n_1)-st obfuscated data, (ii) a process of calculating at least one (1_1_1)-st loss to at least one (1_n_1)-th loss wherein the (1_1_1)-st loss is calculated by referring to the 1st ground truth and at least one of the (1_1)-st characteristic information and its corresponding (1_1)-st task specific output and wherein the (1_n_1)-th loss is calculated by referring to the n-th ground truth and at least one of the (n_1)-th characteristic information and its corresponding (n_1)-th task specific output, and (iii) a process of training the surrogate network such that each of the (1_1_1)-st loss to the (1_n_1)-th loss is minimized or such that an average loss calculated by averaging over the (1_1_1)-st loss to the (1_n_1)-th loss is minimized, wherein, at the process of (II), the processor performs or supports another device to perform (i) a process of inputting each of the (1_1)-st obfuscated data to the (n_1)-st obfuscated data into the 1st surrogate network, to thereby allow the 1st surrogate network to apply at least one each learning operation to each of the (1_1)-st obfuscated data to the (n_1)-st obfuscated data and thus to generate (1_1)-st characteristic information to (n_1)-st characteristic information respectively corresponding to the (1_1)-st obfuscated data to the (n_1)-st obfuscated data, (ii) a process of calculating at least one (1_1_1)-st loss to at least one (1_n_1)-th loss wherein the (1_1_1)-st loss is calculated by referring to the 1st ground truth and at least one of the (1_1)-st characteristic information and its corresponding (1_1)-st task specific output and wherein the (1_n_1)-th loss is calculated by referring to the n-th ground truth and at least one of the (n_1)-th characteristic information and its corresponding (n_1)-th task specific output, and (iii) a process of training the surrogate network such that each of the (1_1_1)-st loss to the (1_n_1)-th loss is minimized or such that an average loss calculated by averaging over the (1_1_1)-st loss to the (1_n_1)-th loss is minimized, wherein, while increasing an integer k from 2 to m, the processor performs or supports another device to perform (i) a process of acquiring (1_k)-th obfuscated data to (n_k)-th obfuscated data, wherein the (1_k)-th obfuscated data is created by obfuscating the 1st original data through a (k-1)-th trained 1st obfuscation network, and wherein the (n_k)-th obfuscated data is created by obfuscating the n-th original data through a (k-1)-th trained n-th obfuscation network, (ii) (ii-1) a process of inputting the (1_k)-th obfuscated data to the (n_k)-th obfuscated data into a k-th surrogate network, to thereby allow the k-th surrogate network to apply each learning operation to each of the (1_k)-th obfuscated data to the (n_k)-th obfuscated data and thus to generate (1_k)-th characteristic information to (n_k)-th characteristic information respectively corresponding to the (1_k)-th obfuscated data to the (n_k)-th obfuscated data, (ii-2) a process of calculating at least one (1_1_k)-th loss to at least one (1_n_k)-th loss, wherein the (1_1_k)-th loss is calculated by referring to the 1st ground truth and at least one of the (1_k)-th characteristic information and its corresponding (1_k)-th task specific output, and wherein the (1_n_k)-th loss is calculated by referring to the n-th ground truth and at least one of the (n_k)-th characteristic information and its corresponding (n_k)-th task specific output, and (ii-3) a process of training the k-th surrogate network such that each of the (1_1_k)-th loss to the (1_n_k)-th loss is minimized, and (iii) a process of transmitting each of the (1_1_k)-th loss to the (1_n_k)-th loss to each of the 1st learning device to the n-th learning device, to thereby allow each of the 1st learning device to the n-th learning device to (iii-1) train each of the (k-1)-th trained 1st obfuscation network to the (k-1)-th trained n-th obfuscation network such that each of the (1_1_k)-th loss to the (1_n_k)-th loss is minimized and such that each of a (1_k)-th obfuscated data score to an (n_k)-th obfuscated data score is maximized, wherein each of the (1_k)-th obfuscated data score to the (n_k)-th obfuscated data score corresponds to each of the (1_k)-th obfuscated data to the (n_k)-th obfuscated data inputted into each of a (k-1)-th trained 1st discriminator to a (k-1)-th trained n-th discriminator, and thus to allow each of the (k-1)-th trained 1st obfuscation network to the (k-1)-th trained n-th obfuscation network to be each of a k-th trained 1st obfuscation network to a k-th trained n-th obfuscation network, and (iii-2) train each of a (k-1)-th trained 1st discriminator to a (k-1)-th trained n-th discriminator such that each of the (1_k)-th obfuscated data score to the (n_k)-th obfuscated data score is minimized and such that each of a 1st modified data score or a 1st modified obfuscated data score to an n-th modified data score or an n-th modified obfuscated data score is maximized which corresponds respectively to the 1st modified data or the 1st modified obfuscated data to n-th modified data or n-th modified obfuscated data inputted respectively into a (k-1)-th trained 1st discriminator to a (k-1)-th trained n-th discriminator, and thus to allow each of the (k-1)-th trained 1st discriminator to the (k-1)-th trained n-th discriminator to be each of a k-th trained 1st discriminator to a k-th trained n-th discriminator, and wherein the processor performs or supports another device to perform (i) a process of allowing each of the 1st learning device to the n-th learning device to transmit to the master learning device each of the 1st network gradient of an m-th trained 1st obfuscation network to the n-th network gradient of an m-th trained n-th obfuscation network, and (ii) a process of updating the master obfuscation network by referring to the average network gradient which is averaged over the 1st network gradient to the n-th network gradient.

As one example, a maximum of a 1st modified data score or a 1st modified obfuscated data score to an n-th modified data score or an n-th modified obfuscated data score each of which corresponds respectively to the 1st modified data or the 1st modified obfuscated data to the n-th modified data or the n-th modified obfuscated data inputted respectively into the 1st discriminator to the n-th discriminator, is 1 as a value for determining the 1st modified data or the 1st modified obfuscated data to the n-th modified data or the n-th modified obfuscated data as real, and a minimum of the 1st obfuscated data score to the n-th obfuscated data score is 0 as a value for determining the 1st obfuscated data to the n-th obfuscated data as fake.

As one example, at the process of (III), supposing that a unit process of training the 1st obfuscation network to the n-th obfuscation network is an iteration, then for each of a preset number of iterations, the processor performs or supports another device to perform a process of allowing the 1st learning device to the n-th learning device to (i) transmit the 1st network gradient to the n-th network gradient to the master learning device, and (ii) update the master obfuscation network by referring to the average network gradient.

As one example, before the process of (I), the processor performs or supports another device to perform a process of transmitting the master obfuscation network to each of the 1st learning device to the n-th learning device, to thereby allow each of the 1st learning device to the n-th learning device to set each of initial networks of each of the 1st obfuscation network to the n-th obfuscation network as the master obfuscation network.

In accordance with still yet another aspect of the present disclosure, there is provided a testing device for testing an obfuscation network, including: at least one memory that stores instructions; and at least one processor configured to execute the instructions to perform or support another device to perform: (I) on condition that a master learning device has performed or supported another device to perform (i) a process of acquiring (1) a 1st obfuscation pair comprised of 1st obfuscated data and a 1st ground truth to (2) an n-th obfuscation pair comprised of n-th obfuscated data and an n-th ground truth respectively from a 1st learning device to an n-th learning device, wherein the 1st obfuscated data is created by obfuscating 1st original data through a 1st obfuscation network, wherein the 1st ground truth corresponds to the 1st original data, wherein the n-th obfuscated data is created by obfuscating n-th original data through an n-th obfuscation network, wherein the n-th ground truth corresponds to the n-th original data, wherein the 1st learning device corresponds to a 1st party which is determined as a 1st owner of the 1st original data and its corresponding 1st ground truth or is an entity to which the 1st original data and its corresponding 1st ground truth are delegated by the 1st owner, wherein the n-th learning device corresponds to an n-th party which is determined as an n-th owner of the n-th original data and its corresponding n-th ground truth or is an entity to which the n-th original data and its corresponding n-th ground truth are delegated by the n-th owner, and wherein n is an integer larger than 1, (ii) a process of inputting each of the 1st obfuscated data to the n-th obfuscated data into a surrogate network, to thereby allow the surrogate network to apply at least one each learning operation to each of the 1st obfuscated data to the n-th obfuscated data and thus to generate 1st characteristic information to n-th characteristic information respectively corresponding to the 1st obfuscated data to the n-th obfuscated data, (iii) a process of calculating at least one (1_1)-st loss to at least one (1_n)-th loss wherein the (1_1)-st loss is calculated by referring to the 1st ground truth and at least one of the 1st characteristic information and its corresponding 1st task specific output and wherein the (1_n)-th loss is calculated by referring to the n-th ground truth and at least one of the n-th characteristic information and its corresponding n-th task specific output, (iv) a process of training the surrogate network such that each of the (1_1)-st loss to the (1_n)-th loss is minimized or such that an average loss calculated by averaging over the (1_1)-st loss to the (1_n)-th loss is minimized, (v) a process of transmitting the (1_1)-st loss to the (1_n)-th loss respectively to the 1st learning device to the n-th learning device, to thereby allow each of the 1st learning device to the n-th learning device to (v-1) train each of the 1st obfuscation network to the n-th obfuscation network such that each of the (1_1)-st loss to the (1_n)-th loss is minimized and such that each of at least one (2_1)-st loss to at least one (2_n)-th loss is maximized wherein the (2_1)-st loss is calculated by referring to the 1st original data and the 1st obfuscated data and wherein the (2_n)-th loss is calculated by referring to the n-th original data and the n-th obfuscated data, and (v-2) transmit to the master learning device a 1st network gradient of the trained 1st obfuscation network to an n-th network gradient of the trained n-th obfuscation network, and (vi) a process of updating the master obfuscation network by referring to an average network gradient which is averaged over the 1st network gradient to the n-th network gradient, a process of acquiring original data for testing to be used for concealing, and (II) (i) a process of inputting the original data for testing into the master obfuscation network and (ii) a process of inputting the original data for testing into at least one of the 1st obfuscation network to the n-th obfuscation network, to thereby allow at least one of the master obfuscation network and the 1st obfuscation network to the n-th obfuscation network to obfuscate the original data for testing, and thus to generate obfuscated data for testing.

In addition, recordable media that are readable by a computer for storing a computer program to execute the method of the present disclosure are further provided.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
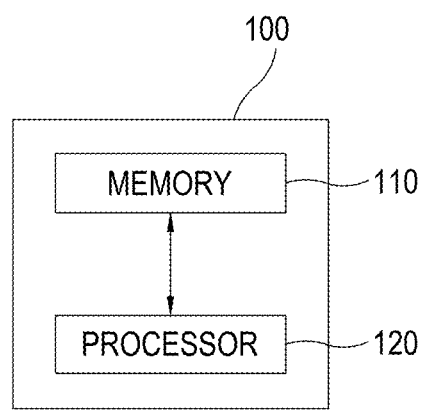
FIG. 1 is a drawing schematically illustrating a learning device for training one or more obfuscation networks which conceal, i.e., anonymize, original data and one or more surrogate networks which use obfuscated data generated by the obfuscation networks in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein may be implemented as being changed from an embodiment to other embodiments without departing from the spirit and scope of the present disclosure. In addition, it is to be understood that the position or arrangement of individual elements within each embodiment may be modified without departing from the spirit and scope of the present disclosure. The following detailed description is, therefore, not to be taken in a limiting sense, and the scope of the present disclosure is described as including the appended claims, along with the full range of equivalents to which the claims are entitled. In the drawings, like numerals refer to the same or similar components throughout the several aspects.

The headings and abstract of the present disclosure provided herein are for convenience only and do not limit or interpret the scope or meaning of the embodiments.

For reference, throughout the present disclosure, the phrase "for training" or "training" is added for terms related to training processes, and the phrase "for testing" or "testing" is added for terms related to testing processes, to avoid possible confusion.

To allow those skilled in the art to carry out the present disclosure easily, the example embodiments of the present disclosure will be explained in detail as shown below by referring to attached drawings. The drawings may contain text or captions that may explain certain embodiments of the present disclosure. This text is included for illustrative, non-limiting, explanatory purposes of certain embodiments detailed in the present disclosure. In further aspects, the dashed lines contained in the drawings illustrate or otherwise represent an arbitrary image pattern.

FIG. 1 is a drawing schematically illustrating a learning device for training one or more obfuscation networks which conceal, i.e., anonymize, original data and training at least one surrogate network which uses obfuscated data generated by the obfuscation networks in accordance with one example embodiment of the present disclosure.

By referring to FIG. 1, the a master learning device 100 in accordance with one example embodiment of the present disclosure may include a memory 110 for storing instructions to (i) train the surrogate network to output a 1st result calculated by using the obfuscated data as an input, same as or similar to a 2-nd result calculated by using the original data as an input and (ii) train a master obfuscation network by interacting with each of a 1st learning device 200_1 to an n-th learning device 200_n to be used for training each of a 1st obfuscation network to an n-th obfuscation network, and a processor 120 for performing processes of (i) training the surrogate network and (ii) training the master obfuscation network by interacting with each of the 1st learning device 200_1 to the n-th learning device 200_n to be used for training each of the 1st obfuscation network to the n-th obfuscation network according to the instructions in the memory 110.

Specifically, the master learning device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS (operating system) and software configuration of applications that achieve specific purposes.

Such description of the computing device does not exclude an integrated device including any combination of a processor, a memory, a medium, or any other computing components for implementing the present disclosure.

The master learning device 100 may perform or support another device to perform a process of acquiring (i) a 1st obfuscation pair comprised of 1st obfuscated data and a 1st ground truth to (ii) an n-th obfuscation pair comprised of n-th obfuscated data and an n-th ground truth respectively from the 1st learning device 200_1 to the n-th learning device 200_n. Herein, (i) the 1st obfuscated data may be created by obfuscating 1st original data through a 1st obfuscation network and the 1st ground truth may correspond to the 1st original data, and (ii) the n-th obfuscated data may be created by obfuscating n-th original data through an n-th obfuscation network and the n-th ground truth may correspond to the n-th original data, that is, supposing that an integer r satisfies a condition $1 \leq r \leq n$, the r-th obfuscated data may be created by obfuscating the r-th original data through the r-th obfuscation network and the r-th ground truth may correspond to the r-th original data. Further, each of the 1st learning device 200_1 to the n-th learning device 200_n may correspond to each of a 1st party to an n-th party. Then, according to the instructions stored in the memory 110, the processor 120 of the master learning device 100 may perform or support another device to perform (i) a process of inputting the 1st obfuscated data to the n-th obfuscated data into the surrogate network, to thereby allow the surrogate network to apply at least one each learning operation to each of the 1st obfuscated data to the n-th obfuscated data and thus to generate 1st characteristic information to n-th characteristic information respectively corresponding to the 1st obfuscated data to the n-th obfuscated data, (ii) a process of calculating at least one (1_1)-st loss to at least one (1_n)-th loss where the (1_1)-st loss may be calculated by referring to the 1st ground truth and at least one of the 1st characteristic information and its corresponding 1st task specific output and where the (1_n)-th loss may be calculated by referring to the n-th ground truth and at least one of the n-th characteristic information and its corresponding n-th task specific output, that is, supposing that the integer r satisfies the condition $1 \leq r \leq n$, the (1_r)-th loss may be calculated by referring to the r-th ground truth and at least one of the r-th characteristic information and its corresponding r-th task specific output, and (iii) a process of training the surrogate network such that each of the (1_1)-st loss to the (1_n)-th loss is minimized or such that an average loss calculated by averaging over the (1_1)-st loss to the (1_n)-th loss is minimized. And, the processor 120 may perform or support another device to perform (i) a process of transmitting each of the (1_1)-st loss to the (1_n)-th loss to each of the 1st learning device 200_1 to the n-th learning device 200_n, to thereby allow each of the 1st learning device 200_1 to the n-th learning device 200_n to (i-1) train each of the 1st obfuscation network to the n-th obfuscation network such that each of the (1_1)-st loss to the (1_n)-th loss is minimized and such that each of at least one (2_1)-st loss to at least one (2_n)-th loss is maximized where the (2_1)-st loss may be calculated by referring to the 1st original data and the 1st obfuscated data and where the (2_n)-th loss may be calculated by referring to the n-th original data and the n-th obfuscated data, that is, supposing that the integer r satisfies the condition $1 \leq r \leq n$, the (2_r)-th loss may be calculated by referring to the r-th original data and the r-th obfuscated data, and (i-2) transmit to the master learning device a 1st network gradient of the trained 1st obfuscation network to an n-th network gradient of the trained n-th obfuscation network, and (ii) a process of updating the master obfuscation network by referring to an average network gradient which is averaged over the 1st network gradient to the n-th network gradient.

Herein, each of the 1st party to the n-th party may be (i) each of a 1st owner to an n-th owner of each of the 1st original data and its corresponding 1st ground truth to the n-th original data and its corresponding n-th ground truth or (ii) each of entities to which each of the 1st original data and its corresponding 1st ground truth to the n-th original data and its corresponding n-th ground truth is delegated by each of the 1st owner to the n-th owner, and n may be an integer larger than 1.

Also, on condition that a 1st obfuscated data score to an n-th obfuscated data score have been acquired respectively as the (2_1)-st loss to the (2_n)-th loss, where the 1st obfuscated data score to the n-th obfuscated data score respectively correspond to the 1st obfuscated data to the n-th obfuscated data respectively inputted into a 1st discriminator to an n-th discriminator to be used for determining whether their inputted data is real or fake, the processor 120 may perform or support another device to perform a process of transmitting each of the (1_1)-st loss to the (1_n)-th loss to each of the 1st learning device 200_1 to the n-th learning device 200_n, to thereby allow each of the 1st learning device to the n-th learning device to (i) train each of the 1st obfuscation network to the n-th obfuscation network such that each of the (1_1)-st loss to the (1_n)-th loss is minimized and such that each of the (2_1)-st loss to the (2_n)-th loss is maximized, and (ii) train each of the 1st discriminator to the n-th discriminator such that each of the 1st obfuscated data score to the n-th obfuscated data score is minimized and such that (ii-1) each of a 1st modified data score or a 1st modified obfuscated data score to (ii-2) each of an n-th modified data score or an n-th modified obfuscated data score is maximized. Herein, (1) the 1st modified data score or the 1st modified obfuscated data score to (2) the n-th modified data score or the n-th modified obfuscated data score may respectively correspond to (1) the 1st modified data or the 1st modified obfuscated data to (2) the n-th modified data or the n-th modified obfuscated data respectively inputted into the 1st discriminator to the n-th discriminator.

Also, (1) the 1st modified data or the 1st modified obfuscated data to (2) the n-th modified data or the n-th modified obfuscated data may be generated by respectively modifying (1) the 1st original data or the 1st obfuscated data to (2) the n-th original data or the n-th obfuscated data. That is, supposing that the integer r satisfies the condition $1 \leq r \leq n$, the r-th modified data or the r-th modified obfuscated data may be created by respectively modifying the r-th original data or the r-th obfuscated data.

And, each of the 1st learning device 200_1 to the n-th learning device 200_n may perform or support another device to perform a process of training each of the 1st obfuscation network to the n-th obfuscation network by using each of the (1_1)-st loss to the (1_n)-th loss transmitted from the master learning device 100. Herein, each of the 1st learning device 200_1 to the n-th learning device 200_n may include each of memories (not illustrated) for storing instructions to interact with the master learning device 100 and each of processors (not illustrated) for performing processes to train each of the 1st obfuscation network to the n-th obfuscation network and interact with the master learning device 100 according to the instructions stored in each of the memories.

Specifically, each of the 1st learning device 200_1 to the n-th learning device 200_n may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS (operating system) and software configuration of applications that achieve specific purposes.

Such description of the computing device does not exclude an integrated device including any combination of a processor, a memory, a medium, or any other computing components for implementing the present disclosure.

A method for training the obfuscation networks which conceal, i.e., anonymize, the original data to be used for machine learning, and for training the surrogate networks which use the obfuscated data generated from the obfuscation networks, by using the master learning device 100 and the 1st learning device 200_1 to the n-th learning device 200_n in accordance with one example embodiment of the present disclosure is described by referring to FIGS. 2 to 5 as follows.

Figure 2:
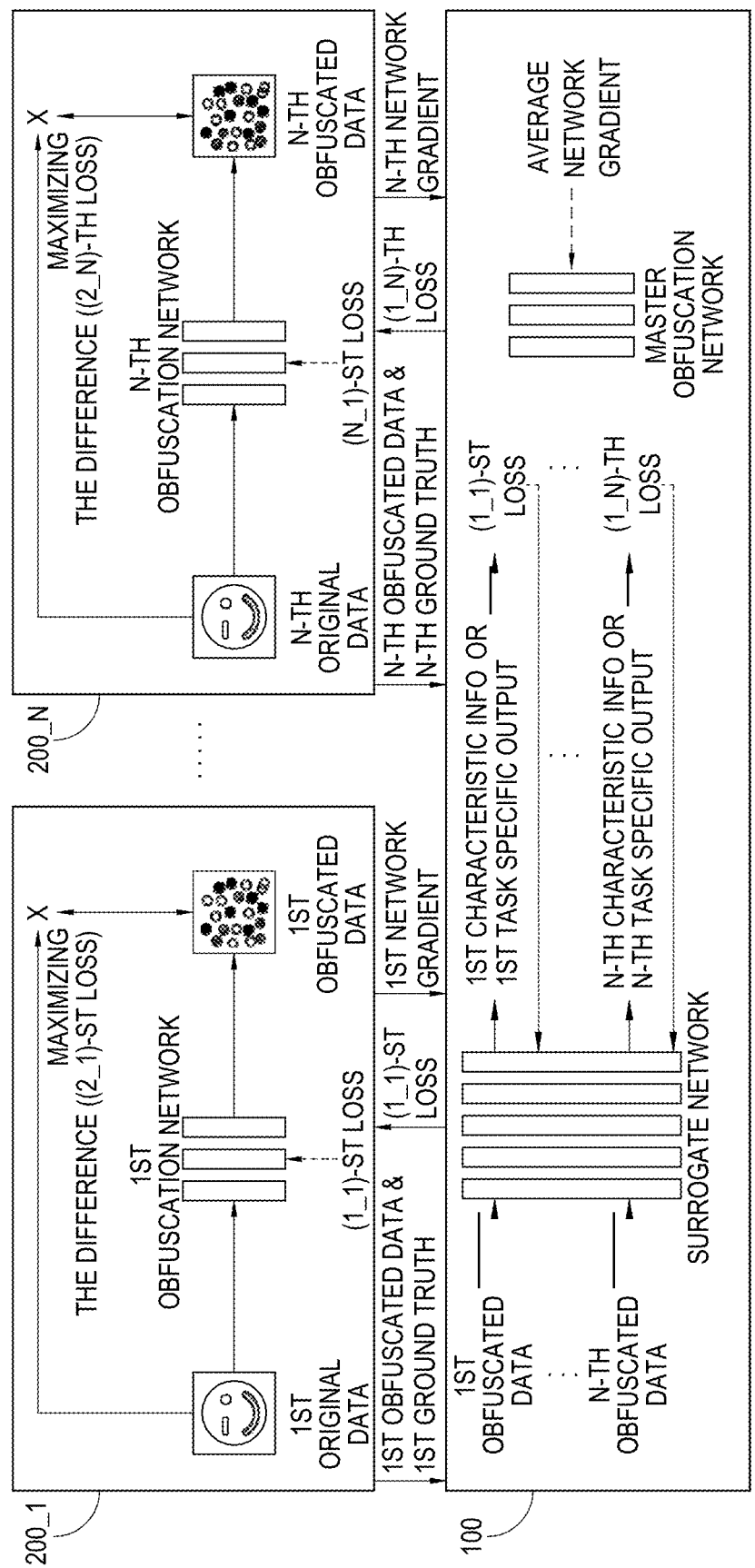
FIG. 2 is a drawing schematically illustrating a method for training the obfuscation networks and one of the surrogate networks in accordance with one example embodiment of the present disclosure.

FIG. 2 is a drawing schematically illustrating a method for training the obfuscation networks which conceals, i.e., anonymizes, the original data and for training one of the surrogate networks which uses the obfuscated data in accordance with one example embodiment of the present disclosure.

First, each of the 1st learning device 200_1 to the n-th learning device 200_n may perform or support another device to perform a process of inputting each of the 1st original data to the n-th original data, corresponding to each of the 1st party to the n-th party, into each of the 1st obfuscation network to the n-th obfuscation network, to thereby allow each of the 1st obfuscation network to the n-th obfuscation network to obfuscate each of the 1st original data to the n-th original data, and thus to generate each of the 1st obfuscated data to the n-th obfuscated data. Herein, n may be an integer larger than 1.

Herein, each of the 1st party to the n-th party may be (i) each of the 1st owner to the n-th owner of each of the 1st original data and its corresponding 1st ground truth to the n-th original data and its corresponding n-th ground truth or (ii) each of the entities to which each of the 1st original data and its corresponding 1st ground truth to the n-th original data and its corresponding n-th ground truth is delegated by each of the 1st owner to the n-th owner.

Also, as another example different from inputting each of the 1st original data to the n-th original data into each of the 1st obfuscation network to the n-th obfuscation network, each of the 1st learning device 200_1 to the n-th learning device 200_n may input each of the 1st modified data to the n-th modified data, created by modifying each of the 1st original data to the n-th original data, into each of the 1st obfuscation network to the n-th obfuscation network, to thereby allow each of the 1st obfuscation network to the n-th obfuscation network to generate each of the 1st obfuscated data to the n-th obfuscated data, as the case may be. For example, each of the 1st modified data to the n-th modified data may be generated by adding random noise, created through a random noise generating network (not illustrated), onto each of the 1st original data to the n-th original data. As one example, the random noise generating network may be instructed to generate the random noise having a normal distribution $N(0, \sigma)$, and the generated random noise may be added onto each of the 1st original data to the n-th original data, to thereby generate each of the 1st modified to the n-th modified data. As another example, each of the 1st modified data to the n-th modified data may be generated by blurring each of the 1st original data to the n-th original data, or changing each of resolutions of each of the 1st original data to the n-th original data, as well as using the random noise, but the scope of the present disclosure is not limited thereto, and various ways of modifying each of the 1st original data to the n-th original data may be used.

And, each of the 1st obfuscated data to the n-th obfuscated data may be recognized as different from each of the 1st original data to the n-th original data by humans, but may be recognized as similar to or same as each of the 1st original data to the n-th original data by the surrogate network.

Meanwhile, as one example, each of the 1st obfuscation network to the n-th obfuscation network may include each of encoders having one or more convolutional layers for applying one or more convolution operations to each of the 1st original data to the n-th original data, and may include each of decoders having one or more deconvolutional layers for applying one or more deconvolution operations to each of feature maps outputted from each of the encoders and thus generating each of the 1st obfuscated data to the n-th obfuscated data, but the scope of the present disclosure is not limited thereto, and may include any learning networks having various structures capable of obfuscating each of the 1st original data to the n-th original data to generate each of the 1st obfuscated data to the n-th obfuscated data.

And, each of the 1st learning device 200_1 to the n-th learning device 200_n may perform or support another device to perform a process of allowing each of (1) the 1st obfuscation pair comprised of the 1st obfuscated data and the 1st ground truth to (2) the n-th obfuscation pair comprised of the n-th obfuscated data and the n-th ground truth to be transmitted to the master learning device 100 corresponding to a master party. Herein, the 1st ground truth may correspond to the 1st original data, and the n-th ground truth may correspond to the n-th original data, that is, supposing that the integer r satisfies the condition 1≤r≤n, the r-th ground truth may correspond to the r-th original data.

Herein, the master party may be a party who is determined as having an intention to train the surrogate network and the master obfuscation network by using each of (1) a 1st original pair comprised of the 1st original data and the 1st ground truth to (2) an n-th original pair comprised of the n-th original data and the n-th ground truth owned by each of the 1st party to the n-th party. And, the master obfuscation network, and each of the 1st obfuscation network to the n-th obfuscation network, before being trained, may be a same obfuscation network or may be the obfuscation networks different from one another. As one example, before training processes, the master learning device 100 may perform or support another device to perform a process of transmitting the master obfuscation network to each of the 1st learning device 200_1 to the n-th learning device 200_n, to thereby allow each of the 1st learning device 200_1 to the n-th learning device 200_n to set each of initial networks of each of the 1st obfuscation network to the n-th obfuscation network as the master obfuscation network.

Then, if each of (1) the 1st obfuscation pair comprised of the 1st obfuscated data and the 1st ground truth to (2) the n-th obfuscation pair comprised of the n-th obfuscated data and the n-th ground truth is acquired from each of the 1st learning device 200_1 to the n-th learning device 200_n, the master learning device 100 may perform or support another device to perform a process of inputting each of the 1st obfuscated data to the n-th obfuscated data into the surrogate network, to thereby allow the surrogate network to apply each learning operation to each of the 1st obfuscated data to the n-th obfuscated data and thus to generate the 1st characteristic information to the n-th characteristic information respectively corresponding to the 1st obfuscated data to the n-th obfuscated data.

Herein, the surrogate network may include a machine learning network, but the scope of the present disclosure is not limited thereto, and may include any learning networks capable of generating the characteristic information by applying its learning operation to the inputted obfuscated data. And, the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms. Also, a subject to be concealed, e.g., a subject to be anonymized, may be personal information included in the original data. Herein, the personal information may include any information related to a person, such as personal identification information, personal medical information, personal biometric information, personal behavioral information, etc.

And, the characteristic information may be features corresponding to the original data. Also, the characteristic information may be feature values related to certain features in the original data, or logits including values related to at least one of vectors, matrices, and coordinates related to the certain features. For example, if the original data are facial image data, the result above may be classes, facial features, e.g., laughing expressions, coordinates of facial landmark points, e.g., both end points on far sides of an eye, to be used for face recognition.

Thereafter, the master learning device 100 may perform or support another device to perform a process of calculating the (1_1)-st loss to the (1_n)-th loss, where the (1_1)-st loss may be calculated by referring to (1) the 1st ground truth corresponding to the 1st original data, and (2) at least one of the 1st characteristic information and its corresponding 1st task specific output, and where the (1_n)-th loss may be calculated by referring to (1) the n-th ground truth corresponding to the n-th original data and (2) at least one of the n-th characteristic information and its corresponding n-th task specific output, that is, supposing that the integer r satisfies the condition 1≤r≤n, the (1_r)-th loss may be calculated by referring to (1) the r-th ground truth corresponding to the r-th original data and (2) at least one of the r-th characteristic information and its corresponding r-th task specific output.

Herein, each of the 1st ground truth to the n-th ground truth may be each of (i) a 1st reference pair comprised of (1) 1st referential characteristic information corresponding to the 1st original data and (2) a 1st referential task specific output corresponding to the 1st referential characteristic information to (ii) an n-th reference pair comprised of (1) n-th referential characteristic information corresponding to n-th original data and (2) an n-th referential task specific output corresponding to the n-th referential characteristic information. Also, each of the (1_1)-st loss to (1_n)-th loss may be calculated by referring to each of (i) (i-1) a 1st characteristics pair comprised of (1) the 1st characteristic information and (2) the 1st referential characteristic information to (i-2) an n-th characteristics pair comprised of (1) the n-th characteristic information and (2) the n-th referential characteristic information or (ii) (ii-1) a 1st output pair comprised of (1) the 1st task specific output and (2) the 1st referential task specific output to (ii-2) an n-th output pair comprised of (1) the n-th task specific output and (2) the n-th referential task specific output.

Also, the master learning device 100 may perform or support another device to perform a process of calculating the (1_1)-st loss to the (1_n)-th loss, where the (1_1)-st loss may be calculated by referring to at least one of (i) a difference between the 1st characteristic information and its corresponding 1st ground truth and (ii) a difference between the 1st task specific output and its corresponding 1st ground truth, and where the (1_n)-th loss may be calculated by referring to at least one of (i) a difference between the n-th characteristic information and its corresponding n-th ground truth and (ii) a difference between the n-th task specific output and its corresponding n-th ground truth, that is, supposing that the integer r satisfies the condition 1≤r≤n, the (1_r)-th loss may be calculated by referring to at least one of (i) a difference between the r-th characteristic information and its corresponding r-th ground truth and (ii) a difference between the r-th task specific output and its corresponding r-th ground truth. As one example, the master learning device 200 may perform or support another device to perform a process of calculating the (1_1)-st loss to the (1_n)-th loss by referring to each of norms or each of cosine similarities between each of (i) the 1st characteristic information and its corresponding 1st ground truth, i.e., the 1st referential characteristic information to (ii) the n-th characteristic information and its corresponding n-th ground truth, i.e., the n-th referential characteristic information, but the scope of the present disclosure is not limited thereto, and any various algorithms capable of calculating each difference between each characteristic information and each referential characteristic information may be used.

Meanwhile, each of the 1st task specific output to the n-th task specific output may be each output of each task to be performed by the surrogate network, and may include various results according to each task by the surrogate network, such as each probability of each class for classification, each of coordinates resulting from each regression for location detection, etc. And, an activation function of an activation unit may be applied to the characteristic information outputted from the surrogate network, to thereby generate the task specific output according to the task to be performed by the surrogate network. Herein, the activation function may include a sigmoid function, a linear function, a softmax function, an rlinear function, a square function, a sqrt function, an srlinear function, an abs function, a tanh function, a brlinear function, etc. but the scope of the present disclosure is not limited thereto.

As one example, when the surrogate network performs the task for the classification, the master learning device 100 may perform or support another device to perform a process of mapping each of the 1st characteristic information to the n-th characteristic information outputted from the surrogate network onto each of classes, to thereby generate each of probabilities of each of the 1st obfuscated data to the n-th obfuscated data, for each of the classes. Herein, each of the probabilities for each of the classes may represent each of probabilities of each of the 1st characteristic information to the n-th characteristic information, outputted for each of the classes from the surrogate network, being correct. For example, if the inputted data are the facial image data, a probability of the face having a laughing expression may be outputted as 0.75, and a probability of the face not having the laughing expression may be outputted as 0.25, and the like. Herein, a softmax algorithm may be used for mapping each of the 1st characteristic information to the n-th characteristic information outputted from the surrogate network onto each of the classes, but the scope of the present disclosure is not limited thereto, and various algorithms may be used for mapping each of the 1st characteristic information to the n-th characteristic information onto each of the classes.

Next, the master learning device 100 may perform or support another device to perform a process of training the surrogate network such that each of the (1_1)-st loss to the (1_n)-th loss is minimized or such that the average loss, which is averaged over the (1_1)-st loss to the (1_n)-th loss, is minimized, and a process of transmitting each of the (1_1)-st loss to the (1_n)-th loss to each of the 1st learning device 200_1 to the n-th learning device 200_n.

Herein, the surrogate network may be trained by using the (1_1)-st loss to the (1_n)-th loss. That is, one or more parameters of the surrogate network may be updated via backpropagation using gradient descent, such that the surrogate network recognizes each of the 1st obfuscated data to the n-th obfuscated data as each of the 1st original data to the n-th original data.

Meanwhile, processes of training the surrogate network using the (1_1)-st loss to the (1_n)-th loss and a process of transmitting each of the (1_1)-st loss to the (1_n)-th loss to each of the 1st learning device 200_1 to the n-th learning device 200_n may occur in a different order and may occur independently of one another.

Next, if the (1_1)-st loss to the (1_n)-th loss are acquired from the master learning device 100, each of the 1st learning device 200_1 to the n-th learning device 200_n may perform or support another device to perform a process of training each of the 1st obfuscation network to the n-th obfuscation network such that each of the (1_1)-st loss to the (1_n)-th loss is minimized and such that each of the (2_1)-st loss to the (2_n)-th loss is maximized, where the (2_1)-st loss may be calculated by referring to the 1st original data and the 1st obfuscated data, and where the (2_n)-th loss may be calculated by referring to the n-th original data and the n-th obfuscated data, that is, supposing that the integer r satisfies the condition 1≤r≤n, the (2_r)-th loss may be calculated by referring to the r-th original data and the r-th obfuscated data.

That is, each of the 1st learning device 200_1 to the n-th learning device 200_n may perform or support another device to perform a process of training each of the 1st obfuscation network to the n-th obfuscation network to generate each of the 1st obfuscated data to the n-th obfuscated data. Herein, each of the 1st obfuscated data to the n-th obfuscated data is different from each of the 1st original data to the n-th original data, however, each of the 1st obfuscated data to the n-th obfuscated data is recognized as each of the 1st original data to the n-th original data by the surrogate network.

Also, each of the 1st learning device 200_1 to the n-th learning device 200_n may perform or support another device to perform a process of measuring each of qualities by referring to at least part of each of entropies and each of degrees of noise of each of the 1st obfuscated data to the n-th obfuscated data, and a process of training each of the 1st obfuscation network to the n-th obfuscation network by using each of the (1_1)-st loss to the (1_n)-th loss onto which each of the measured qualities is added. That is, each of the 1st learning device 200_1 to the n-th learning device 200_n may perform or support another device to perform a process of training each of the 1st obfuscation network to the n-th obfuscation network, such that each of the qualities of each of the 1st obfuscated data to the n-th obfuscated data is minimized, for example, such that each of the entropies, each of the degrees of noise, etc. of each of the 1st obfuscated data to the n-th obfuscated data is maximized.

And, each of the 1st learning device 200_1 to the n-th learning device 200_n may perform or support another device to perform a process of transmitting each of (1) the 1st network gradient of a trained 1st obfuscation network to (2) the n-th network gradient of a trained n-th obfuscation network to the master learning device 100. Herein, each of the 1st network gradient to the n-th network gradient may be each of network quantities changed by a current training process of each of the 1st obfuscation network to the n-th obfuscation network, that is, may be each of changes of each of one or more parameters, of each of the 1st obfuscation network to the n-th obfuscation network, changed by the current training process.

Then, the master learning device 100 may perform or support another device to perform a process of updating, i.e., training, the master obfuscation network by referring to the average network gradient which is averaged over the 1st network gradient to the n-th network gradient respectively acquired from the 1st learning device 200_1 to the n-th learning device 200_n.

Supposing that processes of training the 1st obfuscation network to the n-th obfuscation network, the master obfuscation network, and the surrogate network by using each same piece of the 1st original data to the n-th original data is a single iteration, then by repeating the iteration over a set of the 1st original data to the n-th original data, the obfuscation networks which conceal, i.e., anonymize, the original data to be used for machine learning and the surrogate network which uses the obfuscated data generated by the obfuscation networks may be trained.

And, the master obfuscation network is shown above as trained for each iteration, however, as another example, the master obfuscation network may be trained per preset number of iterations.

That is, each of the 1st learning device 200_1 to the n-th learning device 200_n may perform or support another device to perform a process of transmitting to the master learning device 100 each of (1) the 1st network gradient of the trained 1st obfuscation network to (2) the n-th network gradient of the trained n-th obfuscation network per each preset number of the iterations, and then the master learning device 100 may perform or support another device to perform a process of updating the master obfuscation network by referring to the average network gradient which is averaged over the 1st network gradient to the n-th network gradient from the 1st learning device 200_1 to the n-th learning device 200_n.

Figure 3:
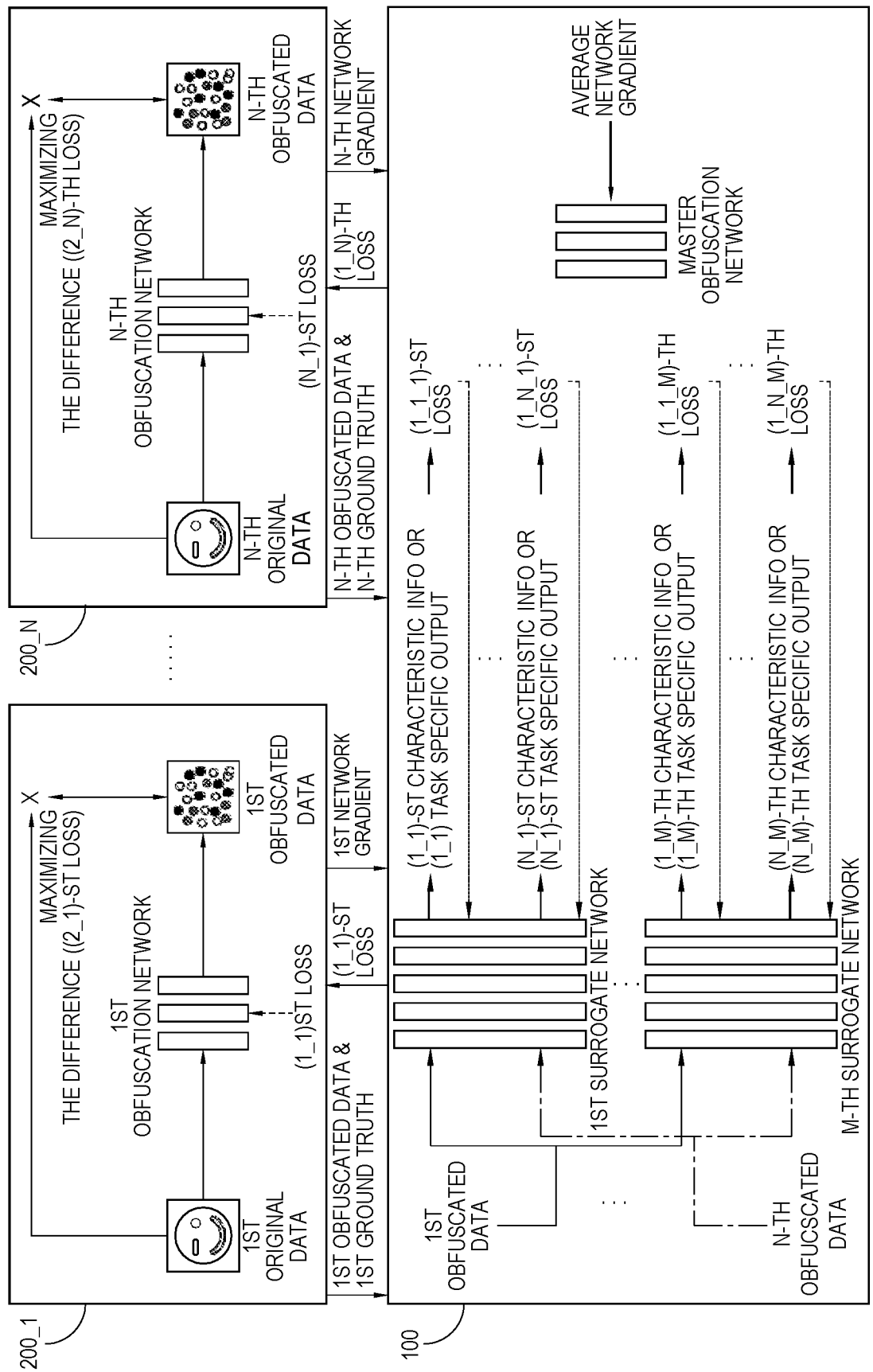
FIG. 3 is a drawing schematically illustrating another method for training the obfuscation networks and the surrogate networks in accordance with one example embodiment of the present disclosure.

FIG. 3 is a drawing schematically illustrating another method for training the obfuscation networks which conceal, i.e., anonymize, the original data and multiple surrogate networks which use the obfuscated data generated by the obfuscation networks in accordance with one example embodiment of the present disclosure.

Herein, the surrogate network as shown in FIG. 2 is configured as the multiple surrogate networks. Herein, each of the multiple surrogate networks may perform each of tasks different from one another. In the description below, the part easily deducible from the explanation of FIG. 2 will be omitted.

First, each of the 1st learning device 200_1 to the n-th learning device 200_n may perform or support another device to perform a process of inputting each of the 1st original data to the n-th original data, corresponding to each of the 1st party to the n-th party, into each of the 1st obfuscation network to the n-th obfuscation network, to thereby allow each of the 1st obfuscation network to the n-th obfuscation network to obfuscate each of the 1st original data to the n-th original data, and thus to generate each of the 1st obfuscated data to the n-th obfuscated data.

And, each of the 1st learning device 200_1 to the n-th learning device 200_n may perform or support another device to perform a process of allowing each of (1) the 1st obfuscation pair comprised of the 1st obfuscated data and the 1st ground truth to (2) the n-th obfuscation pair comprised of the n-th obfuscated data and the n-th ground truth to be transmitted to the master learning device 100 corresponding to a master party. Herein, the 1st ground truth may correspond to the 1st original data, and the n-th ground truth may correspond to the n-th original data, that is, supposing that the integer r satisfies the condition 1≤r≤n, the r-th ground truth may correspond to the r-th original data.

Then, if each of (1) the 1st obfuscation pair comprised of the 1st obfuscated data and the 1st ground truth to (2) the n-th obfuscation pair comprised of the n-th obfuscated data and the n-th ground truth is acquired from each of the 1st learning device 200_1 to the n-th learning device 200_n, the master learning device 100 may perform or support another device to perform a process of inputting all of the 1st obfuscated data to the n-th obfuscated data into each of the 1st surrogate network to the n-th surrogate network, to thereby allow each of the 1st surrogate network to the n-th surrogate network to apply each learning operation to all of the 1st obfuscated data to the n-th obfuscated data and thus to generate (1) (1_1)-st characteristic information to (n_1)-st characteristic information to (2) (1_m)-th characteristic information to (n_m)-th characteristic information. Herein, m may be an integer larger than 1.

Thereafter, the master learning device 100 may perform or support another device to perform a process of calculating (i) at least one (1_1_1)-st loss to at least one (1_n_1)-st loss to (ii) at least one (1_1_m)-th loss to at least one (1_n_m)-th loss, where the (1_1_1)-st loss may be calculated by referring to the 1st ground truth and at least one of (1_1)-st characteristic information and its corresponding (1_1)-st task specific output, and wherein the (1_n_m)-th loss may be calculated by referring to the n-th ground truth and at least one of (n_m)-th characteristic information and its corresponding (n_m)-th task specific output, that is, supposing that the integer r satisfies the condition 1≤r≤n and that an integer j satisfies a condition 1≤j≤m, the (1_r_j)-th loss may be calculated by referring to the r-th ground truth and at least one of (r_j)-th characteristic information and its corresponding (r_j)-th task specific output.

Then, the master learning device 100 may perform or support another device to perform a process of training each of the 1st surrogate network to the m-th surrogate network such that each of (i) the (1_1_1)-st loss to the (1_n_1)-st loss to (ii) the (1_1_m)-th loss to the (1_n_m)-th loss is minimized.

And, the master learning device 100 may perform or support another device to perform a process of transmitting each of the (1_1)-st loss to the (1_n)-th loss to each of the 1st learning device 200_1 to the n-th learning device 200_n, where the (1_1)-st loss may include (i) at least one of the (1_1_1)-st loss to the (1_1_m)-th loss or (ii) a 1st average loss calculated by averaging over the (1_1_1)-st loss to the (1_1_m)-th loss, and where the (1_n)-th loss may include (i) at least one of the (1_n_1)-st loss to the (1_n_m)-th loss or (ii) an n-th average loss calculated by averaging over the (1_n_1)-st loss to the (1_n_m)-th loss, that is, supposing that the integer r satisfies the condition 1≤r≤n and that the integer j satisfies the condition 1≤j≤m, the (1_r)-th loss may include (i) at least one of the (1_r_1)-st loss to the (1_r_j)-th loss or (ii) the r-th average loss calculated by averaging over the (1_r_1)-st loss to the (1_r_j)-th loss.

Meanwhile, processes of training the 1st surrogate network to the n-th surrogate network by using the master learning device 100 and processes of transmitting each of the (1_1)-st loss to the (1_n)-th loss to each of the 1st learning device 200_1 to the n-th learning device 200_n may occur in a different order and may occur independently of one another.

Next, each of the 1st learning device 200_1 to the n-th learning device 200_n may perform or support another device to perform a process of training each of the 1st obfuscation network to the n-th obfuscation network such that each of the (1_1)-st loss to the (1_n)-th loss, acquired from the master learning device 100, is minimized and such that each of the (2_1)-st loss to the (2_n)-th loss is maximized, where the (2_1)-st loss may be calculated by referring to the 1st original data and the 1st obfuscated data, and where the (2_n)-th loss may be calculated by referring to the n-th original data and the n-th obfuscated data, that is, supposing that the integer r satisfies the condition 1≤r≤n, the (2_r)-th loss may be calculated by referring to the r-th original data and the r-th obfuscated data.

That is, each of the 1st learning device 200_1 to the n-th learning device 200_n may perform or support another device to perform a process of training each of the 1st obfuscation network to the n-th obfuscation network such that each of the (2_1)-st loss to the (2_n)-th loss is maximized and such that (i) each of (i-1) at least one of the (1_1_1)-st loss to the (1_1_m)-th loss to (i-2) at least one of the (1_n_1)-st loss to the (1_n_m)-th loss or (ii) each of the 1st average loss to the m-th average loss is minimized.

Also, each of the 1st learning device 200_1 to the n-th learning device 200_n may perform or support another device to perform a process of measuring each of a 1st quality to an n-th quality by referring to at least part of each of the entropies and each of the degrees of noise of each of the 1st obfuscated data to the n-th obfuscated data, and a process of training each of the 1st obfuscation network to the n-th obfuscation network by using each of the (1_1)-st loss to the (1_n)-th loss onto which each of the measured 1st quality to the measured n-th quality is added. That is, each of the 1st learning device 200_1 to the n-th learning device 200_n may perform or support another device to perform a process of training each of the 1st obfuscation network to the n-th obfuscation network, such that each of the 1st quality of the 1st obfuscated data to the n-th quality of the n-th obfuscated data is minimized, for example, such that each of the entropies, each of the degrees of noise, etc. of each of the 1st obfuscated data to the n-th obfuscated data is maximized.

Thereafter, each of the 1st learning device 200_1 to the n-th learning device 200_n may perform or support another device to perform a process of transmitting each of (1) the 1st network gradient of the trained 1st obfuscation network to (2) the n-th network gradient of the trained n-th obfuscation network to the master learning device 100.

Then, the master learning device 100 may perform or support another device to perform a process of updating, i.e., training, the master obfuscation network by referring to the average network gradient which is averaged over the 1st network gradient to the n-th network gradient respectively acquired from the 1st learning device 200_1 to the n-th learning device 200_n.

Meanwhile, the master learning device 100 is shown above as transmitting each of the (1_1)-st loss to the (1_n)-th loss to each of the 1st learning device 200_1 to the n-th learning device 200_$n$, where, supposing that the integer r satisfies the condition 1≤r≤n and that the integer j satisfies the condition the (1_r)-th loss may include (i) at least one of the (1_r_1)-st loss to the (1_r_j)-th loss or (ii) the r-th average loss calculated by averaging over the (1_r_1)-st loss to the (1_r_j)-th loss, to thereby allow each of the 1st learning device 200_1 to the n-th learning device 200_$n$ to train each of the 1st obfuscation network to the n-th obfuscation network by using each of (i) a 1st loss pair comprised of the (1_1)-st loss and the (2_1)-st loss to (ii) an n-th loss pair comprised of the (1_n)-th loss and the (2_n)-th loss. However, as another example, the master learning device 100 may perform or support another device to perform a process of sequentially transmitting each of (i) the (1_1_1)-st loss to the (1_1_m)-th loss to (ii) the (1_n_1)-st loss to the (1_n_m)-th loss to each of the 1st learning device 200_1 to the n-th learning device 200_$n$, to thereby allow each of the 1st learning device 200_1 to the n-th learning device 200_$n$ to sequentially train each of the 1st obfuscation network to the n-th obfuscation network by using each of (i) the (1_1_1)-st loss to the (1_1_m)-th loss to (ii) the (1_n_1)-st loss to the (1_n_m)-th loss.

That is, each of the 1st learning device 200_1 to the n-th learning device 200_$n$ may perform or support another device to perform a process of inputting each of the 1st original data to the n-th original data into each of the 1st obfuscation network to the n-th obfuscation network, to thereby allow each of the 1st obfuscation network to the n-th obfuscation network to obfuscate each of the 1st original data to the n-th original data, and thus to generate each of (1_1)-st obfuscated data to (n_1)-st obfuscated data.

And, each of the 1st learning device 200_1 to the n-th learning device 200_$n$ may perform or support another device to perform a process of allowing each of (i) a 1st sub-obfuscation pair comprised of the (1_1)-st obfuscated data and the 1st ground truth to (ii) an n-th sub-obfuscation pair comprised of the (n_1)-st obfuscated data and the n-th ground truth to be transmitted to the master learning device 100.

Then, the master learning device 100 may perform or support another device to perform (i) a process of inputting the (1_1)-st obfuscated data to the (n_1)-st obfuscated data into the 1st surrogate network, to thereby allow the 1st surrogate network to apply each learning operation to each of the (1_1)-st obfuscated data to the (n_1)-st obfuscated data and thus to generate each of the (1_1)-st characteristic information to the (n_1)-st characteristic information corresponding to each of the (1_1)-st obfuscated data to the (n_1)-st obfuscated data, and (ii) a process of calculating each of the (1_1_1)-st loss to the (1_n_1)-st loss, where the (1_1_1)-st loss may be calculated by referring to the 1st ground truth and at least one of the (1_1)-st characteristic information and its corresponding (1_1)-st task specific output and where the (1_1)-st task specific output may be created by using the (1_1)-st characteristic information, where the (1_n_1)-st loss may be calculated by referring to the n-th ground truth and at least one of the (n_1)-st characteristic information and its corresponding (n_1)-st task specific output and where the (n_1)-st task specific output may be created by using the (n_1)-st characteristic information, that is, supposing that the integer r satisfies the condition 1≤r≤n, the (1_r_1)-st loss may be calculated by referring to the r-th ground truth and at least one of the (r_1)-st characteristic information and its corresponding (r_1)-st task specific output and the (r_1)-st task specific output may be created by using the (r_1)-st characteristic information.

And, the master learning device 100 may perform or support another device to perform a process of training the 1st surrogate network such that each of the (1_1_1)-st loss to the (1_n_1)-st loss is minimized, and a process of transmitting each of the (1_1_1)-st loss to the (1_n_1)-st loss to each of the 1st learning device 200_1 to the n-th learning device 200_$n$. Herein, the master learning device 100 may perform or support another device to perform a process of training the 1st surrogate network such that the average loss is minimized which is averaged over the (1_1_1)-st loss to the (1_n_1)-st loss.

Then, each of the 1st learning device 200_1 to the n-th learning device 200_$n$ may perform or support another device to perform a process of training each of the 1st obfuscation network to the n-th obfuscation network such that each of the (1_1_1)-st loss to the (1_n_1)-st loss is minimized and such that each of at least one (2_1_1)-st loss to at least one (2_n_1)-st loss is maximized, where the (2_1_1)-st loss may be calculated by referring to the 1st original data and the (1_1)-st obfuscated data, and where the (2_n_1)-st loss may be calculated by referring to the n-th original data and the (n_1)-st obfuscated data, that is, supposing that the integer r satisfies the condition 1≤r≤, the (2_r_1)-st loss may be calculated by referring to the r-th original data and the (r_1)-st obfuscated data. And as a result, each of the 1st learning device 200_1 to the n-th learning device 200_$n$ may allow each of the 1st obfuscation network to the n-th obfuscation network to be each of a 1st trained 1st obfuscation network to a 1st trained n-th obfuscation network.

Thereafter, by repeating the processes above while increasing an integer k from 2 to m, the master learning device 100 may perform or support another device to perform a process of training the m-th surrogate network using the (1_1_m)-th loss to the (1_n_m)-th loss corresponding to outputs from the m-th surrogate network, and a process of transmitting each of the (1_1_m)-th loss to the (1_n_m)-th loss to each of the 1st learning device 200_1 to the n-th learning device 200_$n$, to thereby allow each of the 1st learning device 200_1 to the n-th learning device 200_$n$ to train each of an (m-1)-th trained 1st obfuscation network to an (m-1)-th trained n-th obfuscation network using each of the (1_1_m)-th loss to the (1_n_m)-th loss and thus to acquire each of an m-th trained 1st obfuscation network to an m-th trained n-th obfuscation network.

That is, the master learning device 100 may perform or support another device to perform a process of acquiring the (1_k)-th obfuscated data to the (n_k)-th obfuscated data, where the (1_k)-th obfuscated data may be created by obfuscating the 1st original data, from the 1st learning device 200_1, through the (k-1)-th trained 1st obfuscation network, and where the (n_k)-th obfuscated data may be created by obfuscating the n-th original data, from the n-th learning device 200_$n$, through the (k-1)-th trained n-th obfuscation network, that is, supposing that an integer r satisfies a condition 1≤r≤n, the (r_k)-th obfuscated data may be created by obfuscating the r-th original data, from the r-th learning device 200_$r$.

And, the master learning device 100 may perform or support another device to perform a process of inputting the (1_k)-th obfuscated data to the (n_k)-th obfuscated data into the k-th surrogate network, to thereby allow the k-th surrogate network to apply each learning operation to each of the (1_k)-th obfuscated data to the (n_k)-th obfuscated data and thus to generate each of (1_k)-th characteristic information to (n_k)-th characteristic information corresponding to each of the (1_k)-th obfuscated data to the (n_k)-th obfuscated data.

Thereafter, the master learning device 100 may perform or support another device to perform a process of calculating at least one (1_1_k)-th loss to at least one (1_n_k)-th loss, where the (1_1_k)-th loss may be calculated by referring to (i) the 1st ground truth and (ii) at least one of the (1_k)-th characteristic information and its corresponding (1_k)-th task specific output and where the (1_k)-th task specific output may be created by using the (1_k)-th characteristic information, and where the (1_n_k)-th loss may be calculated by referring to (i) the n-th ground truth and (ii) at least one of the (n_k)-th characteristic information and its corresponding (n_k)-th task specific output and where the (n_k)-th task specific output may be created by using the (n_k)-th characteristic information, that is, supposing that the integer r satisfies the condition 1≤r≤n, the (1_r_k)-th loss may be calculated by referring to (i) the r-th ground truth and (ii) at least one of the (r_k)-th characteristic information and its corresponding (r_k)-th task specific output and where the (r_k)-th task specific output may be created by using the (r_k)-th characteristic information.

Next, the master learning device 100 may perform or support another device to perform a process of training the k-th surrogate network such that each of the (1_1_k)-th loss to the (1_n_k)-th loss is minimized, and a process of transmitting each of the (1_1_k)-th loss to the (1_n_k)-th loss to each of the 1st learning device 200_1 to the n-th learning device 200_n.

Then, each of the 1st learning device 200_1 to the n-th learning device 200_n may perform or support another device to perform a process of training each of the (k-1)-th trained 1st obfuscation network to the (k-1)-th trained n-th obfuscation network such that each of the (1_1_k)-th loss to the (1_n_k)-th loss is minimized and such that each of at least one (2_1_k)-th loss to at least one (2_n_k)-th loss is maximized, where the (2_1_k)-th loss may be calculated by referring to the 1st original data and the (1_k)-th obfuscated data, and where the (2_n_k)-th loss may be calculated by referring to the n-th original data and the (n_k)-th obfuscated data, that is, supposing that the integer r satisfies the condition 1≤r≤n, the (2_r_k)-th loss may be calculated by referring to the r-th original data and the (r_k)-th obfuscated data. And as a result, each of the 1st learning device 200_1 to the n-th learning device 200_n may allow each of the (k-1)-th trained 1st obfuscation network to the (k-1)-th trained n-th obfuscation network to be each of a k-th trained 1st obfuscation network to a k-th trained n-th obfuscation network.

By repeating the processes above until k reaches m, each of the 1st learning device 200_1 to the n-th learning device 200_n may perform or support another device to perform a process of acquiring each of the m-th trained 1st obfuscation network to the m-th trained n-th obfuscation network, and a process of transmitting each of (1) the 1st network gradient of the m-th trained 1st obfuscation network to (2) the n-th network gradient of the m-th trained n-th obfuscation network to the master learning device 100. Herein, the 1st network gradient may be a difference between the 1st obfuscation network before being trained and the m-th trained 1st obfuscation network, and the n-th network gradient may be a difference between the n-th obfuscation network before being trained and the m-th trained n-th obfuscation network, that is, supposing that the integer r satisfies the condition 1≤r≤n, the r-th network gradient may be a difference between the r-th obfuscation network before being trained and the m-th trained r-th obfuscation network.

Then, the master learning device 100 may perform or support another device to perform a process of updating, i.e., training, the master obfuscation network by referring to the average network gradient which is averaged over the 1st network gradient to the n-th network gradient respectively acquired from the 1st learning device 200_1 to the n-th learning device 200_n.

Supposing that processes of training the 1st obfuscation network to the n-th obfuscation network, the master obfuscation network, and the surrogate network by using each same piece of the 1st original data to the n-th original data is a single iteration, then by repeating the iteration over a set of the 1st original data to the n-th original data, the obfuscation networks which conceal, i.e., anonymize, the original data to be used for machine learning and the surrogate network which uses the obfuscated data generated by the obfuscation networks may be trained.

And, the master obfuscation network is shown above as trained for each iteration, however, as another example, the master obfuscation network may be trained per preset number of iterations.

Also, the master obfuscation network is shown above as trained with a single iteration. However, as another example, during a single iteration, each of the 1st learning device 200_1 to the n-th learning device 200_n may perform or support another device to perform a process of transmitting each of differences between each of the obfuscation networks previously trained and each of the obfuscation networks currently trained, and as a result, the master obfuscation network may be trained in connection with learning processes of each of the 1st obfuscation network to the n-th obfuscation network performed by each of the 1st learning device 200_1 to the n-th learning device 200_n.

Figure 4:
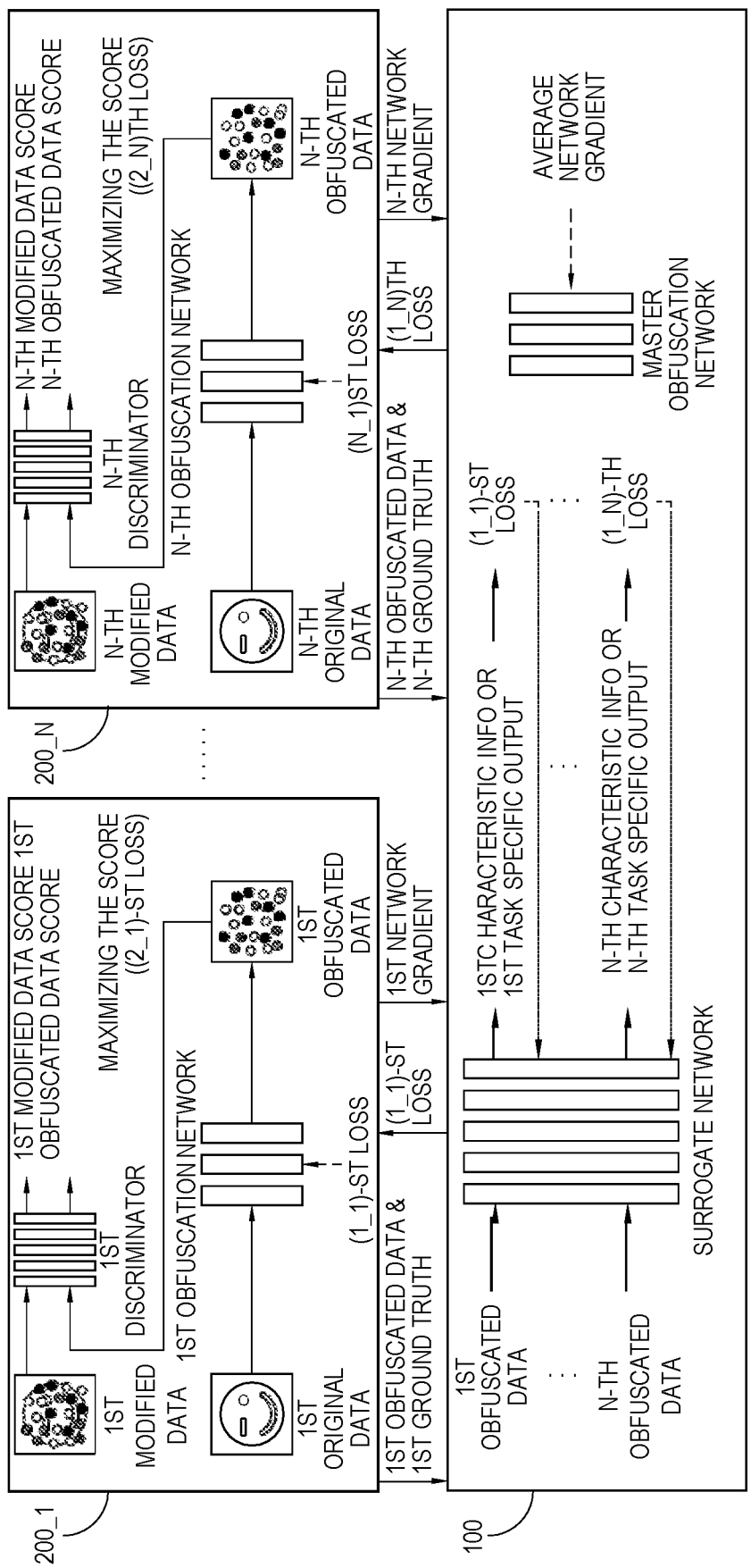
FIG. 4 is a drawing schematically illustrating a method for training the obfuscation networks and one of the surrogate networks in accordance with another example embodiment of the present disclosure.

FIG. 4 is a drawing schematically illustrating a method for training the obfuscation networks which conceal, i.e., anonymize, the original data and the surrogate network which uses the obfuscated data generated by the obfuscation networks in accordance with another example embodiment of the present disclosure. In the description below, the part easily deducible from the explanation of FIGS. 2 and 3 will be omitted.

First, each of the 1st learning device 200_1 to the n-th learning device 200_n may perform or support another device to perform a process of inputting each of the 1st original data to the n-th original data, corresponding to each of the 1st party to the n-th party, into each of the 1st obfuscation network to the n-th obfuscation network, to thereby allow each of the 1st obfuscation network to the n-th obfuscation network to obfuscate each of the 1st original data to the n-th original data, and thus to generate each of the 1st obfuscated data to the n-th obfuscated data.

And, each of the 1st learning device 200_1 to the n-th learning device 200_n may perform or support another device to perform a process of allowing each of (1) the 1st obfuscation pair comprised of the 1st obfuscated data and the 1st ground truth to (2) the n-th obfuscation pair comprised of the n-th obfuscated data and the n-th ground truth to be transmitted to the master learning device 100 corresponding to a master party. Herein, the 1st ground truth may correspond to the 1st original data, and the n-th ground truth may correspond to the n-th original data, that is, supposing that the integer r satisfies the condition 1≤r≤n, the r-th ground truth may correspond to the r-th original data.

Then, if each of (1) the 1st obfuscation pair comprised of the 1st obfuscated data and the 1st ground truth to (2) the n-th obfuscation pair comprised of the n-th obfuscated data and the n-th ground truth is acquired from each of the 1st learning device 200_1 to the n-th learning device 200_n, the master learning device 100 may perform or support another device to perform a process of inputting each of the 1st obfuscated data to the n-th obfuscated data into the surrogate network, to thereby allow the surrogate network to apply each learning operation to each of the 1st obfuscated data to the n-th obfuscated data and thus to generate the 1st characteristic information to the n-th characteristic information respectively corresponding to the 1st obfuscated data to the n-th obfuscated data.

Thereafter, the master learning device 100 may perform or support another device to perform a process of calculating the (1_1)-st loss to the (1_n)-th loss, where the (1_1)-st loss may be calculated by referring to (1) the 1st ground truth corresponding to the 1st original data, and (2) at least one of the 1st characteristic information and its corresponding 1st task specific output, and where the (1_n)-th loss may be calculated by referring to (1) the n-th ground truth corresponding to the n-th original data and (2) at least one of the n-th characteristic information and its corresponding n-th task specific output, that is, supposing that the integer r satisfies the condition 1≤r≤n, the (1_r)-th loss may be calculated by referring to (1) the r-th ground truth corresponding to the r-th original data and (2) at least one of the r-th characteristic information and its corresponding r-th task specific output.

Next, the master learning device 100 may perform or support another device to perform a process of training the surrogate network such that each of the (1_1)-st loss to the (1_n)-th loss is minimized or such that the average loss, which is averaged over the (1_1)-st loss to the (1_n)-th loss, is minimized, and a process of transmitting each of the (1_1)-st loss to the (1_n)-th loss to each of the 1st learning device 200_1 to the n-th learning device 200_n.

Then, on condition that the 1st obfuscated data score to the n-th obfuscated data score have been acquired respectively as the (2_1)-st loss to the (2_n)-th loss, where the 1st obfuscated data score to the n-th obfuscated data score respectively correspond to the 1st obfuscated data to the n-th obfuscated data respectively inputted into the 1st discriminator to the n-th discriminator to be used for determining whether their inputted data is real or fake, each of the 1st learning device 200_1 to the n-th learning device 200_n may perform or support another device to perform (i) a process of training each of the 1st obfuscation network to the n-th obfuscation network such that each of the (1_1)-st loss to the (1_n)-th loss is minimized and such that each of the (2_1)-st loss to the (2_n)-th loss is maximized, and (ii) a process of training each of the 1st discriminator to the n-th discriminator such that each of the 1st obfuscated data score to the n-th obfuscated data score is minimized and such that each of (1) the 1st modified data score or the 1st modified obfuscated data score to (2) the n-th modified data score or the n-th modified obfuscated data score is maximized, where (1) the 1st modified data score or the 1st modified obfuscated data score to (2) the n-th modified data score or the n-th modified obfuscated data score respectively correspond to (1) the 1st modified data or the 1st modified obfuscated data to the n-th modified data or (2) the n-th modified obfuscated data respectively inputted into the 1st discriminator to the n-th discriminator.

Herein, (1) the 1st modified data or the 1st modified obfuscated data to (2) the n-th modified data or the n-th modified obfuscated data may be generated by respectively modifying (1) the 1st original data or the 1st obfuscated data to (2) the n-th original data or the n-th obfuscated data.

And, (1) the 1st modified data or the 1st modified obfuscated data to (2) the n-th modified data or the n-th modified obfuscated data may be generated by adding the random noise, created through the random noise generating network (not illustrated), onto (1) the 1st original data or the 1st obfuscated data to (2) the n-th original data or the n-th obfuscated data. As one example, the random noise generating network may be instructed to generate the random noise having the normal distribution N(0, σ), and the generated random noise may be added onto (1) the 1st original data or the 1st obfuscated data to (2) the n-th original data or the n-th obfuscated data, to thereby generate (1) the 1st modified data or the 1st modified obfuscated data to (2) the n-th modified data or the n-th modified obfuscated data. As another example, each of (1) the 1st modified data or the 1st modified obfuscated data to (2) the n-th modified data or the n-th modified obfuscated data may be generated by blurring each of (1) the 1st original data or the 1st obfuscated data to (2) the n-th original data or the n-th obfuscated data, or changing each of resolutions of each of (1) the 1st original data or the 1st obfuscated data to (2) the n-th original data or the n-th obfuscated data, as well as using the random noise, but the scope of the present disclosure is not limited thereto, and various ways of modifying each of (1) the 1st original data or the 1st obfuscated data to (2) the n-th original data or the n-th obfuscated data may be used.

Herein, a maximum of (1) the 1st modified data score or the 1st modified obfuscated data score to (2) the n-th modified data score or the n-th modified obfuscated data score, respectively corresponding to (1) the 1st modified data or the 1st modified obfuscated data to (2) the n-th modified data or the n-th modified obfuscated data inputted respectively into the 1st discriminator to the n-th discriminator, may be 1 as a value for determining (1) the 1st modified data or the 1st modified obfuscated data to (2) the n-th modified data or the n-th modified obfuscated data as real, and a minimum of the 1st obfuscated data score to the n-th obfuscated data score, respectively corresponding to the 1st obfuscated data to the n-th obfuscated data respectively inputted into the 1st discriminator to the n-th discriminator, may be 0 as a value for determining the 1st obfuscated data to the n-th obfuscated data as fake. That is, each of the 1st discriminator to the n-th discriminator may be trained to recognize each of the 1st obfuscated data to the n-th obfuscated data as each of (1) the 1st modified data or the 1st modified obfuscated data to (2) the n-th modified data or the n-th modified obfuscated data.

Next, each of the 1st learning device 200_1 to the n-th learning device 200_n may perform or support another device to perform a process of transmitting each of (1) the 1st network gradient of the trained 1st obfuscation network to (2) the n-th network gradient of the trained n-th obfuscation network to the master learning device 100. Herein, each of the 1st network gradient to the n-th network gradient may be each of network quantities changed by a current training process of each of the 1st obfuscation network to the n-th obfuscation network, that is, may be each of changes of each of one or more parameters, of each of the 1st obfuscation network to the n-th obfuscation network, changed by the current training process.

Then, the master learning device 100 may perform or support another device to perform a process of updating, i.e., training, the master obfuscation network by referring to the average network gradient which is averaged over the 1st network gradient to the n-th network gradient respectively acquired from the 1st learning device 200_1 to the n-th learning device 200_*n*.

Figure 5:
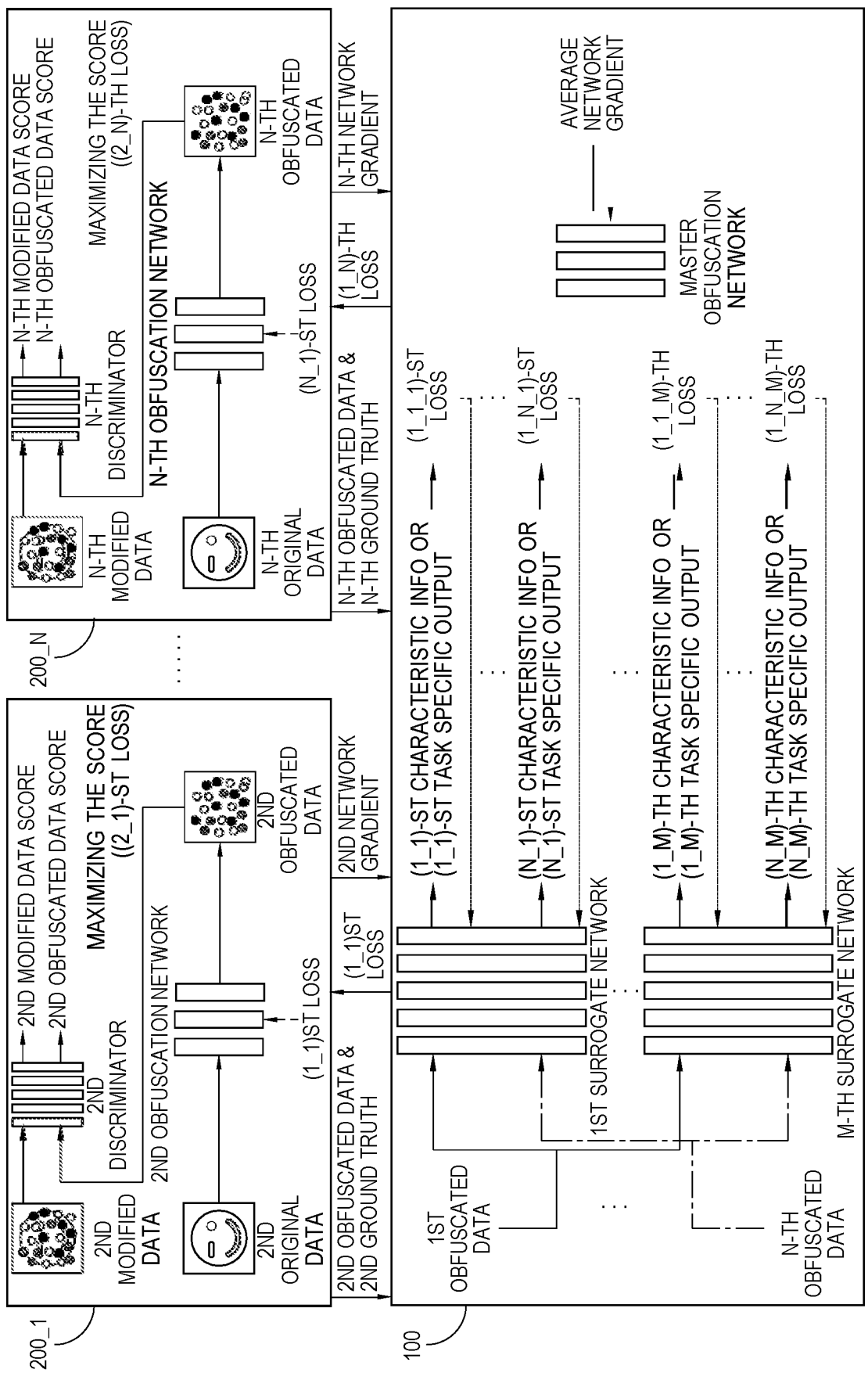
FIG. 5 is a drawing schematically illustrating another method for training the obfuscation networks and the surrogate networks in accordance with another example embodiment of the present disclosure.

FIG. 5 is a drawing schematically illustrating a method for training the obfuscation networks which conceal, i.e., anonymize, the original data in accordance with another example embodiment of the present disclosure. Also, the surrogate network as shown in FIG. 4 is configured as the multiple surrogate networks. In the description below, the part easily deducible from the explanation of FIGS. 2 to 4 will be omitted.

First, each of the 1st learning device 200_1 to the n-th learning device 200_*n* may perform or support another device to perform a process of inputting each of the 1st original data to the n-th original data, corresponding to each of the 1st party to the n-th party, into each of the 1st obfuscation network to the n-th obfuscation network, to thereby allow each of the 1st obfuscation network to the n-th obfuscation network to obfuscate each of the 1st original data to the n-th original data, and thus to generate each of the 1st obfuscated data to the n-th obfuscated data.

And, each of the 1st learning device 200_1 to the n-th learning device 200_*n* may perform or support another device to perform a process of allowing each of (1) the 1st obfuscation pair comprised of the 1st obfuscated data and the 1st ground truth to (2) the n-th obfuscation pair comprised of the n-th obfuscated data and the n-th ground truth to be transmitted to the master learning device 100 corresponding to a master party. Herein, the 1st ground truth may correspond to the 1st original data, and the n-th ground truth may correspond to the n-th original data, that is, supposing that the integer r satisfies the condition 1≤r≤n, the r-th ground truth may correspond to the r-th original data.

Then, if each of (1) the 1st obfuscation pair comprised of the 1st obfuscated data and the 1st ground truth to (2) the n-th obfuscation pair comprised of the n-th obfuscated data and the n-th ground truth is acquired from each of the 1st learning device 200_1 to the n-th learning device 200_*n*, the master learning device 100 may perform or support another device to perform a process of inputting all of the 1st obfuscated data to the n-th obfuscated data into each of the 1st surrogate network to the n-th surrogate network, to thereby allow each of the 1st surrogate network to the n-th surrogate network to apply each learning operation to all of the 1st obfuscated data to the n-th obfuscated data and thus to generate (1) (1_1)-st characteristic information to (n_1)-st characteristic information to (2) (1_m)-th characteristic information to (n_m)-th characteristic information.

Thereafter, the master learning device 100 may perform or support another device to perform a process of calculating (i) at least one (1_1_1)-st loss to at least one (1_n_1)-st loss to (ii) at least one (1_1_m)-th loss to at least one (1_n_m)-th loss, where the (1_1_1)-st loss may be calculated by referring to the 1st ground truth and at least one of (1_1)-st characteristic information and its corresponding (1_1)-st task specific output, and wherein the (1_n_m)-th loss may be calculated by referring to the n-th ground truth and at least one of (n_m)-th characteristic information and its corresponding (n_m)-th task specific output, that is, supposing that the integer r satisfies the condition 1≤r≤n and that an integer j satisfies a condition 1≤j≤m, the (1_r_j)-th loss may be calculated by referring to the r-th ground truth and at least one of (r_j)-th characteristic information and its corresponding (r_j)-th task specific output.

Then, the master learning device 100 may perform or support another device to perform a process of training each of the 1st surrogate network to the m-th surrogate network such that each of (i) the (1_1_1)-st loss to the (1_n_1)-st loss to (ii) the (1_1_m)-th loss to the (1_n_m)-th loss is minimized.

And, the master learning device 100 may perform or support another device to perform a process of transmitting each of the (1_1)-st loss to the (1_n)-th loss to each of the 1st learning device 200_1 to the n-th learning device 200_*n*, where the (1_1)-st loss may include (i) at least one of the (1_1_1)-st loss to the (1_1_m)-th loss or (ii) a 1st average loss calculated by averaging over the (1_1_1)-st loss to the (1_1_m)-th loss, and where the (1_n)-th loss may include (i) at least one of the (1_n_1)-st loss to the (1_n_m)-th loss or (ii) an n-th average loss calculated by averaging over the (1_n_1)-st loss to the (1_n_m)-th loss, that is, supposing that the integer r satisfies the condition 1≤r≤n and that the integer j satisfies the condition 1≤j≤m, the (1_r)-th loss may include (i) at least one of the (1_r_1)-st loss to the (1_r_j)-th loss or (ii) the r-th average loss calculated by averaging over the (1_r_1)-st loss to the (1_r_j)-th loss.

Next, each of the 1st learning device 200_1 to the n-th learning device 200_*n* may perform or support another device to perform a process of training each of the 1st obfuscation network to the n-th obfuscation network such that each of (1) at least one of the (1_1_1)-st loss to the (1_1_m)-th loss to (2) at least one of the (1_n_1)-st loss to the (1_n_m)-th loss is minimized and such that each of the 1st obfuscated data score to the n-th obfuscated data score, corresponding to each of the 1st obfuscated data to the n-th obfuscated data inputted into each of the 1st discriminator to the n-th discriminator, is maximized. Also, each of the 1st learning device 200_1 to the n-th learning device 200_*n* may perform or support another device to perform a process of training each of the 1st obfuscation network to the n-th obfuscation network such that each of the 1st average loss to the n-th average loss is minimized and such that each of the 1st obfuscated data score to the n-th obfuscated data score is maximized.

Also, each of the 1st learning device 200_1 to the n-th learning device 200_*n* may perform or support another device to perform a process of training each of the 1st discriminator to the n-th discriminator such that each of the 1st obfuscated data score to the n-th obfuscated data score is minimized and such that each of (1) the 1st modified data score or the 1st modified obfuscated data score to (2) the n-th modified data score or the n-th modified obfuscated data score is maximized, where each of (1) the 1st modified data score or the 1st modified obfuscated data score to (2) the n-th modified data score or the n-th modified obfuscated data score corresponds to each of (1) the 1st modified data or the 1st modified obfuscated data to (2) the n-th modified data or the n-th modified obfuscated data inputted into each of the 1st discriminator to the n-th discriminator.

Thereafter, each of the 1st learning device 200_1 to the n-th learning device 200_*n* may perform or support another device to perform a process of transmitting each of (1) the 1st network gradient of the trained 1st obfuscation network to (2) the n-th network gradient of the trained n-th obfuscation network to the master learning device 100.

Then, the master learning device 100 may perform or support another device to perform a process of updating, i.e., training, the master obfuscation network by referring to the average network gradient which is averaged over the 1st network gradient to the n-th network gradient respectively acquired from the 1st learning device 200_1 to the n-th learning device 200_*n*.

Meanwhile, the master learning device 100 is shown above as transmitting each of the (1_1)-st loss to the (1_n)-th loss to each of the 1st learning device 200_1 to the n-th learning device 200_n, where, supposing that the integer r satisfies the condition 1≤r≤n and that the integer j satisfies the condition the (1_r)-th loss may include (i) at least one of the (1_r_1)-st loss to the (1_r_j)-th loss or (ii) the r-th average loss calculated by averaging over the (1_r_1)-st loss to the (1_r_j)-th loss, to thereby allow each of the 1st learning device 200_1 to the n-th learning device 200_n to train each of the 1st obfuscation network to the n-th obfuscation network by using (i) each of the 1st loss pair comprised of the (1_1)-st loss and the (2_1)-st loss to (ii) each of the n-th loss pair comprised of the (1_n)-th loss and the (2_n)-th loss. However, as another example, the master learning device 100 may perform or support another device to perform a process of sequentially transmitting each of (i) the (1_1_1)-st loss to the (1_1_m)-th loss to (ii) the (1_n_1)-st loss to the (1_n_m)-th loss to each of the 1st learning device 200_1 to the n-th learning device 200_n, to thereby allow each of the 1st learning device 200_1 to the n-th learning device 200_n to sequentially train each of the 1st obfuscation network to the n-th obfuscation network by using each of (i) the (1_1_1)-st loss to the (1_1_m)-th loss to (ii) the (1_n_1)-st loss to the (1_n_m)-th loss.

That is, each of the 1st learning device 200_1 to the n-th learning device 200_n may perform or support another device to perform a process of inputting each of the 1st original data to the n-th original data into each of the 1st obfuscation network to the n-th obfuscation network, to thereby allow each of the 1st obfuscation network to the n-th obfuscation network to obfuscate each of the 1st original data to the n-th original data, and thus to generate each of (1_1)-st obfuscated data to (n_1)-st obfuscated data.

And, each of the 1st learning device 200_1 to the n-th learning device 200_n may perform or support another device to perform a process of allowing each of (i) the (1_1)-st obfuscated data and the 1st ground truth to (ii) the (n_1)-st obfuscated data and the n-th ground truth to be transmitted to the master learning device 100.

Then, the master learning device 100 may perform or support another device to perform (i) a process of inputting the (1_1)-st obfuscated data to the (n_1)-st obfuscated data into the 1st surrogate network, to thereby allow each learning operation to each of the (1_1)-st obfuscated data to the (n_1)-st obfuscated data and thus to generate each of the (1_1)-st characteristic information to the (n_1)-st characteristic information corresponding to each of the (1_1)-st obfuscated data to the (n_1)-st obfuscated data, and (ii) a process of calculating each of the (1_1_1)-st loss to the (1_n_1)-st loss, where the (1_1_1)-st loss may be calculated by referring to the 1st ground truth and at least one of the (1_1)-st characteristic information and its corresponding (1_1)-st task specific output and where the (1_1)-st task specific output may be created by using the (1_1)-st characteristic information, where the (1_n_1)-st loss may be calculated by referring to the n-th ground truth and at least one of the (n_1)-st characteristic information and its corresponding (n_1)-st task specific output and where the (n_1)-st task specific output may be created by using the (n_1)-st characteristic information, that is, supposing that the integer r satisfies the condition 1≤r≤n, the (1_r_1)-st loss may be calculated by referring to the r-th ground truth and at least one of the (r_1)-st characteristic information and its corresponding (r_1)-st task specific output and the (r_1)-st task specific output may be created by using the (r_1)-st characteristic information.

And, the master learning device 100 may perform or support another device to perform a process of training the 1st surrogate network such that each of the (1_1_1)-st loss to the (1_n_1)-st loss is minimized, and a process of transmitting each of the (1_1_1)-st loss to the (1_n_1)-st loss to each of the 1st learning device 200_1 to the n-th learning device 200_n. Herein, the master learning device 100 may perform or support another device to perform a process of training the 1st surrogate network such that the average loss is minimized which is averaged over the (1_1_1)-st loss to the (1_n_1)-st loss.

Then, each of the 1st learning device 200_1 to the n-th learning device 200_n may perform or support another device to perform a process of training each of the 1st obfuscation network to the n-th obfuscation network such that each of the (1_1_1)-st loss to the (1_n_1)-st loss is minimized and such that each of a (1_1)-st obfuscated data score to an (n_1)-st obfuscated data score is maximized, where the (1_1)-st obfuscated data score may correspond to the (1_1)-st obfuscated data inputted into the 1st discriminator, and where the (n_1)-st obfuscated data score may correspond to the (n_1)-st obfuscated data inputted into the n-th discriminator, that is, supposing that the integer r satisfies the condition 1≤r≤n, the (r_1)-st obfuscated data score may correspond to the (r_1)-st obfuscated data inputted into the r-th discriminator. And as a result, each of the 1st learning device 200_1 to the n-th learning device 200_n may allow each of the 1st obfuscation network to the n-th obfuscation network to be each of the 1st trained 1st obfuscation network to the 1st trained n-th obfuscation network.

Also, each of the 1st learning device 200_1 to the n-th learning device 200_n may perform or support another device to perform a process of training each of the 1st discriminator to the n-th discriminator such that each of the (1_1)-st obfuscated data score to the (n_1)-st obfuscated data score is minimized and such that each of (1) the 1st modified data score or the 1st modified obfuscated data score to (2) the n-th modified data score or the n-th modified obfuscated data score is maximized, where each of (1) the 1st modified data score or the 1st modified obfuscated data score to (2) the n-th modified data score or the n-th modified obfuscated data score corresponds to each of (1) the 1st modified data or the 1st modified obfuscated data to (2) the n-th modified data or the n-th modified obfuscated data inputted into each of the 1st discriminator to the n-th discriminator. And as a result, each of the 1st learning device 200_1 to the n-th learning device 200_n may allow each of the 1st discriminator to the n-th discriminator to be each of a 1st trained 1st discriminator to a 1st trained n-th discriminator.

Thereafter, by repeating the processes above while increasing an integer k from 2 to m, the master learning device 100 may perform or support another device to perform a process of training the m-th surrogate network using the (1_1_m)-th loss to the (1_n_m)-th loss corresponding to outputs from the m-th surrogate network, and a process of transmitting each of the (1_1_m)-th loss to the (1_n_m)-th loss to each of the 1st learning device 200_1 to the n-th learning device 200_n, to thereby allow each of the 1st learning device 200_1 to the n-th learning device 200_n to train each of the (m-1)-th trained 1st obfuscation network to the (m-1)-th trained n-th obfuscation network using each of the (1_1_m)-th loss to the (1_n_m)-th loss and thus to acquire each of an m-th trained 1st obfuscation network to an m-th trained n-th obfuscation network.

That is, the master learning device 100 may perform or support another device to perform a process of acquiring the (1_k)-th obfuscated data to the (n_k)-th obfuscated data, where the (1_k)-th obfuscated data may be created by obfuscating the 1st original data, from the 1st learning device 200_1, through the (k-1)-th trained 1st obfuscation network, and where the (n_k)-th obfuscated data may be created by obfuscating the n-th original data, from the n-th learning device 200_n, through the (k-1)-th trained n-th obfuscation network, that is, supposing that an integer r satisfies a condition $1 \leq r \leq n$, the (r_k)-th obfuscated data may be created by obfuscating the r-th original data, from the r-th learning device 200_r.

And, the master learning device 100 may perform or support another device to perform a process of inputting the (1_k)-th obfuscated data to the (n_k)-th obfuscated data into the k-th surrogate network, to thereby allow the k-th surrogate network to apply each learning operation to each of the (1_k)-th obfuscated data to the (n_k)-th obfuscated data and thus to generate each of (1_k)-th characteristic information to (n_k)-th characteristic information corresponding to each of the (1_k)-th obfuscated data to the (n_k)-th obfuscated data.

Thereafter, the master learning device 100 may perform or support another device to perform a process of calculating at least one (1_1_k)-th loss to at least one (1_n_k)-th loss, where the (1_1_k)-th loss may be calculated by referring to (i) the 1st ground truth and (ii) at least one of the (1_k)-th characteristic information and its corresponding (1_k)-th task specific output and where the (1_k)-th task specific output may be created by using the (1_k)-th characteristic information, and where the (1_n_k)-th loss may be calculated by referring to (i) the n-th ground truth and (ii) at least one of the (n_k)-th characteristic information and its corresponding (n_k)-th task specific output and where the (n_k)-th task specific output may be created by using the (n_k)-th characteristic information, that is, supposing that the integer r satisfies the condition n, the (1_r_k)-th loss may be calculated by referring to (i) the r-th ground truth and (ii) at least one of the (r_k)-th characteristic information and its corresponding (r_k)-th task specific output and where the (r_k)-th task specific output may be created by using the (r_k)-th characteristic information.

Next, the master learning device 100 may perform or support another device to perform a process of training the k-th surrogate network such that each of the (1_1_k)-th loss to the (1_n_k)-th loss is minimized, and a process of transmitting each of the (1_1_k)-th loss to the (1_n_k)-th loss to each of the 1st learning device 200_1 to the n-th learning device 200_n.

Then, each of the 1st learning device 200_1 to the n-th learning device 200_n may perform or support another device to perform a process of training each of the (k-1)-th trained 1st obfuscation network to the (k-1)-th trained n-th obfuscation network such that each of the (1_1_k)-th loss to the (1_n_k)-th loss is minimized and such that each of a (1_k)-th obfuscated data score to an (n_k)-th obfuscated data score is maximized, where the (1_k)-th obfuscated data score may correspond to the (1_k)-th obfuscated data inputted into the (k-1)-th trained 1st discriminator, and where the (n_k)-th obfuscated data score may correspond to the (n_k)-th obfuscated data inputted into the (k-1)-th trained n-th discriminator, that is, supposing that the integer r satisfies the condition $1 \leq r \leq n$, the (r_k)-th obfuscated data score may correspond to the (r_k)-th obfuscated data inputted into the (k-1)-th trained r-th discriminator. And as a result, each of the 1st learning device 200_1 to the n-th learning device 200_n may allow each of the (k-1)-th trained 1st obfuscation network to the (k-1)-th trained n-th obfuscation network to be each of the k-th trained 1st obfuscation network to the k-th trained n-th obfuscation network.

Also, each of the 1st learning device 200_1 to the n-th learning device 200_n may perform or support another device to perform a process of training each of the (k-1)-th trained 1st discriminator to the (k-1)-th trained n-th discriminator such that each of the (1_k)-th obfuscated data score to the (n_k)-th obfuscated data score is minimized and such that each of (1) the 1st modified data score or the 1st modified obfuscated data score to (2) the n-th modified data score or the n-th modified obfuscated data score is maximized, where each of (1) the 1st modified data score or the 1st modified obfuscated data score to (2) the n-th modified data score or the n-th modified obfuscated data score corresponds to each of (1) the 1st modified data or the 1st modified obfuscated data to (2) the n-th modified data or the n-th modified obfuscated data inputted into each of the (k-1)-th trained 1st discriminator to the (k-1)-th trained n-th discriminator. And as a result, each of the 1st learning device 200_1 to the n-th learning device 200_n may allow each of the (k-1)-th trained 1st discriminator to the (k-1)-th trained n-th discriminator to be each of a k-th trained 1st discriminator to a k-th trained n-th discriminator.

By repeating the processes above until k reaches m, each of the 1st learning device 200_1 to the n-th learning device 200_n may perform or support another device to perform a process of acquiring each of the m-th trained 1st obfuscation network to the m-th trained n-th obfuscation network, and a process of transmitting each of (1) the 1st network gradient of the m-th trained 1st obfuscation network to (2) the n-th network gradient of the m-th trained n-th obfuscation network to the master learning device 100. Herein, the 1st network gradient may be a difference between the 1st obfuscation network before being trained and the m-th trained 1st obfuscation network, and the n-th network gradient may be a difference between the n-th obfuscation network before being trained and the m-th trained n-th obfuscation network, that is, supposing that the integer r satisfies the condition $1 \leq r \leq n$, the r-th network gradient may be a difference between the r-th obfuscation network before being trained and the m-th trained r-th obfuscation network.

Then, the master learning device 100 may perform or support another device to perform a process of updating, i.e., training, the master obfuscation network by referring to the average network gradient which is averaged over the 1st network gradient to the n-th network gradient respectively acquired from the 1st learning device 200_1 to the n-th learning device 200_n.

Figure 6:
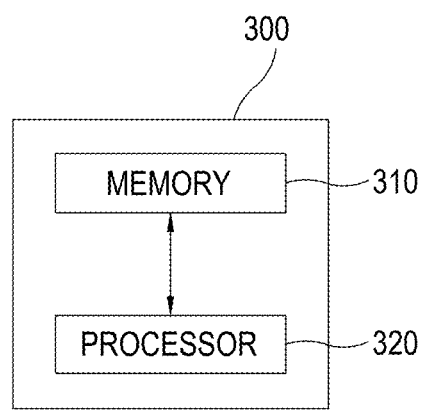
FIG. 6 is a drawing schematically illustrating a testing device for testing the trained obfuscation networks in accordance with one example embodiment of the present disclosure.

FIG. 6 is a drawing schematically illustrating a testing device for testing a trained obfuscation network in accordance with one example embodiment of the present disclosure.

By referring to FIG. 6, the testing device 300 in accordance with one example embodiment of the present disclosure may include a memory 310 for storing instructions to test the trained obfuscation network which has been trained to obfuscate original data for testing, to thereby generate obfuscated data for testing, such that the surrogate network outputs a 1st result calculated by using the obfuscated data for testing as an input, same as or similar to a 2-nd result calculated by using the original data for testing as an input, and a processor 320 for performing processes to test the trained obfuscation network according to the instructions in the memory 310.

Specifically, the testing device 300 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS (operating system) and software configuration of applications that achieve specific purposes.

Such description of the computing device does not exclude an integrated device including any combination of a processor, a memory, a medium, or any other computing components for implementing the present disclosure.

Meanwhile, on condition that the obfuscation network has been trained in accordance with the training method explained by referring to FIGS. 2 to 5, if the original data for testing to be used for concealing, i.e., anonymizing, is inputted, the processor 320 may input the original data for testing into the obfuscation network, to thereby allow the obfuscation network to generate the obfuscated data for testing by obfuscating the original data for testing, according to the instructions stored in the memory 310. Herein, the trained obfuscation network may be the master obfuscation network or may be one of the 1st obfuscation network to the n-th obfuscation network, as shown in FIGS. 2 to 5.

As one example, on condition that the master learning device has performed or supported another device to perform (a) a process of acquiring (i) 1st obfuscated data for training and a 1st ground truth to (ii) n-th obfuscated data for training and an n-th ground truth respectively from the 1st learning device 200_1 to the n-th learning device 200_n, where the 1st obfuscated data for training may be created by obfuscating 1st original data for training through the 1st obfuscation network, where the 1st ground truth may correspond to the 1st original data for training, where the n-th obfuscated data for training may be created by obfuscating n-th original data for training through the n-th obfuscation network, where the n-th ground truth may correspond to the n-th original data for training, that is, supposing that the integer r satisfies the condition 1≤r≤n, the r-th obfuscated data for training may be created by obfuscating the r-th original data for training through the r-th obfuscation network and the r-th ground truth may correspond to the r-th original data for training, where the 1st learning device 200_1 may correspond to the 1st party which is determined as a 1st owner of the 1st original data for training and its corresponding 1st ground truth or is an entity to which the 1st original data for training and its corresponding 1st ground truth are delegated by the 1st owner, where the n-th learning device 200_n may correspond to an n-th party which is determined as an n-th owner of the n-th original data for training and its corresponding n-th ground truth or is an entity to which the n-th original data for training and its corresponding n-th ground truth are delegated by the n-th owner, that is, supposing that the integer r satisfies the condition 1≤r≤n, the r-th learning device 200_r may correspond to the r-th party which is determined as the r-th owner of the r-th original data for training and its corresponding r-th ground truth or is an entity to which the r-th original data for training and its corresponding r-th ground truth are delegated by the r-th owner and where n is an integer larger than 1, (b) (i) a process of inputting each of the 1st obfuscated data for training to the n-th obfuscated data for training into the surrogate network, to thereby allow the surrogate network to apply each learning operation to each of the 1st obfuscated data for training to the n-th obfuscated data for training and thus to generate each of 1st characteristic information for training to n-th characteristic information for training corresponding to each of the 1st obfuscated data for training to the n-th obfuscated data for training, (ii) a process of calculating the (1_1)-st loss to the (1_n)-th loss where the (1_1)-st loss may be calculated by referring to the 1st ground truth and at least one of the 1st characteristic information for training and its corresponding 1st task specific output for training and where the (1_n)-th loss may be calculated by referring to the n-th ground truth and at least one of the n-th characteristic information for training and its corresponding n-th task specific output for training, that is, supposing that the integer r satisfies the condition 1≤r≤n, the (1_r)-th loss may be calculated by referring to the r-th ground truth and at least one of the r-th characteristic information for training and its corresponding r-th task specific output for training, and (iii) a process of training the surrogate network such that each of the (1_1)-st loss to the (1_n)-th loss is minimized or such that the average loss calculated by averaging over the (1_1)-st loss to the (1_n)-th loss is minimized, and (c) (i) a process of transmitting each of the (1_1)-st loss to the (1_n)-th loss to each of the 1st learning device to the n-th learning device, to thereby allow each of the 1st learning device to the n-th learning device to (i-1) train each of the 1st obfuscation network to the n-th obfuscation network such that each of the (1_1)-st loss to the (1_n)-th loss is minimized and such that each of the (2_1)-st loss to the (2_n)-th loss is maximized where the (2_1)-st loss may be calculated by referring to the 1st original data for training and the 1st obfuscated data for training and where the (2_n)-th loss may be calculated by referring to the n-th original data for training and the n-th obfuscated data for training, that is, supposing that the integer r satisfies the condition 1≤r≤n, the (2_r)-th loss may be calculated by referring to the r-th original data for training and the r-th obfuscated data for training, and (i-2) transmit to the master learning device (1) the 1st network gradient of the trained 1st obfuscation network to (2) the n-th network gradient of the trained n-th obfuscation network, and (ii) a process of updating the master obfuscation network by referring to the average network gradient which is averaged over the 1st network gradient to the n-th network gradient, then the processor 320 of the testing device 300 may perform or support another device to perform a process of acquiring original data for testing to be concealed, i.e., anonymized.

And, according to the instructions stored in the memory 310, the processor 320 of the testing device 300 may perform or support another device to perform one of (i) a process of inputting the original data for testing into the master obfuscation network and (ii) a process of inputting the original data for testing into at least one of the 1st obfuscation network to the n-th obfuscation network, to thereby allow at least one of the master obfuscation network and the 1st obfuscation network to the n-th obfuscation network to obfuscate the original data for testing, and thus to generate obfuscated data for testing.

Figure 7:
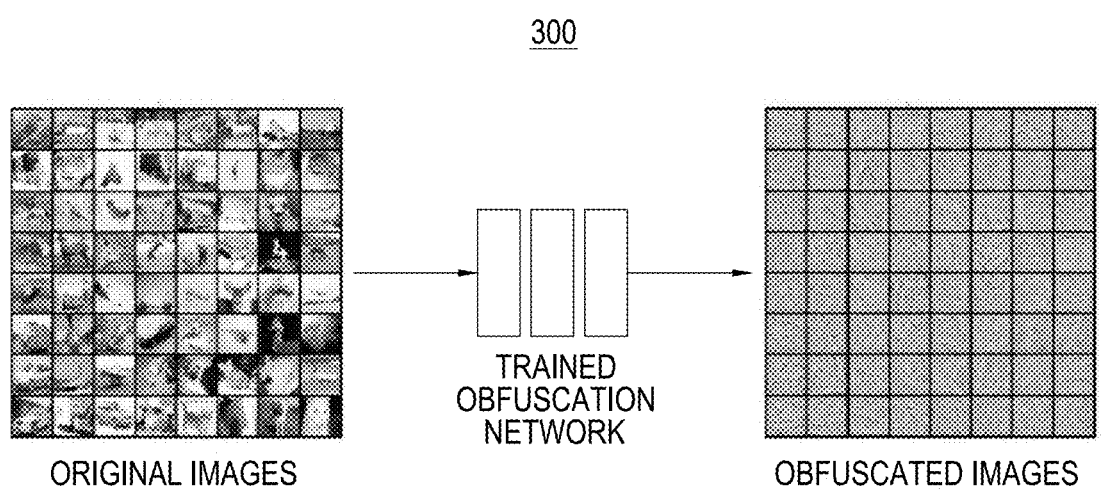
FIG. 7 is a drawing schematically illustrating a method for testing the trained obfuscation network in accordance with one example embodiment of the present disclosure.

FIG. 7 is a drawing schematically illustrating a method for testing the trained obfuscation network in accordance with one example embodiment of the present disclosure.

By referring to FIG. 7, the testing device 300 may perform or support another device to perform a process of inputting the original data for testing, e.g., original images on a left side of FIG. 7, into the obfuscation network, to thereby allow the obfuscation network to obfuscate the original data for testing and thus to output the obfuscated data for testing, e.g., obfuscated images on a right side of FIG. 7. Herein, the obfuscation network may have been trained to obfuscate the original data such that the surrogate network outputs a 1st result calculated by using the obfuscated data as an input, same as or similar to a 2-nd result calculated by using the original data as an input.

For reference, the left side of FIG. 7 is a drawing exemplarily illustrating 64 image samples selected from the CIFAR-10 dataset which includes images collected and labeled by Canadian Institute for Advanced Research (CIFAR) for image classification.

The obfuscated data generated by concealing, i.e., anonymizing, the image samples on the left side of FIG. 7 used as the original data are shown on the right side of FIG. 7.

By referring to FIG. 7, 64 pieces of the obfuscated data on the right side of FIG. 7 which are concealed in accordance with the present disclosure are visually different from 64 pieces of the original data on the left side of FIG. 7, but if the 64 pieces of the obfuscated data are inputted into the surrogate network, the surrogate network outputs the 1st result same as or similar to the 2-nd result created by inputting the original data into the surrogate network.

Meanwhile, the trained obfuscation network may have been trained beforehand by processes similar to those in description of FIGS. 2 to 5.

Meanwhile, the obfuscated data which are concealed, i.e., anonymized, by the trained obfuscation network in accordance with the present disclosure may be provided or sold to a buyer of big data of images.

Also, in accordance with the present disclosure, when the concealed image data are provided or sold to the buyer, the testing method of the trained obfuscation network may be provided as implemented in a form of program instructions executable by a variety of computer components and recorded to computer readable media. In accordance with one example embodiment of the present disclosure, the buyer may execute the program instructions recorded in the computer readable media by using the computer devices, to thereby convert the original data, owned by the buyer or acquired from other sources, into concealed data and thus allow the concealed data to be used for his/her own surrogate network. Also, the buyer may use at least two of the concealed data, the original image data owned by the buyer or acquired from other sources, and the concealed image data provided or sold to the buyer, together for the buyer's surrogate network.

Meanwhile, if the testing method of the trained obfuscation network is implemented as the program instructions that can be executed by a variety of the computer components, then computational overhead may occur in the computing devices of the buyer when accuracy of the trained obfuscation network is set as high. Therefore, in accordance with one example embodiment of the present disclosure, the buyer is allowed to lower the accuracy to prevent the computational overhead.

The present disclosure has an effect of performing concealment, i.e., anonymization, in a simple and accurate way, since a process of searching data for personal identification information and a process of concealing the personal identification information in the searched data are eliminated.

The present disclosure has another effect of protecting privacy and security of the original data by generating the concealed data, i.e., anonymized data through irreversibly obfuscating the original data.

The present disclosure has still another effect of generating the obfuscated data recognized as similar or same by computers but recognized as different by humans.

The present disclosure has still yet another effect of stimulating a big data trade market.

The embodiments of the present disclosure as explained above can be implemented in a form of executable program command through a variety of computer means recordable in computer readable media. The computer readable media may include solely or in combination, program commands, data files, and data structures. The program commands recorded to the media may be components specially designed for the present disclosure or may be usable to those skilled in the art of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which may be executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method of a master learning device to train one or more obfuscation networks which conceal original data to be used for machine learning and to train one or more surrogate networks which use obfuscated data generated by the obfuscation networks, comprising steps of:

(a) a master learning device performing or supporting another device to perform a process of acquiring (i) a 1st obfuscation pair comprised of 1st obfuscated data and a 1st ground truth to (ii) an n-th obfuscation pair comprised of n-th obfuscated data and an n-th ground truth respectively from a 1st learning device to an n-th learning device, wherein the 1st obfuscated data is created by obfuscating 1st original data through a 1st obfuscation network, wherein the 1st ground truth corresponds to the 1st original data, wherein the n-th obfuscated data is created by obfuscating n-th original data through an n-th obfuscation network, wherein the n-th ground truth corresponds to the n-th original data, wherein the 1st learning device corresponds to a 1st party which is determined as a 1st owner of the 1st original data and its corresponding 1st ground truth or is an entity to which the 1st original data and its corresponding 1st ground truth are delegated by the 1st owner, wherein the n-th learning device corresponds to an n-th party which is determined as an n-th owner of the n-th original data and its corresponding n-th ground truth or is an entity to which the n-th original data and its corresponding n-th ground truth are delegated by the n-th owner, and wherein n is an integer larger than 1;
(b) the master learning device performing or supporting another device to perform (i) a process of inputting each of the 1st obfuscated data to the n-th obfuscated data into a surrogate network, to thereby allow the surrogate network to apply at least one each learning operation to each of the 1st obfuscated data to the n-th obfuscated data and thus to generate 1st characteristic information to n-th characteristic information respectively corresponding to the 1st obfuscated data to the n-th obfuscated data, (ii) a process of calculating at least one (1_1)-st loss to at least one (1_n)-th loss wherein the (1_1)-st loss is calculated by referring to the 1st ground truth and at least one of the 1st characteristic information and its corresponding 1st task specific output and wherein the (1_n)-th loss is calculated by referring to the n-th ground truth and at least one of the n-th characteristic information and its corresponding n-th task specific output, and (iii) a process of training the surrogate network such that each of the (1_1)-st loss to the (1_n)-th loss is minimized or such that an average loss calculated by averaging over the (1_1)-st loss to the (1_n)-th loss is minimized; and
(c) the master learning device performing or supporting another device to perform (i) a process of transmitting the (1_1)-st loss to the (1_n)-th loss respectively to the 1st learning device to the n-th learning device, to thereby allow each of the 1st learning device to the n-th learning device to (i-1) train each of the 1st obfuscation network to the n-th obfuscation network such that each of the (1_1)-st loss to the (1_n)-th loss is minimized and such that each of at least one (2_1)-st loss to at least one (2_n)-th loss is maximized wherein the (2_1)-st loss is calculated by referring to the 1st original data and the 1st obfuscated data and wherein the (2_n)-th loss is calculated by referring to the n-th original data and the n-th obfuscated data, and (i-2) transmit to the master learning device a 1st network gradient of the trained 1st obfuscation network to an n-th network gradient of the trained n-th obfuscation network, and (ii) a process of updating the master obfuscation network by referring to an average network gradient which is averaged over the 1st network gradient to the n-th network gradient.

2. The method of claim 1, wherein the surrogate network includes a 1st surrogate network to an m-th surrogate network and wherein m is an integer greater than 2,
wherein, at the step of (b), the master learning device performs or supports another device to perform (i) a process of inputting all of the 1st obfuscated data to the n-th obfuscated data into each of the 1st surrogate network to the m-th surrogate network, to thereby allow each of the 1st surrogate network to the m-th surrogate network to apply each learning operation to all of the 1st obfuscated data to the n-th obfuscated data, and thus to generate (i-1) (1_1)-st characteristic information to (n_1)-st characteristic information to (i-2) (1_m)-th characteristic information to (n_m)-th characteristic information, (ii) a process of calculating (ii-1) at least one (1_1_1)-st loss to at least one (1_n_1)-st loss to (ii-2) at least one (1_1_m)-th loss to at least one (1_n_m)-th loss, wherein the (1_1_1)-st loss is calculated by referring to the 1st ground truth and at least one of (1_1)-st characteristic information and its corresponding (1_1)-st task specific output, wherein the (1_n_1)-st loss is calculated by referring to the n-th ground truth and at least one of the (n_1)-st characteristic information and its corresponding (n_1)-st task specific output, wherein the (1_1_m)-th loss is calculated by referring to the 1st ground truth and at least one of (1_m)-th characteristic information and its corresponding (1_m)-th task specific output, and wherein the (1_n_m)-th loss is calculated by referring to the n-th ground truth and at least one of (n_m)-th characteristic information and its corresponding (n_m)-th task specific output, and (iii) a process of training the 1st surrogate network to the m-th surrogate network such that each of (iii-1) the (1_1_1)-st loss to the (1_n_1)-st loss to (iii-2) the (1_1_m)-th loss to the (1_n_m)-th loss is minimized,
wherein, at the step of (c), the master learning device performs or supports another device to perform (i) a process of transmitting each of the (1_1)-st loss to the (1_n)-th loss to each of the 1st learning device to the n-th learning device wherein the (1_1)-st loss includes (1) at least one of the (1_1_1)-st loss to the (1_1_m)-th loss or (2) a 1st average loss calculated by averaging over the (1_1_1)-st loss to the (1_1_m)-th loss and wherein the (1_n)-th loss includes (1) at least one of the (1_n_1)-st loss to the (1_n_m)-th loss or (2) an n-th average loss calculated by averaging over the (1_n_1)-st loss to the (1_n_m)-th loss, to thereby allow each of the 1st learning device to the n-th learning device to (i-1) train each of the 1st obfuscation network to the n-th obfuscation network such that each of the (1_1)-st loss to the (1_n)-th loss is minimized and such that each of the (2_1)-st loss to the (2_n)-th loss is maximized, and (i-2) transmit the 1st network gradient to the n-th network gradient to the master learning device, and (ii) a process of updating the master obfuscation network by referring to the average network gradient.

3. The method of claim 1, wherein the surrogate network includes a 1st surrogate network to an m-th surrogate network and wherein m is an integer greater than 2,
wherein, at the step of (a), the master learning device performs or supports another device to perform a process of acquiring a 1st sub-obfuscation pair comprised of the 1st ground truth and (1_1)-st obfuscated data to an n-th sub-obfuscation pair comprised of the n-th ground truth and (n_1)-st obfuscated data, wherein the (1_1)-st obfuscated data is created by obfuscating the 1st original data through the 1st obfuscation network, and wherein the (n_1)-st obfuscated data is created by obfuscating the n-th original data through the n-th obfuscation network,
wherein, at the step of (b), the master learning device performs or supports another device to perform (i) a process of inputting each of the (1_1)-st obfuscated data to the (n_1)-st obfuscated data into the 1st surrogate network, to thereby allow the 1st surrogate network to apply at least one each learning operation to each of the (1_1)-st obfuscated data to the (n_1)-st obfuscated data and thus to generate (1_1)-st characteristic information to (n_1)-st characteristic information respectively corresponding to the (1_1)-st obfuscated data to the (n_1)-st obfuscated data, (ii) a process of calculating at least one (1_1_1)-st loss to at least one (1_n_1)-th loss wherein the (1_1_1)-st loss is calculated by referring to the 1st ground truth and at least one of the (1_1)-st characteristic information and its corresponding (1_1)-st task specific output and wherein the (1_n_1)-th loss is calculated by referring to the n-th ground truth and at least one of the (n_1)-th characteristic information and its corresponding (n_1)-th task specific output, and (iii) a process of training the surrogate network such that each of the (1_1_1)-st loss to the (1_n_1)-th loss is minimized or such that an average loss calculated by averaging over the (1_1_1)-st loss to the (1_n_1)-th loss is minimized, wherein, at the step of (c), the master learning device performs or supports another device to perform a process of transmitting the (1_1_1)-st loss to the (1_n_1)-th loss respectively to the 1st learning device to the n-th learning device, to thereby allow each of the 1st learning device to the n-th learning device to (i-1) train each of the 1st obfuscation network to the n-th obfuscation network such that each of the (1_1_1)-st loss to the (1_n_1)-th loss is minimized and such that each of at least one (2_1_1)-st loss to at least one (2_n_1)-th loss is maximized wherein the (2_1_1)-st loss is calculated by referring to the 1st original data and the (1_1)-st obfuscated data and wherein the (2_n_1)-th loss is calculated by referring to the n-th original data and the (n_1)-th obfuscated data, and, as a result, a process of allowing each of the 1st obfuscation network to the n-th obfuscation network to be each of a 1st trained 1st obfuscation network to a 1st trained n-th obfuscation network, wherein, while increasing an integer k from 2 to m, the master learning device performs or supports another device to perform (I) a process of acquiring (1_k)-th obfuscated data to (n_k)-th obfuscated data, wherein the (1_k)-th obfuscated data is created by obfuscating the 1st original data through a (k-1)-th trained 1st obfuscation network, and wherein the (n_k)-th obfuscated data is created by obfuscating the n-th original data through a (k-1)-th trained n-th obfuscation network, (II) (II-1) a process of inputting the (1_k)-th obfuscated data to the (n_k)-th obfuscated data into a k-th surrogate network, to thereby allow the k-th surrogate network to apply each learning operation to each of the (1_k)-th obfuscated data to the (n_k)-th obfuscated data and thus to generate (1_k)-th characteristic information to (n_k)-th characteristic information respectively corresponding to the (1_k)-th obfuscated data to the (n_k)-th obfuscated data, (II-2) a process of calculating at least one (1_1_k)-th loss to at least one (1_n_k)-th loss, wherein the (1_1_k)-th loss is calculated by referring to the 1st ground truth and at least one of the (1_k)-th characteristic information and its corresponding (1_k)-th task specific output, and wherein the (1_n_k)-th loss is calculated by referring to the n-th ground truth and at least one of the (n_k)-th characteristic information and its corresponding (n_k)-th task specific output, and (II-3) a process of training the k-th surrogate network such that each of the (1_1_k)-th loss to the (1_n_k)-th loss is minimized, and (III) a process of transmitting each of the (1_1_k)-th loss to the (1_n_k)-th loss to each of the 1st learning device to the n-th learning device, to thereby allow each of the 1st learning device to the n-th learning device to (III-1) train each of the (k-1)-th trained 1st obfuscation network to the (k-1)-th trained n-th obfuscation network such that each of the (1_1_k)-th loss to the (1_n_k)-th loss is minimized and such that each of (2_1_k)-th loss to (2_n_k)-th loss is maximized, wherein the (2_1_k)-th loss is calculated by referring to the 1st original data and the (1_k)-th obfuscated data, and wherein the (2_n_k)-th loss is calculated by referring to the n-th original data and the (n_k)-th obfuscated data and thus (III-2) allow each of the (k-1)-th trained 1st obfuscation network to the (k-1)-th trained n-th obfuscation network to be each of a k-th trained 1st obfuscation network to a k-th trained n-th obfuscation network, and wherein the master learning device performs or supports another device to perform (i) a process of allowing each of the 1st learning device to the n-th learning device to transmit to the master learning device each of the 1st network gradient of an m-th trained 1st obfuscation network to the n-th network gradient of an m-th trained n-th obfuscation network, and (ii) a process of updating the master obfuscation network by referring to the average network gradient which is averaged over the 1st network gradient to the n-th network gradient.

4. The method of claim 1, wherein, at the step of (c), when a 1st obfuscated data score to an n-th obfuscated data score have been acquired respectively as the (2_1)-st loss to the (2_n)-th loss wherein the 1st obfuscated data score to the n-th obfuscated data score respectively correspond to the 1st obfuscated data to the n-th obfuscated data respectively inputted into a 1st discriminator to an n-th discriminator to be used for determining whether their inputted data is real or fake, the master learning device performs or supports another device to perform a process of transmitting each of the (1_1)-st loss to the (1_n)-th loss to each of the 1st learning device to the n-th learning device, to thereby allow each of the 1st learning device to the n-th learning device to (i) train each of the 1st obfuscation network to the n-th obfuscation network such that each of the (1_1)-st loss to the (1_n)-th loss is minimized and such that each of the (2_1)-st loss to the (2_n)-th loss is maximized, and (ii) train each of the 1st discriminator to the n-th discriminator such that each of the 1st obfuscated data score to the n-th obfuscated data score is minimized and such that each of a 1st modified data score or a 1st modified obfuscated data score to an n-th modified data score or an n-th modified obfuscated data score is maximized, wherein the 1st modified data score or the 1st modified obfuscated data score to the n-th modified data score or the n-th modified obfuscated data score respectively correspond to the 1st modified data or the 1st modified obfuscated data to the n-th modified data or the n-th modified obfuscated data respectively inputted into the 1st discriminator to the n-th discriminator, wherein the 1st modified data or the 1st modified obfuscated data is created by respectively modifying the 1st original data or the 1st obfuscated data, and wherein the n-th modified data or the n-th modified obfuscated data is created by respectively modifying the n-th original data or the n-th obfuscated data.

5. The method of claim 4, wherein the surrogate network includes a 1st surrogate network to an m-th surrogate network wherein m is an integer greater than 2, wherein, at the step of (b), the master learning device performs or supports another device to perform (i) a process of inputting each of the 1st obfuscated data to the n-th obfuscated data into each of the 1st surrogate network to the m-th surrogate network, to thereby allow each of the 1st surrogate network to the m-th surrogate network to apply each learning operation to each of the 1st obfuscated data to the n-th obfuscated data, and thus to generate (i-1) (1_1)-st characteristic information to (n_1)-st characteristic information to (i-2) (1_m)-th characteristic information to (n_m)-th characteristic information, (ii) a process of calculating (ii-1) at least one (1_1_1)-st loss to at least one (1_n_1)-st loss to (ii-2) at least one (1_1_m)-th loss to at least one (1_n_m)-th loss, wherein the (1_1_1)-st loss is calculated by referring to the 1st ground truth and at least one of (1_1)-st characteristic information and its corresponding (1_1)-st task specific output, wherein the (1_n_1)-st loss is calculated by referring to the n-th ground truth and at least one of the (n_1)-st characteristic information and its corresponding (n_1)-st task specific output, wherein the (1_1_m)-th loss is calculated by referring to the 1st ground truth and at least one of (1_m)-th characteristic information and its corresponding (1_m)-th task specific output, and wherein the (1_n_m)-th loss is calculated by referring to the n-th ground truth and at least one of (n_m)-th characteristic information and its corresponding (n_m)-th task specific output, and (iii) a process of training the 1st surrogate network to the m-th surrogate network such that each of (iii-1) the (1_1_1)-st loss to the (1_n_1)-st loss to (iii-2) the (1_1_m)-th loss to the (1_n_m)-th loss is minimized, and wherein, at the step of (c), the master learning device performs or supports another device to perform (i) a process of transmitting each of the (1_1)-st loss to the (1_n)-th loss to each of the 1st learning device to the n-th learning device, wherein the (1_1)-st loss includes (1) at least one of the (1_1_1)-st loss to the (1_1_m)-th loss or (2) a 1st average loss calculated by averaging over the (1_1_1)-st loss to the (1_1_m)-th loss, and wherein the (1_n)-th loss includes (1) at least one of the (1_n_1)-st loss to the (1_n_m)-th loss or (2) an n-th average loss calculated by averaging over the (1_n_1)-st loss to the (1_n_m)-th loss, to thereby allow each of the 1st learning device to the n-th learning device to (i-1) train each of the 1st obfuscation network to the n-th obfuscation network (i-1-A) such that each of (1) at least one of the (1_1_1)-st loss to the (1_1_m)-th loss to (2) at least one of the (1_n_1)-st loss to the (1_n_m)-th loss is minimized and such that each of a 1st obfuscated data score to an n-th obfuscated data score, respectively corresponding to the 1st obfuscated data to the n-th obfuscated data inputted respectively into the 1st discriminator to the n-th discriminator, is maximized, or (i-1-B) such that each of the 1st average loss to the n-th average loss is minimized and such that each of the 1st obfuscated data score to the n-th obfuscated data score is maximized, (i-2) train each of the 1st discriminator to the n-th discriminator such that each of the 1st obfuscated data score to the n-th obfuscated data score is minimized and such that each of a 1st modified data score or a 1st modified obfuscated data score to an n-th modified data score to an n-th modified obfuscated data score is maximized which correspond respectively to the 1st modified data or the 1st modified obfuscated data to the n-th modified data to the n-th modified obfuscated data respectively inputted into the 1st discriminator to the n-th discriminator, and (i-3) transmit the 1st network gradient to the n-th network gradient to the master learning device, and (ii) a process of updating the master obfuscation network by referring to the average network gradient.

6. The method of claim 4, wherein the surrogate network includes a 1st surrogate network to an m-th surrogate network wherein m is an integer greater than 2, wherein, at the step of (a), the master learning device performs or supports another device to perform a process of acquiring a 1st sub-obfuscation pair comprised of the 1st ground truth and (1_1)-st obfuscated data to an n-th sub-obfuscation pair comprised of the n-th ground truth and (n_1)-st obfuscated data, wherein the (1_1)-st obfuscated data is created by obfuscating the 1st original data through the 1st obfuscation network, and wherein the (n_1)-st obfuscated data is created by obfuscating the n-th original data through the n-th obfuscation network, wherein, at the step of (b), the master learning device performs or supports another device to perform (i) a process of inputting each of the (1_1)-st obfuscated data to the (n_1)-st obfuscated data into the 1st surrogate network, to thereby allow the 1st surrogate network to apply at least one each learning operation to each of the (1_1)-st obfuscated data to the (n_1)-st obfuscated data and thus to generate (1_1)-st characteristic information to (n_1)-st characteristic information respectively corresponding to the (1_1)-st obfuscated data to the (n_1)-st obfuscated data, (ii) a process of calculating at least one (1_1_1)-st loss to at least one (1_n_1)-th loss wherein the (1_1_1)-st loss is calculated by referring to the 1st ground truth and at least one of the (1_1)-st characteristic information and its corresponding (1_1)-st task specific output and wherein the (1_n_1)-th loss is calculated by referring to the n-th ground truth and at least one of the (n_1)-th characteristic information and its corresponding (n_1)-th task specific output, and (iii) a process of training the surrogate network such that each of the (1_1_1)-st loss to the (1_n_1)-th loss is minimized or such that an average loss calculated by averaging over the (1_1_1)-st loss to the (1_n_1)-th loss is minimized, wherein, at the step of (b), the master learning device performs or supports another device to perform (i) a process of inputting each of the (1_1)-st obfuscated data to the (n_1)-st obfuscated data into the 1st surrogate network, to thereby allow the 1st surrogate network to apply at least one each learning operation to each of the (1_1)-st obfuscated data to the (n_1)-st obfuscated data and thus to generate (1_1)-st characteristic information to (n_1)-st characteristic information respectively corresponding to the (1_1)-st obfuscated data to the (n_1)-st obfuscated data, (ii) a process of calculating at least one (1_1_1)-st loss to at least one (1_n_1)-th loss wherein the (1_1_1)-st loss is calculated by referring to the 1st ground truth and at least one of the (1_1)-st characteristic information and its corresponding (1_1)-st task specific output and wherein the (1_n_1)-th loss is calculated by referring to the n-th ground truth and at least one of the (n_1)-th characteristic information and its corresponding (n_1)-th task specific output, and (iii) a process of training the surrogate network such that each of the (1_1_1)-st loss to the (1_n_1)-th loss is minimized or such that an average loss calculated by averaging over the (1_1_1)-st loss to the (1_n_1)-th loss is minimized, wherein, while increasing an integer k from 2 to m, the master learning device performs or supports another device to perform (I) a process of acquiring (1_k)-th obfuscated data to (n_k)-th obfuscated data, wherein the (1_k)-th obfuscated data is created by obfuscating the 1st original data through a (k-1)-th trained 1st obfuscation network, and wherein the (n_k)-th obfuscated data is created by obfuscating the n-th original data through a (k-1)-th trained n-th obfuscation network, (II) (II-1) a process of inputting the (1_k)-th obfuscated data to the (n_k)-th obfuscated data into a k-th surrogate network, to thereby allow the k-th surrogate network to apply each learning operation to each of the (1_k)-th obfuscated data to the (n_k)-th obfuscated data and thus to generate (1_k)-th characteristic information to (n_k)-th characteristic information respectively corresponding to the (1_k)-th obfuscated data to the (n_k)-th obfuscated data, (II-2) a process of calculating at least one (1_1_k)-th loss to at least one (1_n_k)-th loss, wherein the (1_1_k)-th loss is calculated by referring to the 1st ground truth and at least one of the (1_k)-th characteristic information and its corresponding (1_k)-th task specific output, and wherein the (1_n_k)-th loss is calculated by referring to the n-th ground truth and at least one of the (n_k)-th characteristic information and its corresponding (n_k)-th task specific output, and (II-3) a process of training the k-th surrogate network such that each of the (1_1_k)-th loss to the (1_n_k)-th loss is minimized, and (III) a process of transmitting each of the (1_1_k)-th loss to the (1_n_k)-th loss to each of the 1st learning device to the n-th learning device, to thereby allow each of the 1st learning device to the n-th learning device to (III-1) train each of the (k-1)-th trained 1st obfuscation network to the (k-1)-th trained n-th obfuscation network such that each of the (1_1_k)-th loss to the (1_n_k)-th loss is minimized and such that each of a (1_k)-th obfuscated data score to an (n_k)-th obfuscated data score is maximized, wherein each of the (1_k)-th obfuscated data score to the (n_k)-th obfuscated data score corresponds to each of the (1_k)-th obfuscated data to the (n_k)-th obfuscated data inputted into each of a (k-1)-th trained 1st discriminator to a (k-1)-th trained n-th discriminator, and thus to allow each of the (k-1)-th trained 1st obfuscation network to the (k-1)-th trained n-th obfuscation network to be each of a k-th trained 1st obfuscation network to a k-th trained n-th obfuscation network, and (III-2) train each of a (k-1)-th trained 1st discriminator to a (k-1)-th trained n-th discriminator such that each of the (1_k)-th obfuscated data score to the (n_k)-th obfuscated data score is minimized and such that each of a 1st modified data score or a 1st modified obfuscated data score to an n-th modified data score or an n-th modified obfuscated data score is maximized which corresponds respectively to the 1st modified data or the 1st modified obfuscated data to n-th modified data or n-th modified obfuscated data inputted respectively into a (k-1)-th trained 1st discriminator to a (k-1)-th trained n-th discriminator, and thus to allow each of the (k-1)-th trained 1st discriminator to the (k-1)-th trained n-th discriminator to be each of a k-th trained 1st discriminator to a k-th trained n-th discriminator, and wherein the master learning device performs or supports another device to perform (i) a process of allowing each of the 1st learning device to the n-th learning device to transmit to the master learning device each of the 1st network gradient of an m-th trained 1st obfuscation network to the n-th network gradient of an m-th trained n-th obfuscation network, and (ii) a process of updating the master obfuscation network by referring to the average network gradient which is averaged over the 1st network gradient to the n-th network gradient.

7. The method of claim 4, wherein a maximum of a 1st modified data score or a 1st modified obfuscated data score to an n-th modified data score or an n-th modified obfuscated data score each of which corresponds respectively to the 1st modified data or the 1st modified obfuscated data to the n-th modified data or the n-th modified obfuscated data inputted respectively into the 1st discriminator to the n-th discriminator, is 1 as a value for determining the 1st modified data or the 1st modified obfuscated data to the n-th modified data or the n-th modified obfuscated data as real, and a minimum of the 1st obfuscated data score to the n-th obfuscated data score is 0 as a value for determining the 1st obfuscated data to the n-th obfuscated data as fake.

8. The method of claim 1, wherein, at the step of (c), supposing that a unit process of training the 1st obfuscation network to the n-th obfuscation network is an iteration, then for each of a preset number of iterations, the master learning device performs or supports another device to perform a process of allowing the 1st learning device to the n-th learning device to (i) transmit the 1st network gradient to the n-th network gradient to the master learning device, and (ii) update the master obfuscation network by referring to the average network gradient.

9. The method of claim 1, wherein, before the step of (a), the master learning device performs or supports another device to perform a process of transmitting the master obfuscation network to each of the 1st learning device to the n-th learning device, to thereby allow each of the 1st learning device to the n-th learning device to set each of initial networks of each of the 1st obfuscation network to the n-th obfuscation network as the master obfuscation network.

10. A method for testing an obfuscation network, comprising steps of:
(a) when a master learning device has performed or supported another device to perform (i) a process of acquiring (1) a 1st obfuscation pair comprised of 1st obfuscated data and a 1st ground truth to (2) an n-th obfuscation pair comprised of n-th obfuscated data and an n-th ground truth respectively from a 1st learning device to an n-th learning device, wherein the 1st obfuscated data is created by obfuscating 1st original data through a 1st obfuscation network, wherein the 1st ground truth corresponds to the 1st original data, wherein the n-th obfuscated data is created by obfuscating n-th original data through an n-th obfuscation network, wherein the n-th ground truth corresponds to the n-th original data, wherein the 1st learning device corresponds to a 1st party which is determined as a 1st owner of the 1st original data and its corresponding 1st ground truth or is an entity to which the 1st original data and its corresponding 1st ground truth are delegated by the 1st owner, wherein the n-th learning device corresponds to an n-th party which is determined as an n-th owner of the n-th original data and its corresponding n-th ground truth or is an entity to which the n-th original data and its corresponding n-th ground truth are delegated by the n-th owner, and wherein n is an integer larger than 1, (ii) a process of inputting each of the 1st obfuscated data to the n-th obfuscated data into a surrogate network, to thereby allow the surrogate network to apply at least one each learning operation to each of the 1st obfuscated data to the n-th obfuscated data and thus to generate 1st characteristic information to n-th characteristic information respectively corresponding to the 1st obfuscated data to the n-th obfuscated data, (iii) a process of calculating at least one (1_1)-st loss to at least one (1_n)-th loss wherein the (1_1)-st loss is calculated by referring to the 1st ground truth and at least one of the 1st characteristic information and its corresponding 1st task specific output and wherein the (1_n)-th loss is calculated by referring to the n-th ground truth and at least one of the n-th characteristic information and its corresponding n-th task specific output, (iv) a process of training the surrogate network such that each of the (1_1)-st loss to the (1_n)-th loss is minimized or such that an average loss calculated by averaging over the (1_1)-st loss to the (1_n)-th loss is minimized, (v) a process of transmitting the (1_1)-st loss to the (1_n)-th loss respectively to the 1st learning device to the n-th learning device, to thereby allow each of the 1st learning device to the n-th learning device to (v-1) train each of the 1st obfuscation network to the n-th obfuscation network such that each of the (1_1)-st loss to the (1_n)-th loss is minimized and such that each of at least one (2_1)-st loss to at least one (2_n)-th loss is maximized wherein the (2_1)-st loss is calculated by referring to the 1st original data and the 1st obfuscated data and wherein the (2_n)-th loss is calculated by referring to the n-th original data and the n-th obfuscated data, and (v-2) transmit to the master learning device a 1st network gradient of the trained 1st obfuscation network to an n-th network gradient of the trained n-th obfuscation network, and (vi) a process of updating the master obfuscation network by referring to an average network gradient which is averaged over the 1st network gradient to the n-th network gradient, a testing device performing or supporting another device to perform a process of acquiring original data for testing to be used for concealing; and (b) the testing device performing or supporting another device to perform one of (i) a process of inputting the original data for testing into the master obfuscation network and (ii) a process of inputting the original data for testing into at least one of the 1st obfuscation network to the n-th obfuscation network, to thereby allow at least one of the master obfuscation network and the 1st obfuscation network to the n-th obfuscation network to obfuscate the original data for testing, and thus to generate obfuscated data for testing.

11. A master learning device for training one or more obfuscation networks which conceal original data to be used for machine learning and training one or more surrogate networks which use obfuscated data generated by the obfuscation networks, comprising:

at least one memory that stores instructions; and at least one processor configured to execute the instructions to perform or support another device to perform:

(I) a process of acquiring (i) a 1st obfuscation pair comprised of 1st obfuscated data and a 1st ground truth to (ii) an n-th obfuscation pair comprised of n-th obfuscated data and an n-th ground truth respectively from a 1st learning device to an n-th learning device, wherein the 1st obfuscated data is created by obfuscating 1st original data through a 1st obfuscation network, wherein the 1st ground truth corresponds to the 1st original data, wherein the n-th obfuscated data is created by obfuscating n-th original data through an n-th obfuscation network, wherein the n-th ground truth corresponds to the n-th original data, wherein the 1st learning device corresponds to a 1st party which is determined as a 1st owner of the 1st original data and its corresponding 1st ground truth or is an entity to which the 1st original data and its corresponding 1st ground truth are delegated by the 1st owner, wherein the n-th learning device corresponds to an n-th party which is determined as an n-th owner of the n-th original data and its corresponding n-th ground truth or is an entity to which the n-th original data and its corresponding n-th ground truth are delegated by the n-th owner, and wherein n is an integer larger than 1, (II) (i) a process of inputting each of the 1st obfuscated data to the n-th obfuscated data into a surrogate network, to thereby allow the surrogate network to apply at least one each learning operation to each of the 1st obfuscated data to the n-th obfuscated data and thus to generate 1st characteristic information to n-th characteristic information respectively corresponding to the 1st obfuscated data to the n-th obfuscated data, (ii) a process of calculating at least one (1_1)-st loss to at least one (1_n)-th loss wherein the (1_1)-st loss is calculated by referring to the 1st ground truth and at least one of the 1st characteristic information and its corresponding 1st task specific output and wherein the (1_n)-th loss is calculated by referring to the n-th ground truth and at least one of the n-th characteristic information and its corresponding n-th task specific output, and (iii) a process of training the surrogate network such that each of the (1_1)-st loss to the (1_n)-th loss is minimized or such that an average loss calculated by averaging over the (1_1)-st loss to the (1_n)-th loss is minimized, and (III) (i) a process of transmitting the (1_1)-st loss to the (1_n)-th loss respectively to the 1st learning device to the n-th learning device, to thereby allow each of the 1st learning device to the n-th learning device to (i-1) train each of the 1st obfuscation network to the n-th obfuscation network such that each of the (1_1)-st loss to the (1_n)-th loss is minimized and such that each of at least one (2_1)-st loss to at least one (2_n)-th loss is maximized wherein the (2_1)-st loss is calculated by referring to the 1st original data and the 1st obfuscated data and wherein the (2_n)-th loss is calculated by referring to the n-th original data and the n-th obfuscated data, and (i-2) transmit to the master learning device a 1st network gradient of the trained 1st obfuscation network to an n-th network gradient of the trained n-th obfuscation network, and (ii) a process of updating the master obfuscation network by referring to an average network gradient which is averaged over the 1st network gradient to the n-th network gradient.

12. The master learning device of claim 11, wherein the surrogate network includes a 1st surrogate network to an m-th surrogate network and wherein m is an integer greater than 2, wherein, at the process of (II), the processor performs or supports another device to perform (i) a process of inputting all of the 1st obfuscated data to the n-th obfuscated data into each of the 1st surrogate network to the m-th surrogate network, to thereby allow each of the 1st surrogate network to the m-th surrogate network to apply each learning operation to all of the 1st obfuscated data to the n-th obfuscated data, and thus to generate (i-1) (1_1)-st characteristic information to (n_1)-st characteristic information to (i-2) (1_m)-th characteristic information to (n_m)-th characteristic information, (ii) a process of calculating (ii-1) at least one (1_1_1)-st loss to at least one (1_n_1)-st loss to (ii-2) at least one (1_1_m)-th loss to at least one (1_n_m)-th loss, wherein the (1_1_1)-st loss is calculated by referring to the 1st ground truth and at least one of (1_1)-st characteristic information and its corresponding (1_1)-st task specific output, wherein the (1_n_1)-st loss is calculated by referring to the n-th ground truth and at least one of the (n_1)-st characteristic information and its corresponding (n_1)-st task specific output, wherein the (1_1_m)-th loss is calculated by referring to the 1st ground truth and at least one of (1_m)-th characteristic information and its corresponding (1_m)-th task specific output, and wherein the (1_n_m)-th loss is calculated by referring to the n-th ground truth and at least one of (n_m)-th characteristic information and its corresponding (n_m)-th task specific output, and (iii) a process of training the 1st surrogate network to the m-th surrogate network such that each of (iii-1) the (1_1_1)-st loss to the (1_n_1)-st loss to (iii-2) the (1_1_m)-th loss to the (1_n_m)-th loss is minimized, wherein, at the process of (III), the processor performs or supports another device to perform (i) a process of transmitting each of the (1_1)-st loss to the (1_n)-th loss to each of the 1st learning device to the n-th learning device wherein the (1_1)-st loss includes (1) at least one of the (1_1_1)-st loss to the (1_1_m)-th loss or (2) a 1st average loss calculated by averaging over the (1_1_1)-st loss to the (1_1_m)-th loss and wherein the (1_n)-th loss includes (1) at least one of the (1_n_1)-st loss to the (1_n_m)-th loss or (2) an n-th average loss calculated by averaging over the (1_n_1)-st loss to the (1_n_m)-th loss, to thereby allow each of the 1st learning device to the n-th learning device to (i-1) train each of the 1st obfuscation network to the n-th obfuscation network such that each of the (1_1)-st loss to the (1_n)-th loss is minimized and such that each of the (2_1)-st loss to the (2_n)-th loss is maximized, and (i-2) transmit the 1st network gradient to the n-th network gradient to the master learning device, and (ii) a process of updating the master obfuscation network by referring to the average network gradient.

13. The master learning device of claim 11, wherein the surrogate network includes a 1st surrogate network to an m-th surrogate network and wherein m is an integer greater than 2, wherein, at the process of (I), the processor performs or supports another device to perform a process of acquiring a 1st sub-obfuscation pair comprised of the 1st ground truth and (1_1)-st obfuscated data to an n-th sub-obfuscation pair comprised of the n-th ground truth and (n_1)-st obfuscated data, wherein the (1_1)-st obfuscated data is created by obfuscating the 1st original data through the 1st obfuscation network, and wherein the (n_1)-st obfuscated data is created by obfuscating the n-th original data through the n-th obfuscation network, wherein, at the process of (II), the processor performs or supports another device to perform (i) a process of inputting each of the (1_1)-st obfuscated data to the (n_1)-st obfuscated data into the 1st surrogate network, to thereby allow the 1st surrogate network to apply at least one each learning operation to each of the (1_1)-st obfuscated data to the (n_1)-st obfuscated data and thus to generate (1_1)-st characteristic information to (n_1)-st characteristic information respectively corresponding to the (1_1)-st obfuscated data to the (n_1)-st obfuscated data, (ii) a process of calculating at least one (1_1_1)-st loss to at least one (1_n_1)-th loss wherein the (1_1_1)-st loss is calculated by referring to the 1st ground truth and at least one of the (1_1)-st characteristic information and its corresponding (1_1)-th task specific output and wherein the (1_n_1)-th loss is calculated by referring to the n-th ground truth and at least one of the (n_1)-th characteristic information and its corresponding (n_1)-th task specific output, and (iii) a process of training the surrogate network such that each of the (1_1_1)-st loss to the (1_n_1)-th loss is minimized or such that an average loss calculated by averaging over the (1_1_1)-st loss to the (1_n_1)-th loss is minimized, wherein, at the process of (III), the processor performs or supports another device to perform a process of transmitting the (1_1_1)-st loss to the (1_n_1)-th loss respectively to the 1st learning device to the n-th learning device, to thereby allow each of the 1st learning device to the n-th learning device to (i-1) train each of the 1st obfuscation network to the n-th obfuscation network such that each of the (1_1_1)-st loss to the (1_n_1)-th loss is minimized and such that each of at least one (2_1_1)-st loss to at least one (2_n_1)-th loss is maximized wherein the (2_1_1)-st loss is calculated by referring to the 1st original data and the (1_1)-st obfuscated data and wherein the (2_n_1)-th loss is calculated by referring to the n-th original data and the (n_1)-th obfuscated data, and, as a result, a process of allowing each of the 1st obfuscation network to the n-th obfuscation network to be each of a 1st trained 1st obfuscation network to a 1st trained n-th obfuscation network, wherein, while increasing an integer k from 2 to m, the processor performs or supports another device to perform (i) a process of acquiring (1_k)-th obfuscated data to (n_k)-th obfuscated data, wherein the (1_k)-th obfuscated data is created by obfuscating the 1st original data through a (k-1)-th trained 1st obfuscation network, and wherein the (n_k)-th obfuscated data is created by obfuscating the n-th original data through a (k-1)-th trained n-th obfuscation network, (ii) (ii-1) a process of inputting the (1_k)-th obfuscated data to the (n_k)-th obfuscated data into a k-th surrogate network, to thereby allow the k-th surrogate network to apply each learning operation to each of the (1_k)-th obfuscated data to the (n_k)-th obfuscated data and thus to generate (1_k)-th characteristic information to (n_k)-th characteristic information respectively corresponding to the (1_k)-th obfuscated data to the (n_k)-th obfuscated data, (ii-2) a process of calculating at least one (1_1_k)-th loss to at least one (1_n_k)-th loss, wherein the (1_1_k)-th loss is calculated by referring to the 1st ground truth and at least one of the (1_k)-th characteristic information and its corresponding (1_k)-th task specific output, and wherein the (1_n_k)-th loss is calculated by referring to the n-th ground truth and at least one of the (n_k)-th characteristic information and its corresponding (n_k)-th task specific output, and (ii-3) a process of training the k-th surrogate network such that each of the (1_1_k)-th loss to the (1_n_k)-th loss is minimized, and (iii) a process of transmitting each of the (1_1_k)-th loss to the (1_n_k)-th loss to each of the 1st learning device to the n-th learning device, to thereby allow each of the 1st learning device to the n-th learning device to (iii-1) train each of the (k-1)-th trained 1st obfuscation network to the (k-1)-th trained n-th obfuscation network such that each of the (1_1_k)-th loss to the (1_n_k)-th loss is minimized and such that each of (2_1_k)-th loss to (2_n_k)-th loss is maximized, wherein the (2_1_k)-th loss is calculated by referring to the 1st original data and the (1_k)-th obfuscated data, and wherein the (2_n_k)-th loss is calculated by referring to the n-th original data and the (n_k)-th obfuscated data and thus (iii-2) allow each of the (k-1)-th trained 1st obfuscation network to the (k-1)-th trained n-th obfuscation network to be each of a k-th trained 1st obfuscation network to a k-th trained n-th obfuscation network, and wherein the processor performs or supports another device to perform (i) a process of allowing each of the 1st learning device to the n-th learning device to transmit to the master learning device each of the 1st network gradient of an m-th trained 1st obfuscation network to the n-th network gradient of an m-th trained n-th obfuscation network, and (ii) a process of updating the master obfuscation network by referring to the average network gradient which is averaged over the 1st network gradient to the n-th network gradient.

14. The master learning device of claim 11, wherein, at the process of (III), when a 1st obfuscated data score to an n-th obfuscated data score have been acquired respectively as the (2_1)-st loss to the (2_n)-th loss wherein the 1st obfuscated data score to the n-th obfuscated data score respectively correspond to the 1st obfuscated data to the n-th obfuscated data respectively inputted into a 1st discriminator to an n-th discriminator to be used for determining whether their inputted data is real or fake, the processor performs or supports another device to perform a process of transmitting each of the (1_1)-st loss to the (1_n)-th loss to each of the 1st learning device to the n-th learning device, to thereby allow each of the 1st learning device to the n-th learning device to (i) train each of the 1st obfuscation network to the n-th obfuscation network such that each of the (1_1)-st loss to the (1_n)-th loss is minimized and such that each of the (2_1)-st loss to the (2_n)-st loss is maximized, and (ii) train each of the 1st discriminator to the n-th discriminator such that each of the 1st obfuscated data score to the n-th obfuscated data score is minimized and such that each of 1st modified data score or a 1st modified obfuscated data score to an n-th modified data score or an n-th modified obfuscated data score is maximized, wherein the 1st modified data score or the 1st modified obfuscated data score to the n-th modified data score or the n-th modified obfuscated data score respectively correspond to the 1st modified data or the 1st modified obfuscated data to the n-th modified data or the n-th modified obfuscated data respectively inputted into the 1st discriminator to the n-th discriminator, wherein the 1st modified data or the 1st modified obfuscated data is created by respectively modifying the 1st original data or the 1st obfuscated data, and wherein the n-th modified data or the n-th modified obfuscated data is created by respectively modifying the n-th original data or the n-th obfuscated data.

15. The master learning device of claim 14, wherein the surrogate network includes a 1st surrogate network to an m-th surrogate network wherein m is an integer greater than 2, wherein, at the process of (II), the processor performs or supports another device to perform (i) a process of inputting each of the 1st obfuscated data to the n-th obfuscated data into each of the 1st surrogate network to the m-th surrogate network, to thereby allow each of the 1st surrogate network to the m-th surrogate network to apply each learning operation to each of the 1st obfuscated data to the n-th obfuscated data, and thus to generate (i-1) (1_1)-st characteristic information to (n_1)-st characteristic information to (i-2) (1_m)-th characteristic information to (n_m)-th characteristic information, (ii) a process of calculating (ii-1) at least one (1_1_1)-st loss to at least one (1_n_1)-st loss to (ii-2) at least one (1_1_m)-th loss to at least one (1_n_m)-th loss, wherein the (1_1_1)-st loss is calculated by referring to the 1st ground truth and at least one of (1_1)-st characteristic information and its corresponding (1_1)-st task specific output, wherein the (1_n_1)-st loss is calculated by referring to the n-th ground truth and at least one of the (n_1)-st characteristic information and its corresponding (n_1)-st task specific output, wherein the (1_1_m)-th loss is calculated by referring to the 1st ground truth and at least one of (1_m)-th characteristic information and its corresponding (1_m)-th task specific output, and wherein the (1_n_m)-th loss is calculated by referring to the n-th ground truth and at least one of (n_m)-th characteristic information and its corresponding (n_m)-th task specific output, and (iii) a process of training the 1st surrogate network to the m-th surrogate network such that each of (iii-1) the (1_1_1)-st loss to the (1_n_1)-st loss to (iii-2) the (1_1_m)-th loss to the (1_n_m)-th loss is minimized, and wherein, at the process of (III), the processor performs or supports another device to perform (i) a process of transmitting each of the (1_1)-st loss to the (1_n)-th loss to each of the 1st learning device to the n-th learning device, wherein the (1_1)-st loss includes (1) at least one of the (1_1_1)-st loss to the (1_1_m)-th loss or (2) a 1st average loss calculated by averaging over the (1_1_1)-st loss to the (1_1_m)-th loss, and wherein the (1_n)-th loss includes (1) at least one of the (1_n_1)-st loss to the (1_n_m)-th loss or (2) an n-th average loss calculated by averaging over the (1_n_1)-st loss to the (1_n_m)-th loss, to thereby allow each of the 1st learning device to the n-th learning device to (i-1) train each of the 1st obfuscation network to the n-th obfuscation network (i-1-A) such that each of (1) at least one of the (1_1_1)-st loss to the (1_1_m)-th loss to (2) at least one of the (1_n_1)-st loss to the (1_n_m)-th loss is minimized and such that each of a 1st obfuscated data score to an n-th obfuscated data score, respectively corresponding to the 1st obfuscated data to the n-th obfuscated data inputted respectively into the 1st discriminator to the n-th discriminator, is maximized, or (i-1-B) such that each of the 1st average loss to the n-th average loss is minimized and such that each of the 1st obfuscated data score to the n-th obfuscated data score is maximized, (i-2) train each of the 1st discriminator to the n-th discriminator such that each of the 1st obfuscated data score to the n-th obfuscated data score is minimized and such that each of a 1st modified data score or a 1st modified obfuscated data score to an n-th modified data score to an n-th modified obfuscated data score is maximized which correspond respectively to the 1st modified data or the 1st modified obfuscated data to the n-th modified data to the n-th modified obfuscated data respectively inputted into the 1st discriminator to the n-th discriminator, and (i-3) transmit the 1st network gradient to the n-th network gradient to the master learning device, and (ii) a process of updating the master obfuscation network by referring to the average network gradient.

16. The master learning device of claim 14, wherein the surrogate network includes a 1st surrogate network to an m-th surrogate network wherein m is an integer greater than 2, wherein, at the process of (I), the processor performs or supports another device to perform a process of acquiring a 1st sub-obfuscation pair comprised of the 1st ground truth and (1_1)-st obfuscated data to an n-th sub-obfuscation pair comprised of the n-th ground truth and (n_1)-st obfuscated data, wherein the (1_1)-st obfuscated data is created by obfuscating the 1st original data through the 1st obfuscation network, and wherein the (n_1)-st obfuscated data is created by obfuscating the n-th original data through the n-th obfuscation network, wherein, at the process of (II), the processor performs or supports another device to perform (i) a process of inputting each of the (1_1)-st obfuscated data to the (n_1)-st obfuscated data into the 1st surrogate network, to thereby allow the 1st surrogate network to apply at least one each learning operation to each of the (1_1)-st obfuscated data to the (n_1)-st obfuscated data and thus to generate (1_1)-st characteristic information to (n_1)-st characteristic information respectively corresponding to the (1_1)-st obfuscated data to the (n_1)-st obfuscated data, (ii) a process of calculating at least one (1_1_1)-st loss to at least one (1_n_1)-th loss wherein the (1_1_1)-st loss is calculated by referring to the 1st ground truth and at least one of the (1_1)-st characteristic information and its corresponding (1_1)-st task specific output and wherein the (1_n_1)-th loss is calculated by referring to the n-th ground truth and at least one of the (n_1)-th characteristic information and its corresponding (n_1)-th task specific output, and (iii) a process of training the surrogate network such that each of the (1_1_1)-st loss to the (1_n_1)-th loss is minimized or such that an average loss calculated by averaging over the (1_1_1)-st loss to the (1_n_1)-th loss is minimized, wherein, at the process of (II), the processor performs or supports another device to perform (i) a process of inputting each of the (1_1)-st obfuscated data to the (n_1)-st obfuscated data into the 1st surrogate network, to thereby allow the 1st surrogate network to apply at least one each learning operation to each of the (1_1)-st obfuscated data to the (n_1)-st obfuscated data and thus to generate (1_1)-st characteristic information to (n_1)-st characteristic information respectively corresponding to the (1_1)-st obfuscated data to the (n_1)-st obfuscated data, (ii) a process of calculating at least one (1_1_1)-st loss to at least one (1_n_1)-th loss wherein the (1_1_1)-st loss is calculated by referring to the 1st ground truth and at least one of the (1_1)-st characteristic information and its corresponding (1_1)-st task specific output and wherein the (1_n_1)-th loss is calculated by referring to the n-th ground truth and at least one of the (n_1)-th characteristic information and its corresponding (n_1)-th task specific output, and (iii) a process of training the surrogate network such that each of the (1_1_1)-st loss to the (1_n_1)-th loss is minimized or such that an average loss calculated by averaging over the (1_1_1)-st loss to the (1_n_1)-th loss is minimized, wherein, while increasing an integer k from 2 to m, the processor performs or supports another device to perform (i) a process of acquiring (1_k)-th obfuscated data to (n_k)-th obfuscated data, wherein the (1_k)-th obfuscated data is created by obfuscating the 1st original data through a (k-1)-th trained 1st obfuscation network, and wherein the (n_k)-th obfuscated data is created by obfuscating the n-th original data through a (k-1)-th trained n-th obfuscation network, (ii) (ii-1) a process of inputting the (1_k)-th obfuscated data to the (n_k)-th obfuscated data into a k-th surrogate network, to thereby allow the k-th surrogate network to apply each learning operation to each of the (1_k)-th obfuscated data to the (n_k)-th obfuscated data and thus to generate (1_k)-th characteristic information to (n_k)-th characteristic information respectively corresponding to the (1_k)-th obfuscated data to the (n_k)-th obfuscated data, (ii-2) a process of calculating at least one (1_1_k)-th loss to at least one (1_n_k)-th loss, wherein the (1_1_k)-th loss is calculated by referring to the 1st ground truth and at least one of the (1_k)-th characteristic information and its corresponding (1_k)-th task specific output, and wherein the (1_n_k)-th loss is calculated by referring to the n-th ground truth and at least one of the (n_k)-th characteristic information and its corresponding (n_k)-th task specific output, and (ii-3) a process of training the k-th surrogate network such that each of the (1_1_k)-th loss to the (1_n_k)-th loss is minimized, and (iii) a process of transmitting each of the (1_1_k)-th loss to the (1_n_k)-th loss to each of the 1st learning device to the n-th learning device, to thereby allow each of the 1st learning device to the n-th learning device to (iii-1) train each of the (k-1)-th trained 1st obfuscation network to the (k-1)-th trained n-th obfuscation network such that each of the (1_1_k)-th loss to the (1_n_k)-th loss is minimized and such that each of a (1_k)-th obfuscated data score to an (n_k)-th obfuscated data score is maximized, wherein each of the (1_k)-th obfuscated data score to the (n_k)-th obfuscated data score corresponds to each of the (1_k)-th obfuscated data to the (n_k)-th obfuscated data inputted into each of a (k-1)-th trained 1st discriminator to a (k-1)-th trained n-th discriminator, and thus to allow each of the (k-1)-th trained 1st obfuscation network to the (k-1)-th trained n-th obfuscation network to be each of a k-th trained 1st obfuscation network to a k-th trained n-th obfuscation network, and (iii-2) train each of a (k-1)-th trained 1st discriminator to a (k-1)-th trained n-th discriminator such that each of the (1_k)-th obfuscated data score to the (n_k)-th obfuscated data score is minimized and such that each of a 1st modified data score or a modified obfuscated data score to an n-th modified data score or an n-th modified obfuscated data score is maximized which corresponds respectively to the 1st modified data or the 1st modified obfuscated data to n-th modified data or n-th modified obfuscated data inputted respectively into a (k-1)-th trained 1st discriminator to a (k-1)-th trained n-th discriminator, and thus to allow each of the (k-1)-th trained 1st discriminator to the (k-1)-th trained n-th discriminator to be each of a k-th trained 1st discriminator to a k-th trained n-th discriminator, and wherein the processor performs or supports another device to perform (i) a process of allowing each of the 1st learning device to the n-th learning device to transmit to the master learning device each of the 1st network gradient of an m-th trained 1st obfuscation network to the n-th network gradient of an m-th trained n-th obfuscation network, and (ii) a process of updating the master obfuscation network by referring to the average network gradient which is averaged over the 1st network gradient to the n-th network gradient.

17. The master learning device of claim 14, wherein a maximum of a 1st modified data score or a 1st modified obfuscated data score to an n-th modified data score or an n-th modified obfuscated data score each of which corresponds respectively to the 1st modified data or the 1st modified obfuscated data to the n-th modified data or the n-th modified obfuscated data inputted respectively into the 1st discriminator to the n-th discriminator, is 1 as a value for determining the 1st modified data or the 1st modified obfuscated data to the n-th modified data or the n-th modified obfuscated data as real, and a minimum of the 1st obfuscated data score to the n-th obfuscated data score is 0 as a value for determining the 1st obfuscated data to the n-th obfuscated data as fake.

18. The master learning device of claim 11, wherein, at the process of (III), supposing that a unit process of training the 1st obfuscation network to the n-th obfuscation network is an iteration, then for each of a preset number of iterations, the processor performs or supports another device to perform a process of allowing the 1st learning device to the n-th learning device to (i) transmit the 1st network gradient to the n-th network gradient to the master learning device, and (ii) update the master obfuscation network by referring to the average network gradient.

19. The master learning device of claim 11, wherein, before the process of (I), the processor performs or supports another device to perform a process of transmitting the master obfuscation network to each of the 1st learning device to the n-th learning device, to thereby allow each of the 1st learning device to the n-th learning device to set each of initial networks of each of the 1st obfuscation network to the n-th obfuscation network as the master obfuscation network.

20. A testing device for testing an obfuscation network, comprising:
at least one memory that stores instructions; and
at least one processor configured to execute the instructions to perform or support another device to perform: (I) when a master learning device has performed or supported another device to perform (i) a process of acquiring (1) a 1st obfuscation pair comprised of 1st obfuscated data and a 1st ground truth to (2) an n-th obfuscation pair comprised of n-th obfuscated data and an n-th ground truth respectively from a 1st learning device to an n-th learning device, wherein the 1st obfuscated data is created by obfuscating 1st original data through a 1st obfuscation network, wherein the 1st ground truth corresponds to the 1st original data, wherein the n-th obfuscated data is created by obfuscating n-th original data through an n-th obfuscation network, wherein the n-th ground truth corresponds to the n-th original data, wherein the 1st learning device corresponds to a 1st party which is determined as a 1st owner of the 1st original data and its corresponding 1st ground truth or is an entity to which the 1st original data and its corresponding 1st ground truth are delegated by the 1st owner, wherein the n-th learning device corresponds to an n-th party which is determined as an n-th owner of the n-th original data and its corresponding n-th ground truth or is an entity to which the n-th original data and its corresponding n-th ground truth are delegated by the n-th owner, and wherein n is an integer larger than 1, (ii) a process of inputting each of the 1st obfuscated data to the n-th obfuscated data into a surrogate network, to thereby allow the surrogate network to apply at least one each learning operation to each of the 1st obfuscated data to the n-th obfuscated data and thus to generate 1st characteristic information to n-th characteristic information respectively corresponding to the 1st obfuscated data to the n-th obfuscated data, (iii) a process of calculating at least one $(1\_1)$-st loss to at least one $(1\_n)$-th loss wherein the $(1\_1)$-st loss is calculated by referring to the 1st ground truth and at least one of the 1st characteristic information and its corresponding 1st task specific output and wherein the $(1\_n)$-th loss is calculated by referring to the n-th ground truth and at least one of the n-th characteristic information and its corresponding n-th task specific output, (iv) a process of training the surrogate network such that each of the $(1\_1)$-st loss to the $(1\_n)$-th loss is minimized or such that an average loss calculated by averaging over the $(1\_1)$-st loss to the $(1\_n)$-th loss is minimized, (v) a process of transmitting the $(1\_1)$-st loss to the $(1\_n)$-th loss respectively to the 1st learning device to the n-th learning device, to thereby allow each of the 1st learning device to the n-th learning device to (v-1) train each of the 1st obfuscation network to the n-th obfuscation network such that each of the $(1\_1)$-st loss to the $(1\_n)$-th loss is minimized and such that each of at least one $(2\_1)$-st loss to at least one $(2\_n)$-th loss is maximized wherein the $(2\_1)$-st loss is calculated by referring to the 1st original data and the 1st obfuscated data and wherein the $(2\_n)$-th loss is calculated by referring to the n-th original data and the n-th obfuscated data, and (v-2) transmit to the master learning device a 1st network gradient of the trained 1st obfuscation network to an n-th network gradient of the trained n-th obfuscation network, and (vi) a process of updating the master obfuscation network by referring to an average network gradient which is averaged over the 1st network gradient to the n-th network gradient, a process of acquiring original data for testing to be used for concealing, and (II) (i) a process of inputting the original data for testing into the master obfuscation network and (ii) a process of inputting the original data for testing into at least one of the 1st obfuscation network to the n-th obfuscation network, to thereby allow at least one of the master obfuscation network and the 1st obfuscation network to the n-th obfuscation network to obfuscate the original data for testing, and thus to generate obfuscated data for testing.

* * * * *